(12) United States Patent
Furusho

(10) Patent No.: US 8,024,531 B2
(45) Date of Patent: Sep. 20, 2011

(54) INFORMATION PROCESSING SYSTEM AND INFORMATION PROCESSING METHOD

(75) Inventor: Shinji Furusho, Yokohama (JP)

(73) Assignee: Turbo Data Laboratories, Inc., Kanagawa (JP)

( * ) Notice: Subject to any disclaimer, the term of this patent is extended or adjusted under 35 U.S.C. 154(b) by 651 days.

(21) Appl. No.: 11/817,170

(22) PCT Filed: Apr. 17, 2006

(86) PCT No.: PCT/JP2006/308022
§ 371 (c)(1),
(2), (4) Date: Oct. 8, 2008

(87) PCT Pub. No.: WO2006/112430
PCT Pub. Date: Oct. 26, 2006

(65) Prior Publication Data
US 2009/0187718 A1 Jul. 23, 2009

(30) Foreign Application Priority Data
Apr. 18, 2005 (JP) .................. 2005-119297

(51) Int. Cl.
*G06F 12/00* (2006.01)
(52) U.S. Cl. . 711/154; 711/148; 711/170; 711/E12.001; 712/22
(58) Field of Classification Search ............... 711/154, 711/148, 170, E12.001; 712/22
See application file for complete search history.

(56) References Cited

U.S. PATENT DOCUMENTS
6,886,082 B1 * 4/2005 Furusho ................. 711/154

FOREIGN PATENT DOCUMENTS
JP 2001-28594 1/2001
WO 03-10103 2/2000
WO 2004/092948 A1 10/2004

OTHER PUBLICATIONS

International Search Report issued in corresponding application No. PCT/JP2006/308022, completed May 25, 2006 and mailed Jun. 6, 2006.
English translation of the International Preliminary Report on Patentability issued in corresponding application No. PCT/JP2006/308022.

* cited by examiner

*Primary Examiner* — Yong Choe
(74) *Attorney, Agent, or Firm* — Griffin & Szipl, P.C.

(57) ABSTRACT

An ascending ordered list without duplication is generated based on a value list divided and held by multiple memory modules. An information processing system has multiple PMMs (Processor Memory Modules), and the PMMs are interconnected via a data transmission path. The memory in the PMM has a list of values, which are ordered in ascending or descending order without duplication. The PMM determines, for a storage value in the value list (LOCAL_LIST) held by the PMM, whether or not the memory module is a representative module representing one or more memory modules holding the storage value based on rankings determined for the individual PMMs and the value lists received from the other PMMs, and if the memory module is determined to be the representative module (RV-0 . . . RV-7), associates to the storage value and stores information indicating that the memory module is the representative module.

22 Claims, 64 Drawing Sheets

Fig.3

| | SEX | AGE | HEIGHT(cm) | WEIGHT(kg) |
|---|---|---|---|---|
| 0 | FEMALE | 18 | 168 | 55 |
| 1 | MALE | 21 | 172 | 64 |
| 2 | FEMALE | 24 | 159 | 48 |
| 3 | FEMALE | 16 | 172 | 48 |
| 4 | MALE | 28 | 181 | 78 |
| 5 | FEMALE | 20 | 166 | 55 |
| 6 | FEMALE | 16 | 168 | 52 |
| 7 | MALE | 33 | 174 | 65 |
| 8 | MALE | 24 | 177 | 64 |
| 9 | FEMALE | 18 | 170 | 55 |

OFFSET= 0

PMM-0

| | SEX | AGE | HEIGHT(cm) | WEIGHT(kg) |
|---|---|---|---|---|
| 0 | FEMALE | 18 | 168 | 55 |
| 1 | MALE | 21 | 172 | 64 |
| 2 | FEMALE | 24 | 159 | 48 |

OFFSET= 3

PMM-1

| | SEX | AGE | HEIGHT(cm) | WEIGHT(kg) |
|---|---|---|---|---|
| 0 | FEMALE | 16 | 172 | 48 |
| 1 | MALE | 28 | 181 | 78 |

OFFSET= 5

PMM-2

| | SEX | AGE | HEIGHT(cm) | WEIGHT(kg) |
|---|---|---|---|---|
| 0 | FEMALE | 20 | 166 | 55 |
| 1 | FEMALE | 16 | 168 | 52 |
| 2 | MALE | 33 | 174 | 65 |

OFFSET= 8

PMM-3

| | SEX | AGE | HEIGHT(cm) | WEIGHT(kg) |
|---|---|---|---|---|
| 0 | MALE | 24 | 177 | 64 |
| 1 | FEMALE | 18 | 170 | 55 |

Fig.22A
TOTAL_LIST

| Order No. | |
|---|---|
| 0 | 10 (Virtual) |
| 1 | 100 |
| 2 | 200 |
| 3 | 300 |
| 4 | 400 |
| 5 | 500 |
| 6 | 600 |
| 7 | 700 (Virtual) |

Fig.22B
PMM-0

| | LOCAL_LIST | COUNT | COUNT-H |
|---|---|---|---|
| 0 | - | - | - |
| 1 | 100 | 2→1 | 1 |
| 2 | - | - | - |
| 3 | 300 | 3→1 | 1 |
| 4 | - | - | - |
| 5 | 500 | 2→1 | 1 |
| 6 | 600 | 2→1 | 1 |
| 7 | - | - | - |

SET TO 1 IF NOT IDENTICAL

Fig.22C
PMM-1

| | LOCAL_LIST | COUNT | COUNT-H |
|---|---|---|---|
| 0 | 10 | 2→1 | 1 |
| 1 | - | - | - |
| 2 | 200 | 2→1 | 1 |
| 3 | 300 | 3→1 | 2 |
| 4 | - | - | - |
| 5 | - | - | - |
| 6 | - | - | - |
| 7 | 700 | 2→1 | 1 |

SET TO 1 IF NOT IDENTICAL

Fig.22D
PMM-2

| | LOCAL_LIST | COUNT | COUNT-H |
|---|---|---|---|
| 0 | - | - | - |
| 1 | 200 | 2→3 | - |
| 2 | - | - | 2 |
| 3 | 400 | 1→4 | 1 |
| 4 | - | - | - |
| 5 | 600 | 2→3 | 2 |
| 6 | 700 | 2→3 | 2 |
| 7 | - | - | - |

IF IDENTICAL

Fig.22E
PMM-3

| | LOCAL_LIST | COUNT | COUNT-H |
|---|---|---|---|
| 0 | 10 | 2→3 | 2 |
| 1 | 100 | 2→3 | 2 |
| 2 | - | - | - |
| 3 | 300 | 3→2 | 3 |
| 4 | - | - | - |
| 5 | 500 | 2→3 | 2 |
| 6 | - | - | - |
| 7 | - | - | - |

IF IDENTICAL

Fig.22F
LINE-BY-LINE CONSOLIDATION OF COUNT

| |
|---|
| 4 |
| 4 |
| 4 |
| 4 |
| 4 |
| 4 |
| 4 |
| 4 |

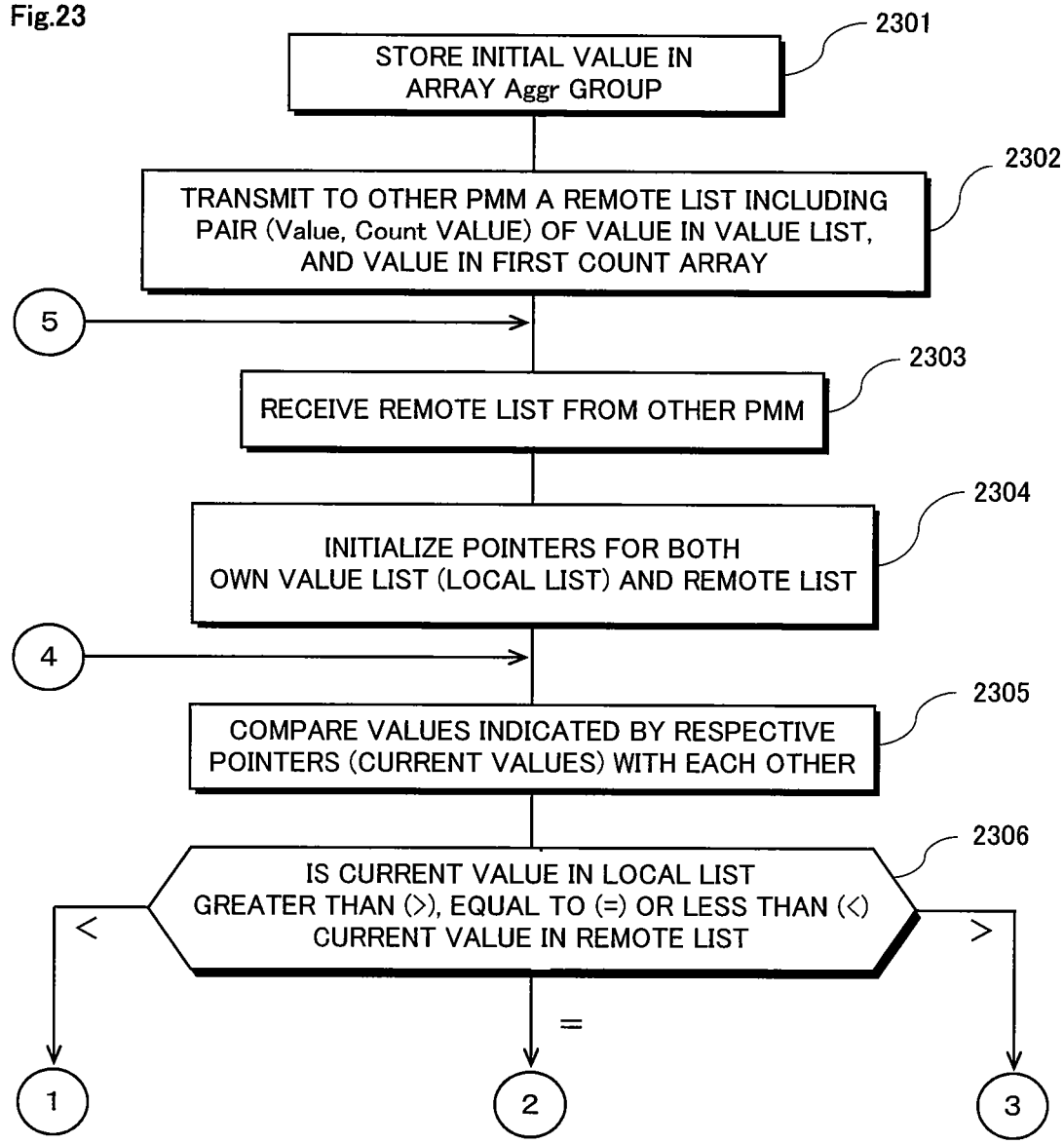

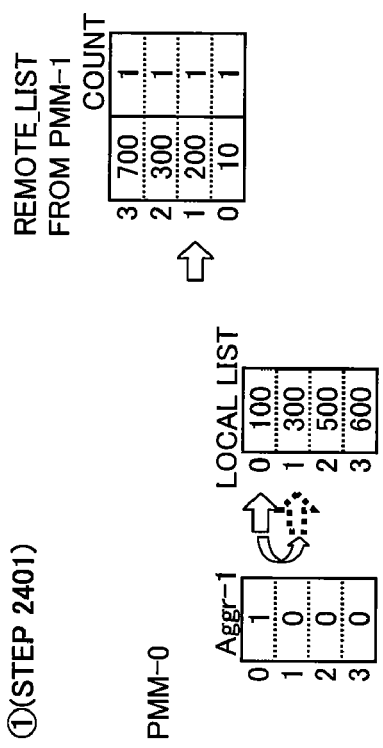
Fig.25B ①(STEP 2401)
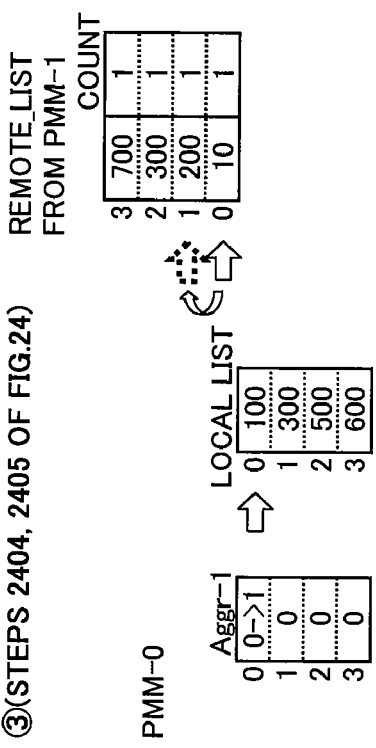
Fig.25A ③(STEPS 2404, 2405 OF FIG.24)
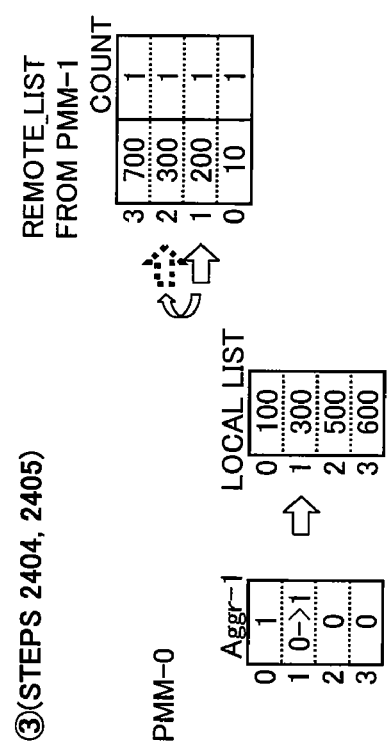
Fig.25C ③(STEPS 2404, 2405)

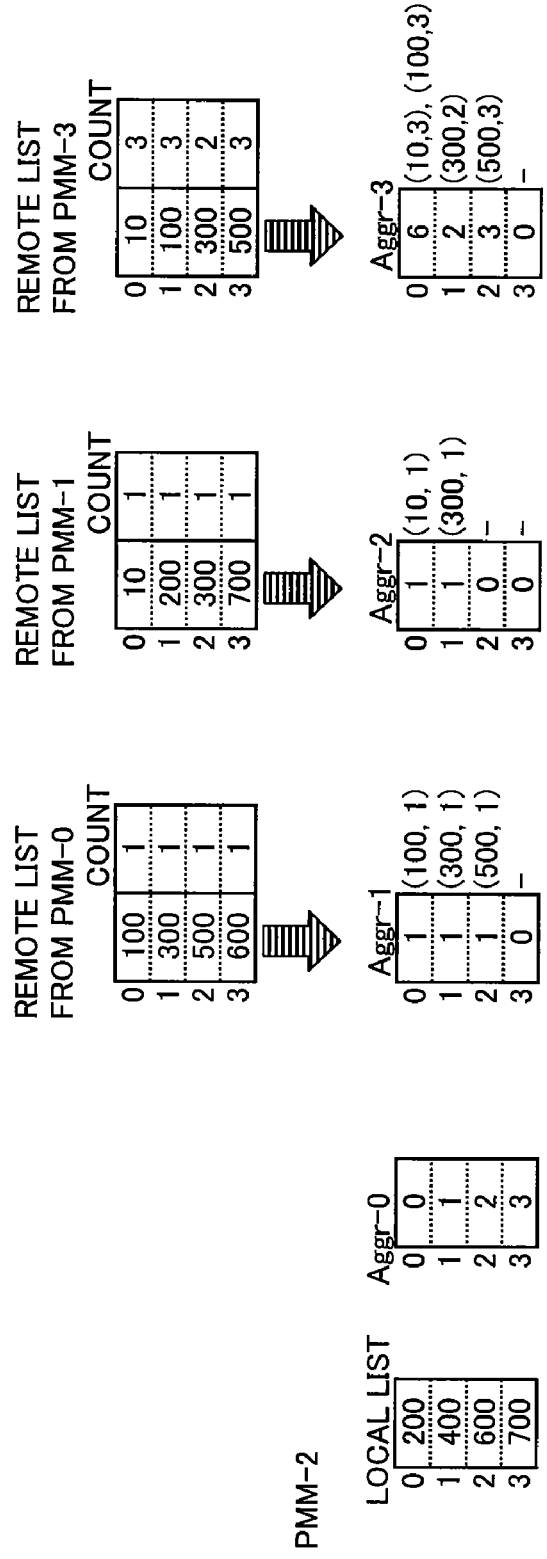
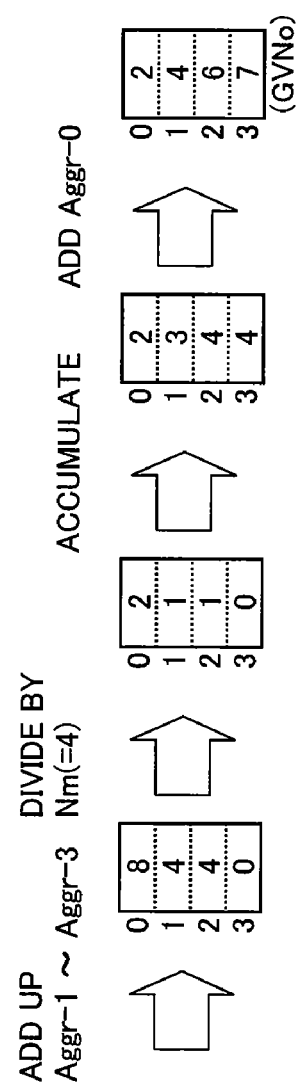
Fig.30A
Fig.30B

Fig.32A
TOTAL_LIST

| Order No. | |
|---|---|
| 0 | 10 |
| 1 | 100 |
| 2 | 200 |
| 3 | 300 |
| 4 | 400 |
| 5 | 500 |
| 6 | 600 |
| 7 | 700 (Virtual) |

(Virtual)

Fig.32B
PMM-0

| LOCAL_LIST | Order No. |
|---|---|
| 0 | – |
| 100 | 1 |
| – | – |
| 300 | 3 |
| – | – |
| 500 | 5 |
| 600 | 6 |
| – | – |

Fig.32C
PMM-1

| LOCAL_LIST | Order No. |
|---|---|
| 0 | 10 | 0 |
| – | – |
| 1 | 200 | 2 |
| 2 | 300 | 3 |
| – | – |
| – | – |
| 3 | 700 | 7 |

Fig.32D
PMM-2

| LOCAL_LIST | Order No. |
|---|---|
| – | – |
| 0 | 200 | 2 |
| – | – |
| 1 | 400 | 4 |
| – | – |
| 2 | 600 | 6 |
| 3 | 700 | 7 |

Fig.32E
PMM-3

| LOCAL_LIST | Order No. |
|---|---|
| 0 | 10 | 0 |
| 1 | 100 | 1 |
| – | – |
| 2 | 300 | 3 |
| – | – |
| 3 | 500 | 5 |
| – | – |

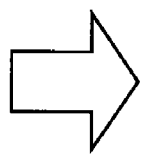

Fig.34A

| PMM-0 LOCAL LIST | |
|---|---|
| 0 | 1.21 |
| 1 | 3.21 |
| 2 | 5.21 |
| 3 | 6.21 |

| PMM-1 LOCAL LIST | |
|---|---|
| 0 | 0.21 |
| 1 | 2.21 |
| 2 | 3.21 |
| 3 | 7.21 |

| PMM-2 LOCAL LIST | |
|---|---|
| 0 | 2.21 |
| 1 | 4.21 |
| 2 | 6.21 |
| 3 | 7.21 |

| PMM-3 LOCAL LIST | |
|---|---|
| 0 | 0.21 |
| 1 | 1.21 |
| 2 | 3.21 |
| 3 | 5.21 |

Fig.34B

| PMM-0 LOCAL LIST | | Order No. |
|---|---|---|
| 1.21 | 1 | |
| 3.21 | 3 | |
| 5.21 | 5 | |
| 6.21 | 6 | |

| PMM-1 LOCAL LIST | | Order No. |
|---|---|---|
| 0 | 0.21 | 0 |
| 1 | 2.21 | 2 |
| 2 | 3.21 | 3 |
| 3 | 7.21 | 7 |

| PMM-2 LOCAL LIST | | Order No. |
|---|---|---|
| 0 | 2.21 | 2 |
| 1 | 4.21 | 4 |
| 2 | 6.21 | 6 |
| 3 | 7.21 | 7 |

| PMM-3 LOCAL LIST | | Order No. |
|---|---|---|
| 0 | 0.21 | 0 |
| 1 | 1.21 | 1 |
| 2 | 3.21 | 3 |
| 3 | 5.21 | 5 |

Fig.39A

TOTAL_LIST

| | | Aggr(ID) |
|---|---|---|
| 0 | AX | 2 |
| 1 | AZ | 4 |
| 2 | BX | 6 |
| 3 | CX | 9 |
| 4 | DX | 10 |
| 5 | EX | 12 |
| 6 | FX | 14 |
| 7 | GX | 16 |
| (Virtual) | | (Virtual) |

Fig.39B

PMM-0 LOCAL_LIST

| | | Aggr(ID) |
|---|---|---|
| 0 | – | – |
| 1 | AZ | 4 |
| 2 | – | – |
| | CX | 9 |
| | – | – |
| 2 | EX | 12 |
| 3 | FX | 14 |
| | – | – |

Fig.39C

PMM-1 LOCAL_LIST

| | | Aggr(ID) |
|---|---|---|
| 0 | AX | 2 |
| | – | – |
| 1 | BX | 6 |
| 2 | CX | 9 |
| | – | – |
| | – | – |
| 3 | GX | 16 |

Fig.39D

PMM-2 LOCAL_LIST

| | | Aggr(ID) |
|---|---|---|
| 0 | – | – |
| | – | – |
| 1 | BX | 6 |
| | DX | 10 |
| | – | – |
| 2 | FX | 14 |
| 3 | GX | 16 |

Fig.39E

PMM-3 LOCAL_LIST

| | | Aggr(ID) |
|---|---|---|
| 0 | AX | 2 |
| 1 | AZ | 4 |
| | – | – |
| 2 | CX | 9 |
| | – | – |
| 3 | EX | 12 |
| | – | – |

Fig.43A

| TOTAL_LIST | |
|---|---|
| 0 | 10 |
| 1 | 100 |
| 2 | 200 |
| 3 | 300 |
| 4 | 400 |
| 5 | 500 |
| 6 | 600 |
| 7 | 700 |

(Virtual)

Fig.43B

PMM-0

| LOCAL_LIST | | LOGICAL OR ARRAY |
|---|---|---|
| 0 | – | – |
|  | 100 | 0 |
| 1 | – | – |
|  | 300 | 0 |
| 2 | 500 | 0 |
| 3 | 600 | 0 |
|  | – | – |

OUTGOING LIST: 100, 300, 500, 600

Fig.43C

PMM-1

| LOCAL_LIST | | LOGICAL OR ARRAY |
|---|---|---|
| 0 | 10 | 0 |
|  | – | – |
| 1 | 200 | 0 |
| 2 | 300 | 1 |
|  | – | – |
|  | – | – |
| 3 | 700 | 0 |

OUTGOING LIST: 10, 200, 700

Fig.43D

PMM-2

| LOCAL_LIST | | LOGICAL OR ARRAY |
|---|---|---|
|  | – | – |
| 1 | 200 | 1 |
|  | 400 | – |
| 2 | 600 | 0 |
| 3 | 700 | 1 |
|  |  | 1 |

OUTGOING LIST: 400

Fig.43E

PMM-3

| LOCAL_LIST | | LOGICAL OR ARRAY |
|---|---|---|
| 0 | 10 | 1 |
| 1 | 100 | 1 |
|  | – | – |
| 2 | 300 | 1 |
|  | – | – |
| 3 | 500 | 1 |
|  | – | – |

OUTGOING LIST: –

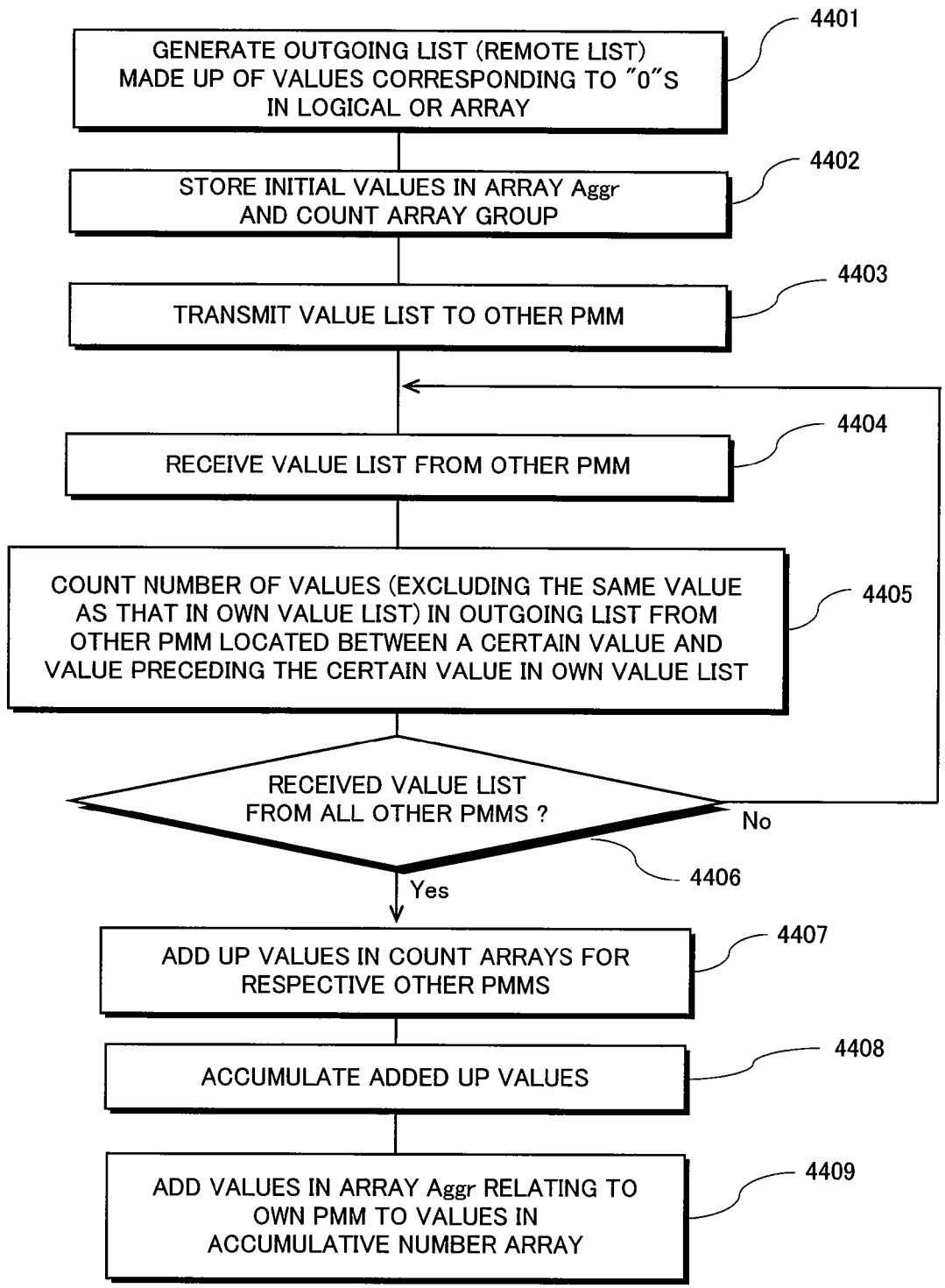

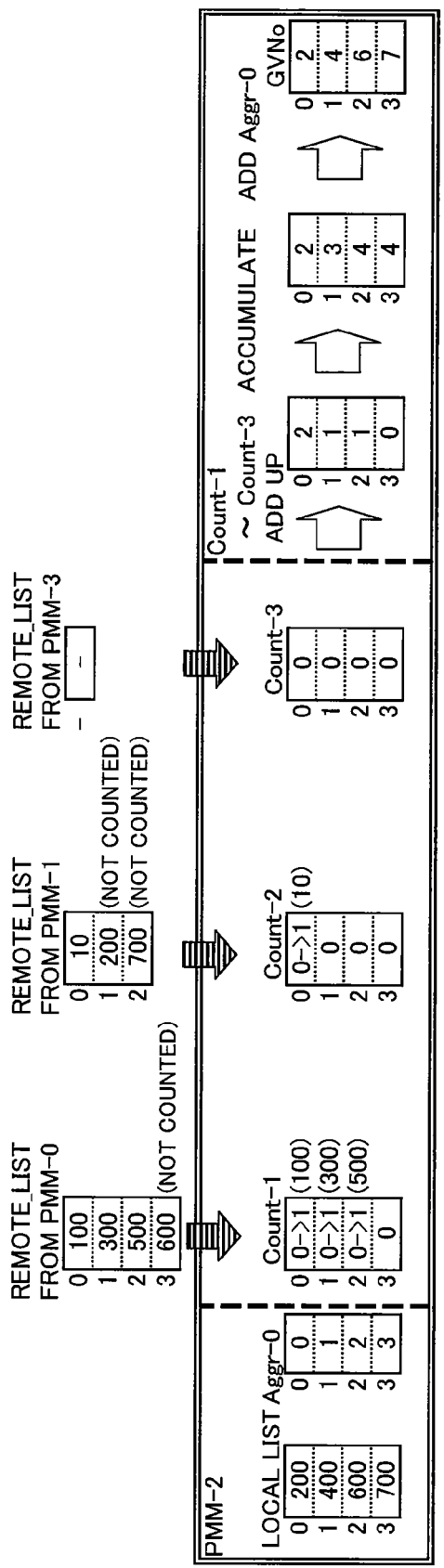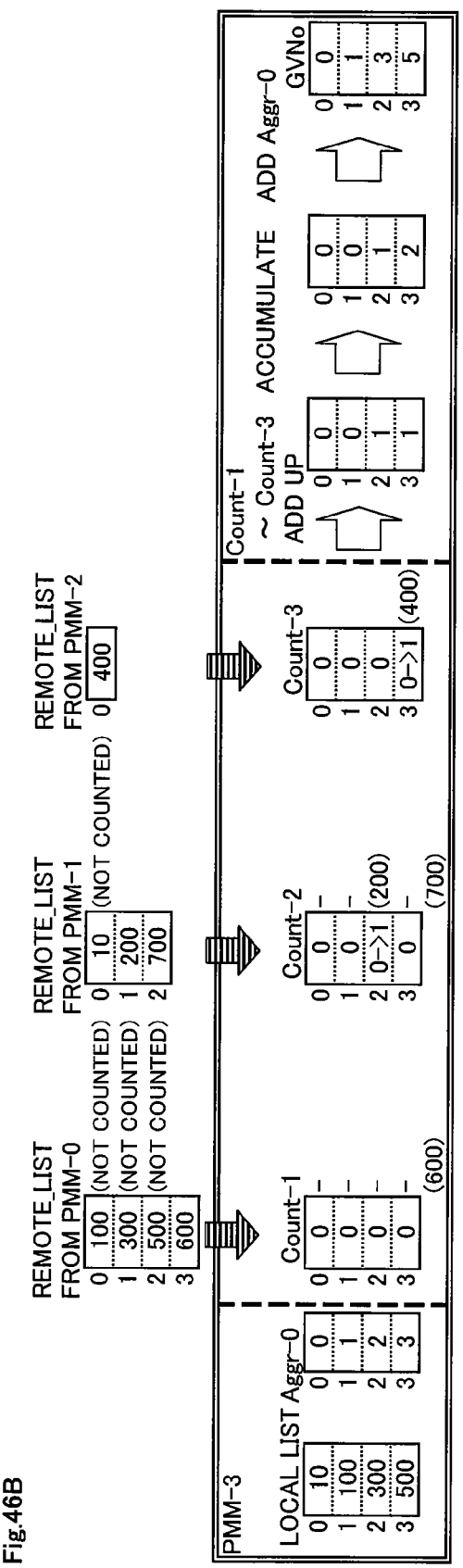
Fig.46A
Fig.46B

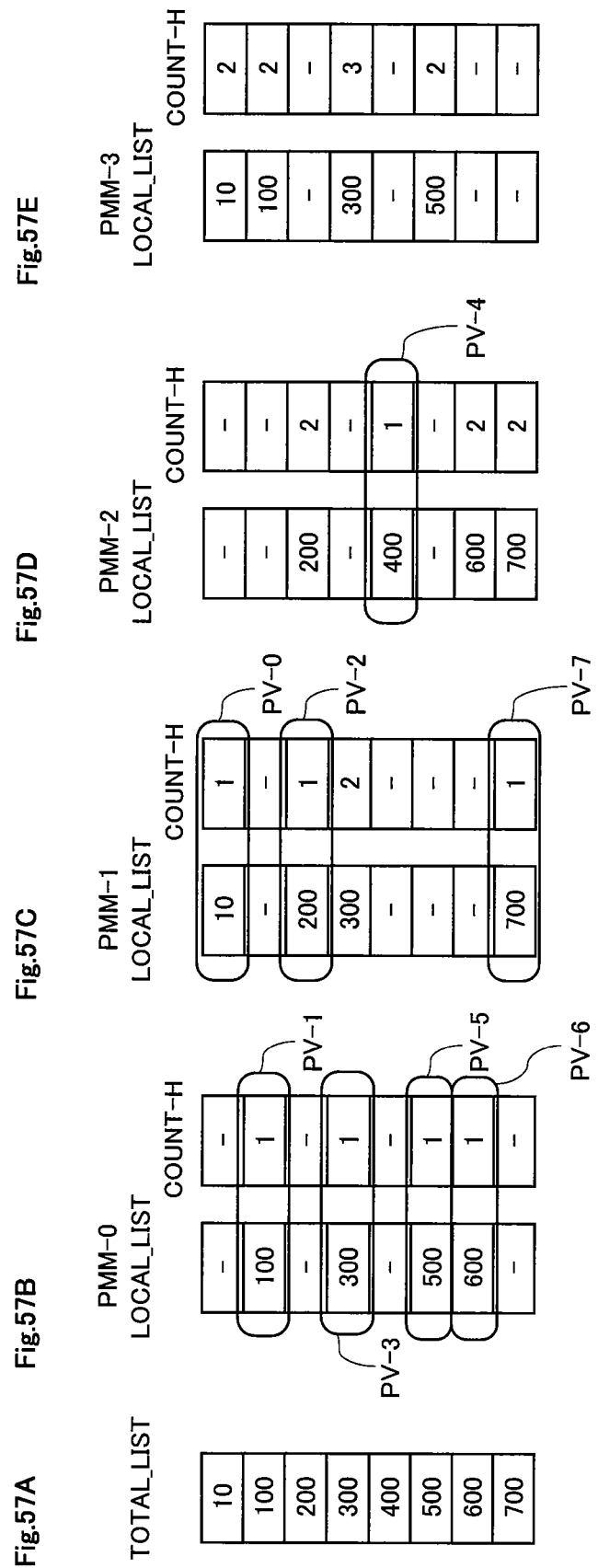

Fig.59A
TOTAL_LIST

| | |
|---|---|
| 0 | 10 |
| 1 | 100 |
| 2 | 200 |
| 3 | 300 |
| 4 | 400 |
| 5 | 500 |
| 6 | 600 |
| 7 | 700 |

Fig.59B
PMM-0 LOCAL_LIST

| LOCAL_LIST | COUNT | COUNT-H |
|---|---|---|
| - | - | - |
| 100 | 2 | 1 |
| - | - | - |
| 300 | 3 | 1 |
| - | - | - |
| 500 | 2 | 1 |
| 600 | 2 | 1 |
| - | - | - |

Fig.59C
PMM-1 LOCAL_LIST

| LOCAL_LIST | COUNT | COUNT-H |
|---|---|---|
| 10 | 2 | 1 |
| - | - | - |
| 200 | 2 | 1 |
| 300 | 3 | 2 |
| - | - | - |
| - | - | - |
| - | - | - |
| 700 | 2 | 1 |

Fig.59D
PMM-2 LOCAL_LIST

| LOCAL_LIST | COUNT | COUNT-H |
|---|---|---|
| - | - | - |
| - | 2 | 2 | ← PV-2
| 200 | - | - |
| - | 1 | 1 | ← PV-4
| 400 | - | - |
| - | - | - |
| 600 | 2 | 2 |
| 700 | 2 | 2 |

← PV-6, PV-7

Fig.59E
PMM-3 LOCAL_LIST

| LOCAL_LIST | COUNT | COUNT-H |
|---|---|---|
| 10 | 2 | 2 | ← PV-0
| 100 | 2 | 2 | ← PV-1
| - | - | - |
| 300 | 3 | 3 | ← PV-3
| - | - | - |
| 500 | 2 | 2 | ← PV-5
| - | - | - |
| - | - | - |

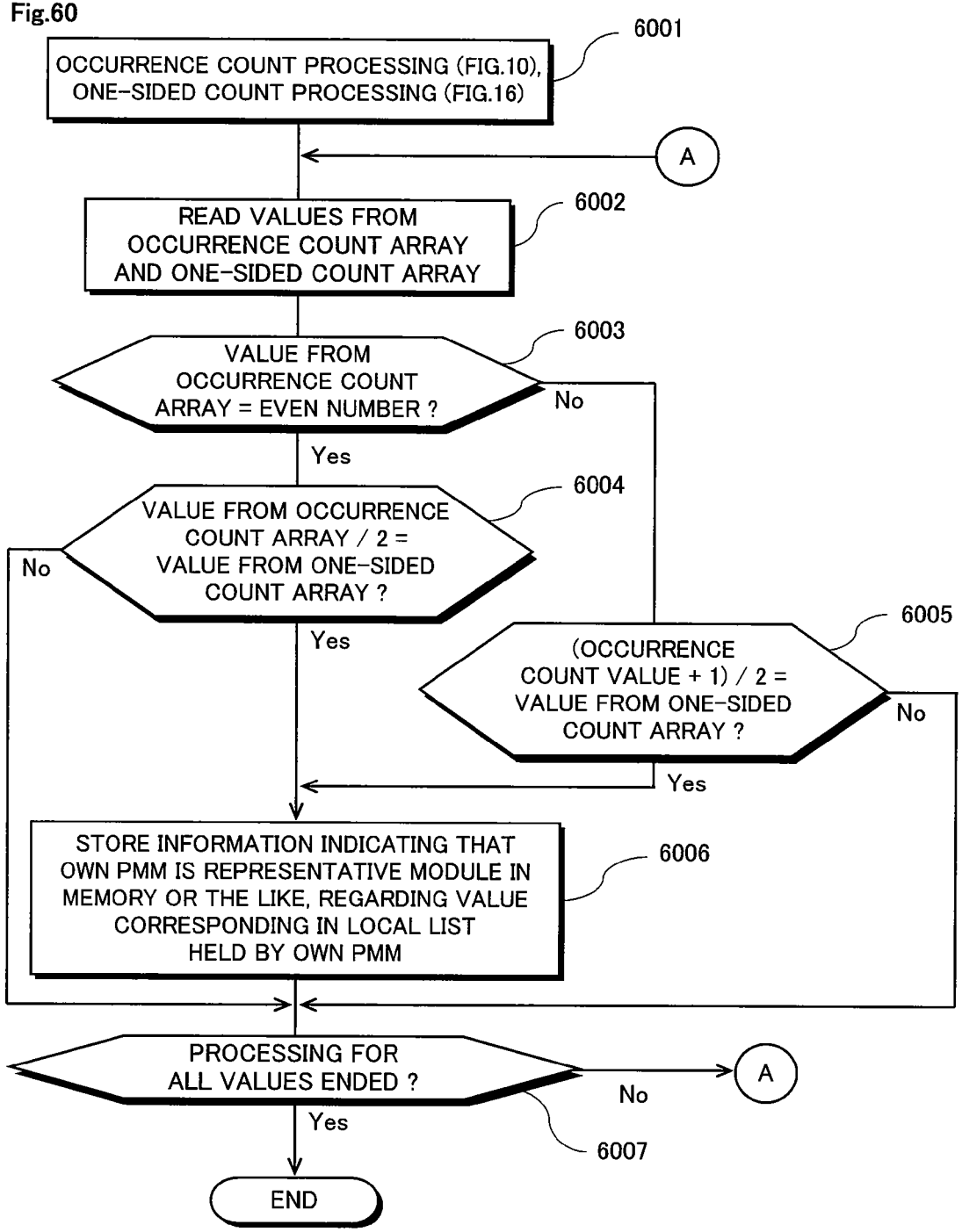

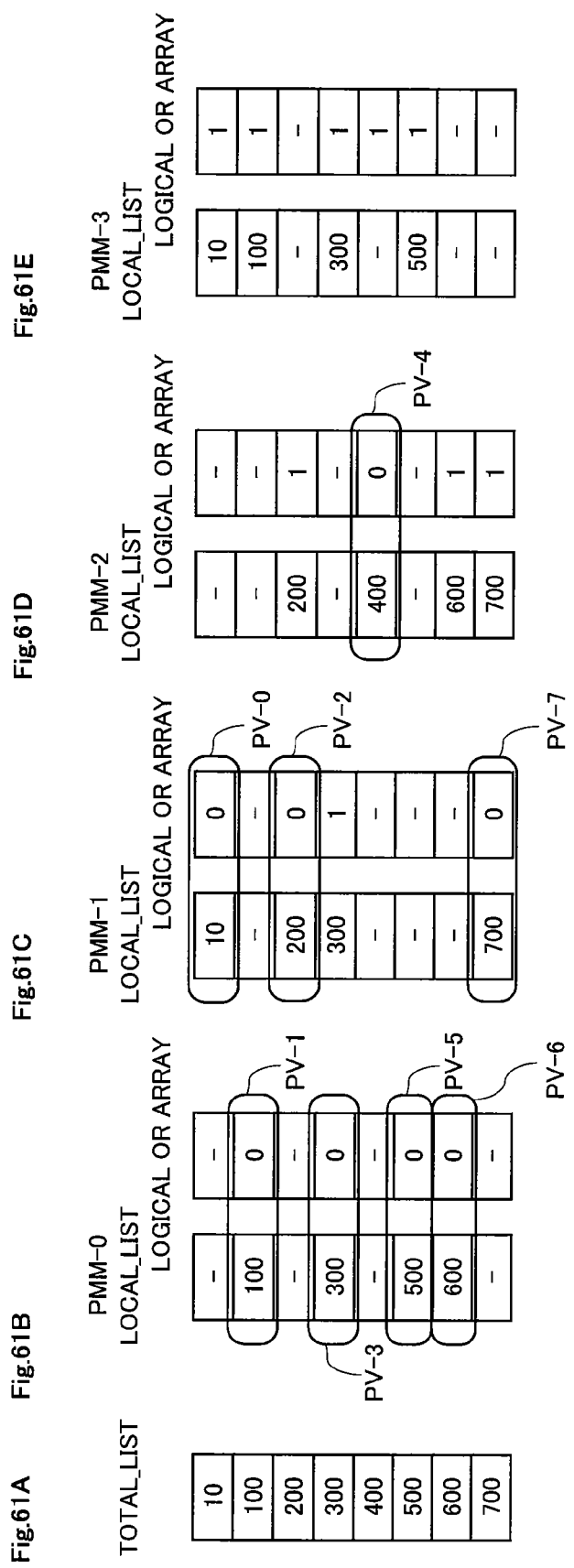

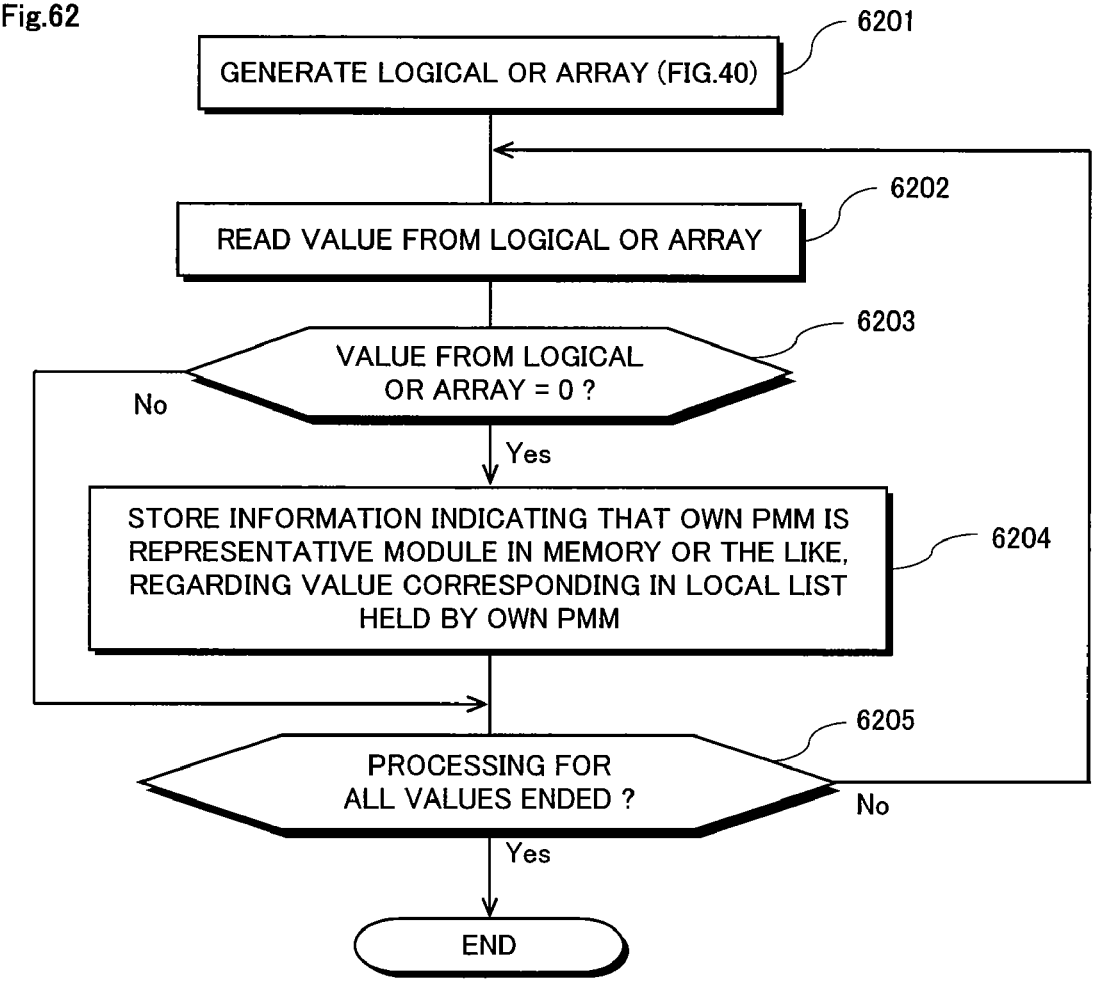

INFORMATION PROCESSING SYSTEM AND INFORMATION PROCESSING METHOD

This is a National Phase Application in the United States of International Patent Application No. PCT/JP2006/308022 filed Apr. 17, 2006, which claims priority on Japanese Patent Application No. 2005-119297, filed Apr. 18, 2005. The entire disclosures of the above patent applications are hereby incorporated by reference.

TECHNICAL FIELD

The present invention relates to an information processing system adopting parallel computer architecture capable of realizing SIMD (Single Instruction Stream, Multiple Data Stream).

BACKGROUND ART

In this age as computers have been introduced throughout society, and networks beginning with the Internet have permeated everywhere, large amounts of data have been accumulated here and there. Massive calculations are necessary for processing such large-scale data, and it is only natural to attempt to introduce parallel processing for this purpose.

Parallel processing architecture can be largely divided into "shared memory type" and "distributed memory type". The former ("shared memory type") is a method wherein multiple processors share a massive memory space. With this method, the traffic between processor group and shared memory become bottlenecked, so building a realistic system using more than one hundred processors is not simple. Accordingly, in the event of calculating the square root of one billion floating-point variables, the acceleration rate for a single CPU is 100 times at best. Empirically, around 30 times is the upper limit.

Within the latter ("distributed memory type"), each processor has a local memory, and a system is built by linking these. With this method, a hardware system can be designed wherein several hundred to several tens of thousands of processors can be built in. Accordingly, the acceleration rate for a single CPU mentioned above in the event of calculating the square root of one billion floating-point variables can be several hundred to several tens of thousands. However, even with the latter, there are several problems which will be described later.
Patent Document 1: International Publication WO00/10103 (FIG. 3 and FIG. 4)
Patent Document 2: International Publication WO2004/092948

DISCLOSURE OF INVENTION

Problems to be Solved by the Invention

First Problem Division Management of Massive Arrays
The first problem for "distributed memory type" is the problem of managing the division of data.

Massive data (in general, these are arrays so hereafter will be described as an array) cannot be contained in local memory of one processor, and necessarily are managed by division management into multiple local memory blocks. It is clear that without introducing an efficient and flexible division management mechanism, various obstacles will be amassed when developing and executing a program.

Second Problem Low Efficiency of Communication Between Processors

Upon each processor in a distributed memory type system attempting to access a massive array, the array elements of a self-held local memory can be quickly accessed, but access to the array element held by other processors require communication between processors. This communication between processors has a notably lower performance as compared to communication with a local memory, and is said to require 100 clocks at the least. Therefore, at the time of executing sorting, reference across the entire massive array is performed, and since a large amount of communication between processors occurs, performance decreases notably.

More specific descriptions will be given with regard to this problem. As of 1999, personal computers are configured as a "shared memory type", using one to several CPUs. A standard CPU used for a personal computer operates with an internal clock of 5 to 6 times the memory bus, and an automatic parallel executing function or pipeline processing function is built therein, thereby enabling processing of approximately 1 piece of data at 1 clock (memory bus).

Therefore, with a multi-processor system of a "distributed memory type", the number of processors is great, but processing speed can be 100 times slower than a single processor (shared memory type).
Third Problem: Supply of Program The third problem for "distributed memory type" is the problem of how to supply a program to a large number of processors.

With a method for loading separate programs onto an extremely large number of processors and causing coordinated operation throughout (MIMD: Multiple Instruction Stream, Multiple Data Stream), the creation, compilation, and distribution of a program requires a large load.

On the other hand, with a method for operating a large number of processors with the same program (SIMD: Single Instruction Stream, Multiple Data Stream), the freedom of programs diminishes, and situations can be imagined wherein a program bringing about desired results cannot be developed.

The present invention provides a method and computer architecture for solving the above-described first through third problems with "distributed memory type".

Now, the present inventor has proposed a configuration and processing method for obtaining a tabular-format view by forming an information block for each of fields to store tabular format data, providing a pointer array in the information block, wherein the pointer array stores a value list containing field values and values (pointer values) for specifying the value list for each of records, and sequentially identifying the pointer array and the value list from a record number (see Patent Document 1). With this configuration, as the number of records increases, the above-described value list and pointer array, in particular the point array, increases greatly. Therefore, it is desirable to divide the pointer array into multiple memory blocks so as to execute a process, such as searching, summarizing, sorting, and the like with a single instruction.

From the above-described viewpoint, the present inventor has proposed an information processing system as described in Patent Document 2, in which adjoining PMMs (processor memory modules) are connected with a packet transmission path, and each PMM has an information block made up of a value list and a pointer array in order to describe tabular-format data represented by an array of records, each record including fields and field values corresponding to the respective fields, wherein the value list contains the field values in an order of field value sequence numbers corresponding to the field values for a certain field and the pointer arrays contains pointer values for specifying the field value sequence numbers in an order of an unique ordered set array. With this information processing system, a global information block is formed by a group of information blocks held in each PMM. Also, according to Patent Document 2, various types of processing such as searching, summarizing, sorting, and the like can be realized by exchanging field value positions within the value list and the like using the packet transmission path connecting the PMMs.

Once the value list or pointer array is divided into multiple memory blocks, it is required that lists which have values without duplication arranged therein and are stored in local locations (i.e., the respective memory blocks) should be uniquely ordered across the lists (among the PMMs). Also, with any of the PMMs, based on the values within the value lists separately held by the respective PMMs, it is necessary to enable obtaining a list including values without duplication.

Even in the event of dividing a list including multiple values (a value list) with multiple PMMs, without being limited to tabular-format data, it is also required to obtain a value list including values without duplication or to enable for each PMM to recognize the order of the vale in the value list held by that PMM.

Thus, it is an object of the present invention to provide a method for uniquely ordering an ascending ordered list without duplication, at a high rate of speed, in an information processing system and information processing method of distributed memory type wherein fast parallel processing is realized by inputting/outputting elements in an array stored in various memory blocks using a single instruction and integrating the processing and communication. Also, it is an object of the present invention to provide a method for generating an ascending ordered list without duplication.

Means to Solve the Problems

The object of the present invention is achieved by an information processing system comprising a plurality of memory modules, each having a memory and a control device, and a data transmission path to interconnect the memory modules and transmit data held by any one of memory modules to other memory modules, wherein the memory of each memory module holds a value list ordered in ascending order or descending order without duplication, characterized in that the control device for each memory module of interest comprises:

data transmitting means to transmit storage values included in the value list to other memory modules;

data receiving means to receive storage values included in the value lists from the other memory modules; and representative module determining means to determine, for a storage value in the value list held by the memory module of interest, whether or not the memory module of interest is a representative module representing one or more memory modules holding the storage value based on the value lists received from the other memory modules by the data receiving means, rankings determined for the other memory modules and a ranking determined for the memory module of interest, and if the memory module of interest is the representative module, associate the storage value with information indicating that the memory module of interest is the representative module and store the information.

According to the present invention, one PMM is determined to be a representative module for each value in the value list, and in order for the PMM to store this information, any one of the memory modules can obtain a value list without duplication.

In a preferred embodiment, the representative module determining means of the memory module of interest determines that the memory module of interest is the representative module for the storage value in the value list held by the memory module of interest, if the ranking determined for the memory module of interest has a predetermined relationship with the rankings determined for one or more memory modules holding the same storage value.

In a further preferred embodiment, the rankings of the plurality of memory modules are determined by module numbers assigned to the respective memory modules, the representative module determining means generates a one-sided count array of the same size as the value list held by the memory module of interest, and stores initial values in the one-sided count array, the representative module determining means increases a value in the one-sided count array corresponding to the storage value in the value list held by the memory module of interest in order to indicate that the same storage value exists in any other memory module if the module number of the other memory module, which has transmitted the value list, is ranked at either high or low side of the module number of the memory module of interest and the storage value in the value list held by the memory module of interest exists in a value list from the other memory module, and the representative module determining means determines that the memory module of interest is the representative module for the storage value in the value list, which corresponds to a value in the one-sided count array, if the value in the one-sided count array is found to be an initial value with reference to individual values in the one-sided count array.

In another preferred embodiment, the rankings of the plurality of memory modules are determined by module numbers assigned to the respective memory modules, the representative determining means of the memory module of interest generates an occurrence count array of the same size as the value list held by the memory module of interest, and stores initial values in the occurrence count array, the representative determining means increases a value in the occurrence count array corresponding to the storage value in the value list held by the memory module of interest in order to indicate that the same storage value exists in any other memory module if the storage value in the value list held by the memory module of interest exists in the value list from the other memory module, the representative module determining means generates a one-sided count array of the same size as the value list held by the memory module of interest, and stores initial values in the one-sided count array, the representative module determining means increases a value in the one-sided count array corresponding to the storage value in the value list held by the memory module of interest in order to indicate that the same storage value exists in any other memory module if the module number of the other memory module, which has transmitted the value list, is ranked at either high or low side of the module number of the memory module of interest and the storage value in the value list held by the memory module of interest exists in a value list from the other memory module, and the representative module determining means determines that the memory module of interest is the representative module for the storage value in the value list, which corresponds to a value in the one-sided count array and a value in the occurrence count array, if the value in the one-sided count array and the corresponding value in the occurrence count array are found to be identical by comparing those values.

In yet another preferred embodiment, the rankings of the plurality of memory modules are determined by module numbers assigned to the respective memory modules, the representative determining means of the memory module of interest generates a flag array of the same size as the value list held by the memory module of interest, and stores initial values in the flag array;

the representative module determining means sets a value in the flag array corresponding to the storage value in the value list held by the memory module of interest in order to indicate that the same storage value exists in any other memory module if the module number of the other memory module, which has transmitted the value list, is ranked at either high or low side of the module number of the memory module of interest and the storage value in the value list held by the memory module of interest exists in a value list from the other memory module, and the representative module determining means determines that the memory module of interest is the representative module for the storage value in the value list, which corresponds to a value in the flag array, if the value in the flag array is found to be an initial value with reference to the individual values in the flag array.

Also, the object of the present invention is achieved by the above-described information processing system characterized in that the information processing system further comprises:

outgoing list array generating means to generate an outgoing list array including a storage value, to which information indicating that the memory module of interest is a representative module for the storage value has been attached, in a value list held by the memory module of interest; and order computing means to compute orders of storage values in the value list held by the memory module of interest, based on the storage values contained in the outgoing list arrays of other memory modules, which have been transmitted from the data transmitting means of the other memory modules and received by the data receiving means of the memory module of interest.

According to the present invention, each memory module can obtain orders of the respective storage values in the value list held by each memory module taking into consideration the storage values in the value lists from other memory modules.

In a further preferred embodiment, the order computing means of the memory module of interest determines the number of storage values that are contained in the outgoing arrays from the other memory modules and are ordered between adjacent storage values in the value list held by the memory module of interest, and computes the orders of the respective storage values based on the determined number of the storage values.

The object of the present invention is also achieved by an information processing system comprising a plurality of memory modules, each having memory and a control device, wherein each memory module has been assigned its own ranking, and a data transmission path to interconnect the memory modules and transmit data held by a given memory module to other memory modules, wherein the memory of each memory module holds a value list having values ordered in ascending order or descending order without duplication, characterized in that the control device of each memory module of interest comprises:

data transmitting means to transmit storage values included in the value list to other memory modules;

data receiving means to receive storage values included in the value lists from the other memory modules;

occurrence count array generating means to complete an occurrence count array by generating an occurrence count array of the same size as the value list held by the memory module of interest, storing initial values in the occurrence count array, and increasing a value in the occurrence count array corresponding to the storage value in the value list held by the memory module of interest in order to indicate that the same storage value exists in any other memory module if the storage value in the value list held by the memory module of interest exists in the value list from the other memory module;

one-sided count array generating means to complete a one-sided count array by generating the one-sided count array of the same size as the value list held by the memory module of interest, storing initial values in the one-sided count array, and increasing a value in the one-sided count array corresponding to the storage value in the value list held by the memory module of interest in order to indicate that the same storage value exists in any other memory module if the module number of the other memory module, which has transmitted the value list, is ranked at either high or low side of the module number of the memory module of interest and the storage value in the value list held by the memory module of interest exists in a value list from the other memory module;

outgoing list array generating means to complete an outgoing list array by generating the outgoing list array of the same size as the value list held by the memory module of interest to be transmitted to the other memory modules, comparing corresponding values in the occurrence count array and the one-sided count array, and if both values are identical, storing a first value, which specifies that the memory module of interest is the highest or lowest ranked memory module among the memory modules holding the same storage value, in the outgoing list array, otherwise storing a second value other than the first value in the outgoing list array; and order computing means to compute orders of the storage values in the value list held by the memory module of interest based on the value lists and the outgoing list arrays from the other memory modules, which have been transmitted from the data transmitting modules of the respective memory modules and have been received by the data receiving means of the memory module of interest.

In a preferred embodiment, the order computing means specifies the storage value in the value list from the other memory module, which is ordered between adjacent storage values in the value list held by the memory module of interest, determines the number of storage values in the value lists from the other memory modules, which are ordered between the adjacent storage values, based on a sum of values in the outgoing list arrays corresponding to the storage values in the value lists, and computes orders of the respective storage values based on the determined number.

Also, the object of the present invention is achieved by an information processing system comprising a plurality of memory modules, each having a memory and a control device, and a data transmission path to interconnect the memory modules and transmit data held by a given memory module to other memory modules, wherein the memory of each memory module holds a value list having values ordered in ascending order or descending order without duplication, characterized in that the control device of each memory module of interest comprises:

data transmitting means to transmit storage values included in the value list to other memory modules;

data receiving means to receive storage values included in the value lists from the other memory modules;

occurrence count array generating means to complete an occurrence count array by generating an occurrence count array of the same size as the value list held by the memory module of interest, storing initial values in the occurrence count array, and increasing a value in the occurrence count array corresponding to the storage value in the value list held by the memory module of interest in order to indicate that the same storage value exists in any other memory module if the storage value in the value list held by the memory module of interest exists in the value list from the other memory module; and order computing means to compute orders of the storage values in the value list held by the memory module of interest based on the value lists and the occurrence count arrays from the other memory modules, which have been transmitted from the data transmitting modules of the respective memory modules and have been received by the data receiving means of the memory module of interest.

In a preferred embodiment, the order computing means specifies the storage values in the value lists from the other memory modules, which are ordered between adjacent storage values in the value list held by the memory module of interest, determines the number of the storage values in the value lists from the other memory modules by accumulating reciprocal values of the values in the occurrence count arrays corresponding to the respective storage values in the value lists from the other memory modules, and computes orders of the respective storage values in the value list held by the memory module of interest based on the determined number.

Also, the object of the present invention is achieved by an information processing system comprising a plurality of memory modules, each having a memory and a control device, and a data transmission path to interconnect the memory modules and transmit data held by a given memory module to other memory modules, wherein the memory of each memory module holds a value list having values ordered in ascending order or descending order without duplication, characterized in that the control device of each memory module of interest comprises:

data transmitting means to transmit storage values included in the value list to other memory modules;

data receiving means to receive storage values included in the value lists from the other memory modules; and integer array generating means to determine the number of the storage values which are contained in the value lists from the other memory modules and ordered between adjacent storage values based on the storage values in the value lists from the other memory modules, which have been transmitted from the data transmitting means of the other memory modules and received by the data receiving means of the memory module of interest, and generate an array of integers assigned to the respective storage values in the value list held by the memory module of interest with consideration for the value lists from the other memory modules based on the determined number of the storage values, wherein the integers have a fixed order, but are not necessarily consecutive.

According to the present invention, even in the event that the storage values in the value list are a character string type, a floating-point type, or a combination of various types of values, ordered integers can be assigned to the respective storage values.

The object of the present invention is achieved by an information processing method in an information processing system comprising a plurality of memory modules, each having a memory and a control device, and a data transmission path to interconnect the memory modules and transmit data held by any one of memory modules to other memory modules, wherein the memory of each memory module holds a value list ordered in ascending order or descending order without duplication and the method is executed by the control device of each memory module, characterized in that the method comprises:

a data transmitting step of transmitting storage values included in the value list to other memory modules, a data receiving step of receiving storage values included in the value lists from the other memory modules, and representative module determining step of determining, for a storage value in the value list held by the memory module of interest, whether or not the memory module of interest is a representative module representing one or more memory modules holding the storage value based on the value lists received from the other memory modules in the data receiving step, rankings determined for the other memory modules and a ranking determined for the memory module of interest, and if the memory module of interest is the representative module, associating the storage value with information indicating that the memory module of interest is the representative module and store the information.

In a preferred embodiment, the representative module determining step includes a step of determining that the memory module of interest is the representative module for the storage value in the value list held by the memory module of interest, if the ranking determined for the memory module of interest has a predetermined relationship with the rankings determined for one or more memory modules holding the same storage value.

In a further preferred embodiment, the rankings of the plurality of memory modules are determined by module numbers assigned to the respective memory modules, the representative module determining step includes:

a step of generating a one-sided count array of the same size as the value list held by the memory module of interest, and storing initial values in the one-sided count array, a step of increasing a value in the one-sided count array corresponding to the storage value in the value list held by the memory module of interest in order to indicate that the same storage value exists in any other memory module if the module number of the other memory module, which has transmitted the value list, is ranked at either high or low side of the module number of the memory module of interest and the storage value in the value list held by the memory module of interest exists in a value list from the other memory module, and a step of determining that the memory module of interest is the representative module for the storage value in the value list, which corresponds to a value in the one-sided count array, if the value in the one-sided count array is found to be an initial value with reference to individual values in the one-sided count array.

In another preferred embodiment, the rankings of the plurality of memory modules are determined by module numbers assigned to the respective memory modules, the representative determining step includes:

a step of generating an occurrence count array of the same size as the value list held by the memory module of interest, and storing initial values in the occurrence count array, a step of increasing a value in the occurrence count array corresponding to the storage value in the value list held by the memory module of interest in order to indicate that the same storage value exists in any other memory module if the storage value in the value list held by the memory module of interest exists in the value list from the other memory module, a step of generating a one-sided count array of the same size as the value list held by the memory module of interest, and storing initial values in the one-sided count array, a step of increasing a value in the one-sided count array corresponding to the storage value in the value list held by the memory module of interest in order to indicate that the same storage value exists in any other memory module if the module number of the other memory module, which has transmitted the value list, is ranked at either high or low side of the module number of the memory module of interest and the storage value in the value list held by the memory module of interest exists in a value list from the other memory module, and a step of determining that the memory module of interest is the representative module for the storage value in the value list, which corresponds to a value in the one-sided count array and a value in the occurrence count array, if the value in the one-sided count array and the corresponding value in the occurrence count array are found to be identical by comparing those values.

In yet another preferred embodiment, the rankings of the plurality of memory modules are determined by module numbers assigned to the respective memory modules, the representative determining step includes:

a step of generating a flag array of the same size as the value list held by the memory module of interest, and storing initial values in the flag array;

a step of setting a value in the flag array corresponding to the storage value in the value list held by the memory module of interest in order to indicate that the same storage value exists in any other memory module if the module number of the other memory module, which has transmitted the value list, is ranked at either high or low side of the module number of the memory module of interest and the storage value in the value list held by the memory module of interest exists in a value list from the other memory module, and a step of determining that the memory module of interest is the representative module for the storage value in the value list, which corresponds to a value in the flag array, if the value in the flag array are found to be an initial value with reference to the individual values in the flag array.

Also, the object of the present invention is achieved by the above-described method characterized in that the method further comprises:

an outgoing list array generating step of generating an outgoing list array including a storage value, to which information indicating that the memory module of interest is a representative module for the storage value has been attached, in a value list held by the memory module of interest; and an order computing step of computing orders of storage values in the value list held by the memory module of interest, based on the storage values contained in the outgoing list arrays of other memory modules, which have been transmitted from the data transmitting means of the other memory modules and received by the data receiving means of the memory module of interest.

In a preferred embodiment, the order computing step includes a step of determining the number of storage values that are contained in the outgoing arrays from the other memory modules and are ordered between adjacent storage values in the value list held by the memory module of interest, and computing the orders of the respective storage values based on the determined number of the storage values.

The object of the present invention is also achieved by an information processing method in an information processing system comprising a plurality of memory modules, each having memory and a control device, wherein each memory module has been assigned its own ranking, and a data transmission path to interconnect the memory modules and transmit data held by a given memory module to other memory modules, wherein the memory of each memory module holds a value list having values ordered in ascending order or descending order without duplication, and the method is executed by the control device of each memory module, characterized in that the method comprises:

a data transmitting step of transmitting storage values included in the value list to other memory modules;

a data receiving step of receiving storage values included in the value lists from the other memory modules;

an occurrence count array generating step of completing an occurrence count array by generating an occurrence count array of the same size as the value list held by the memory module of interest, storing initial values in the occurrence count array, and increasing a value in the occurrence count array corresponding to the storage value in the value list held by the memory module of interest in order to indicate that the same storage value exists in any other memory module if the storage value in the value list held by the memory module of interest exists in the value list from the other memory module;

a one-sided count array generating step of completing a one-sided count array by generating the one-sided count array of the same size as the value list held by the memory module of interest, storing initial values in the one-sided count array, and increasing a value in the one-sided count array corresponding to the storage value in the value list held by the memory module of interest in order to indicate that the same storage value exists in any other memory module if the module number of the other memory module, which has transmitted the value list, is ranked at either high or low side of the module number of the memory module of interest and the storage value in the value list held by the memory module of interest exists in a value list from the other memory module;

an outgoing list array generating step of completing an outgoing list array by generating the outgoing list array of the same size as the value list held by the memory module of interest to be transmitted to the other memory modules, comparing corresponding values in the occurrence count array and the one-sided count array, and if both values are identical, storing a first value, which specifies that the memory module of interest is the highest or lowest ranked memory module among the memory modules holding the same storage value, in the outgoing list array, otherwise storing a second value other than the first value in the outgoing list array; and an order computing step of computing orders of the storage values in the value list held by the memory module of interest based on the value lists and the outgoing list arrays from the other memory modules, which have been transmitted in the data transmitting step and have been received in the data receiving step.

In a preferred embodiment, the order computing step includes step of specifying the storage value in the value list from the other memory module, which is ordered between adjacent storage values in the value list held by the memory module of interest, determining the number of storage values in the value lists from the other memory modules, which are ordered between the adjacent storage values, based on a sum of values in the outgoing list arrays corresponding to the storage values in the value lists, and computing orders of the respective storage values based on the determined number.

Also, the object of the present invention is achieved by an information processing method in an information processing system comprising a plurality of memory modules, each having a memory and a control device, and a data transmission path to interconnect the memory modules and transmit data held by a given memory module to other memory modules, wherein the memory of each memory module holds a value list having values ordered in ascending order or descending order without duplication and the method is executed by the control device of each memory module, characterized in that the method comprises:

a data transmitting step of transmitting storage values included in the value list to other memory modules;

a data receiving step of receiving storage values included in the value lists from the other memory modules;

an occurrence count array generating step of completing an occurrence count array by generating an occurrence count array of the same size as the value list held by the memory module of interest, storing initial values in the occurrence count array, and increasing a value in the occurrence count array corresponding to the storage value in the value list held by the memory module of interest in order to indicate that the same storage value exists in any other memory module if the storage value in the value list held by the memory module of interest exists in the value list from the other memory module; and an order computing step of computing orders of the storage values in the value list held by the memory module of interest based on the value lists and the occurrence count arrays from the other memory modules, which have been transmitted in the data transmitting step and have been received in the data receiving step.

In a preferred embodiment, the order computing step includes a step of specifying the storage values in the value lists from the other memory modules, which are ordered between adjacent storage values in the value list held by the memory module of interest, determining the number of the storage values in the value lists from the other memory modules by accumulating reciprocal values of the values in the occurrence count arrays corresponding to the respective storage values in the value lists from the other memory modules, and computing orders of the respective storage values in the value list held by the memory module of interest based on the determined number.

Also, the object of the present invention is achieved by an information processing method in an information processing system comprising a plurality of memory modules, each having a memory and a control device, and a data transmission path to interconnect the memory modules and transmit data held by a given memory module to other memory modules, wherein the memory of each memory module holds a value list having values ordered in ascending order or descending order without duplication and the method is executed by the control device of each memory module, characterized in that the method comprises:

a data transmitting step of transmitting storage values included in the value list to other memory modules;

a data receiving step of receiving storage values included in the value lists from the other memory modules; and an integer array generating step of determining the number of the storage values which are contained in the value lists from the other memory modules and ordered between adjacent storage values based on the storage values in the value lists from the other memory modules, which have been transmitted in the data transmitting step of the other memory modules and received in the data receiving step of the memory module of interest, and generating an array of integers assigned to the respective storage values in the value list held by the memory module of interest with consideration for the value lists from the other memory modules based on the determined number of the storage values, wherein the integers have a fixed order, but are not necessarily consecutive.

ADVANTAGES OF THE INVENTION

According to the present invention, in a distributed memory type information processing system and information processing method achieving a significantly faster parallel processing by inputting/outputting elements of an array stored in various types of memory with a single instruction and integrating processing and communication, it is possible to provide a scheme for fast and uniquely ordering an ascending ordered list without duplication. Furthermore, according to the present invention, it is possible to provide a scheme for generating an ascending ordered list without duplication.

BEST MODE FOR CARRYING OUT THE INVENTION

[Hardware Configuration]

Hereafter, embodiments of the present invention will be described with reference to the attached drawings. FIG. 1 is a block diagram illustrating the schematics of an information processing system according to an embodiment of the present invention. As shown in FIG. 1, with this embodiment, the information processing system has multiple memory modules with processors (hereafter called "PMM") 12-0, 12-1, 12-2, ..., which are connected by a transmission path such as a bus or network. For example, in FIG. 1, PMM 12-0 is connected by transmission paths to at least each of the other PMM 12-1 through 12-3. Other PMMs are similarly connected by transmission paths to the three PMMs other than itself.

FIG. 2 is a diagram showing an example of the configuration of the PMM 12. As shown in FIG. 2, the PMM 12 has a control circuit 20 for controlling memory access, computation executing and the like according to commands, a bus interface (I/F) 22, and memory 24.

The memory 24 has multiple banks BANK 0, 1, . . . , n (reference numeral 26-0, . . . , n), each of which can store predetermined arrays to be described later.

Also, the control circuit 20 can send and receive data to and from other external computers and so forth. Also, an arrangement may be made wherein another computer can access a desired bank of the memory with bus arbitration.

In FIG. 1, components (receiving processing units) for executing the processing to receive data from the transmission path in a PMM are represented by triangles. These receiving processing units equate to a bus interface 22 in FIG. 2. In order to best improve the parallelism of processing with each PMM, the number of receiving processing units is desirable to be (number of PMM-1). Also, although not shown in FIG. 1, the PMM has a transmitting processing unit for transmitting data to other PMMN via the transmission paths. This transmitting processing unit also equates to the bus interface in FIG. 2. With the example shown in FIG. 1, four PMMs are shown, so if there are three receiving processing units of a PMM this is sufficient, but as will be described below, four receiving processing units are provided so as to enable receiving data from yet other PMMs.

In the event that the system has a large number of PMMs (for example, 128, 256, and so forth), it is not realistic that the number of receiving processing units included in for each PMM is just (number of PMM-1) receiving processing units. Thus, as shown in FIG. 47 and FIG. 48, for example, four PMMs are considered to be one group (for example, see reference numerals 4700-1, 4700-2, 4700-n). Transmission paths (for example, see reference numeral 4710) are also provided for data communication between groups.

Between PMMs in the same group, by each of the three receiving processing units of the one PMM being able to receive data from the other PMMs, complete parallelism is secured, and a configuration can be made wherein the one remaining receiving processing unit of the PMM can receive data from another group.

Of course, the connections shown in FIGS. 1, 47, 48 are only an example, and other modes (for example, ring-shape and bus-like) of connection between the PMMs can be used. It is noted that, as the number of other PMMs from which data can be simultaneously received increases, the degree of parallelism increases, realizing processing with greater speed.

[Storage Configuration of Data]

FIG. 3 is an example of tabular-format data. Thus, with the data in a tabular format, values are given for each type of field (in this example, "sex", "age", "height", and "weight") for each record. With an information processing device according to the present embodiment, this tabular-format data is, in principle, kept based on data format as shown in FIG. 4.

As shown in FIG. 4, record numbers are distributed for each order number in the array OrdSet of an order set. In this example, all records are to be represented; therefore the order number and the record number are identical.

For example, with regard to sex, the tabular-format data is represented by a value list VL and a pointer array VNO, wherein the value list have values of "male" or "female" serving as the actual field values sorted in a predetermined order and wherein the pointer array VNo to the value list contains location numbers in the value list indicated by the recording numbers corresponding to the respective elements (for example, record numbers) within the array OrdSet of the order set. This combination of the value list VL and the pointer array VNo can also be called "information block" (the information block relating to sex corresponds to reference numeral 401).

By specifying the value in the pointer array VNo in a position indicated by the element (record number) within the array OrdSet of the order set, and further, by removing the field value in the value list VL at the position indicated by such value, the field value corresponding to the record number can be obtained. Information blocks for other fields also have similar configurations.

If a single memory (defined as meaning a single address space for access despite one or more physical entities) is used, it suffices for a single computer to store in the memory an array OrdSet for ordered set and a value list VL and pointer array VNo constituting each information block. In order to maintain a large number of records, however, it is desirable to distribute the information, since the required memory size increases in response to the record size. Also, from the viewpoint of parallelism of processing, it is desirable to separately manage the distributed information.

[Obtaining Value List without Duplication: Selection Processing of Representative Module]

In order to distribute the data across multiple PMMs and to make these usable, it is necessary for a value list without duplication to be obtainable, and for the order of the respective storage values stored in the value list with consideration for all of the PMMs to be recognized in each PMM. First, description will be made regarding obtaining of a value list with no duplication. Note that "value list" refers to a list including one or more storage values. For example the value list VL is also a "value list", and a pointer array VNo can also be a "value list".

In an example in FIG. 5, it is assumed that tabular-format data including a predetermined number of records are stored in four PMMs (PMM-0 through PMM-3). In this example, a series of data relating to record numbers 0 through 2, a series of data relating to record numbers 3 and 4, a series of data relating to record numbers 5 through 7, and a series of data relating to record numbers 8 and 9 are each stored. With each PMM, such a portion of the above-mentioned tabular-format data is stored in the format of an information block.

With the present embodiment, a pointer array VNo to the value list and a value list VL for each field are provided for each PMM. FIG. 6 and FIG. 7 are diagrams showing examples of an array when dividing the tabular-format data shown in FIG. 5 within the respective PMM-0 through PMM-3.

As shown in FIGS. 6 and 7, a partial set of the information block for each field and the like is stored in each PMM. For example, in FIG. 6, with the information block 601 of field "sex", a partial set VNo (this is also called a "pointer array") of the original pointer array VNo (see FIG. 4) and a partial set VL (this is also called a "value list") of the original value list VL (see FIG. 4) are included.

The number of elements in the pointer array VNo matches the number of records shared by the PMMs. Conversely, with the value list VL, only the values indicated by the pointer array VNo are extracted. Regarding the field "sex", the values in the pointer array VNo indicate all of the elements (field values) of the value list VL, so therefore the value list VL and the original value list VL are identical. On the other hand, it will be appreciated that with the fields "age", "height", and "weight", only the values indicated by the elements in the pointer array are taken out from the original value list VL as a partial set of the original value list VL.

Further, with divided and held information block, as the elements of the value list VL (field values) are appropriately indicated in each PMM by the elements of the pointer array VNo, i.e. so that consistency is maintained also with local processing within the PMM (specifying pointer values or specifying field values), the elements thereof are converted from the elements of the original corresponding pointer array VNo.

In the examples shown in FIGS. 6 and 7, the PMM-1 has the value "16" when referencing the value list VL for the field "age", and PMM-2 also has the value "16" when referencing the value list VL for the field "age". With other fields also, similarly, multiple PMMs can of course have the same value (for example, the PMM-0 can have the value "55" in the value list for the field "weight", whereas the PMM-2 can also have the value "55" in the value list VL for the field "weight").

Each PMM does not know what values are held in the value lists of the other PMMs. Also, as described above, in the case that multiple PMMs have the same value, each PMM cannot know which PMM has the same value as the value stored in the value list of each PMM. Accordingly, in a state such as that shown in FIGS. 6 and 7, with any of the PMMs, or with other PMMs connected to any of the PMMs via a transmission path, there has been the problem of difficulty in obtaining an entire value list. Thus, it is desirable that a PMM which holds the divided value list is yielded to obtain a value list without duplication by transmitting/receiving data as least as possible. For example, in FIGS. 6 and 7, with regard to the field "age", a value list without duplication (corresponding to a value list VL with regard to the field "age" in FIG. 4) can be obtained based on the values in the value list VL held in each PMM.

As described above, in order to obtain a value list without duplication, it is sufficient that information is generated to indicate, with regard to each value within the value list, which PMM holds the value that represents such value, that is to say, which PMM is a representative module that holds such value, and the PMM holding a representative value (representative module) should hold this information. In the example in FIGS. 6 and 7, with regard to a value of "18" for the field of "age", it is determined whether the PMM-0 holds the representative value, or whether the PMM-3 holds the representative value by data exchange between PMMs, and for example in the case that the PMM-0 is determined to be the representative module, the PMM-0 only needs to hold the information indicating that the PMM-0 holds the representative value of the value "18" (for example, a flag associated with the value "18" of the value list VL).

The selection processing of a representative module is partially equivalent to a processing flow of a process for recognizing an order of a value as described below. Accordingly, following the description of a compiling process which includes the process for recognizing the order of the value, the selection processing for the representative module will be described again.

[Compiling Process]

A process (compiling process) for distributing data across a plurality of PMMs and enabling the data to be available will be considered below.

As shown in FIG. 6 and FIG. 7, it is assumed that a value list VL is divided and held by multiple PMMs (for example, PMM-0 through PMM-3). For a divided and held information block, the values list contains only necessary elements (field values) in the divided and held information block. Accordingly, consistency of local processing is maintained by a pointer array VNo and the value list VL. However, in order to maintain consistency of processing among the PMMs, a position of an element (field value) in the value list VL held by each PMM within the entire value list, a rank of each field value in a predetermined order within the entire value list, or the order of the field values need to be understood. Thus, in the present embodiment, for each information block to be divided and held, a global value number array GVNo is provided, such that the numbers indicating the order of values corresponding to the field values can be stored. Processing for computing the order of field values such as this will be described below.

Note that with the present embodiment, an offset value (OFFSET) for dividing and holding the partial set of the information block described above is assigned to each PMM. This offset value OFFSET corresponds to the leading value in an original order set OrdSet relating to the record divided and held by the PMM. Also, in order to maintain local processing consistency in each PMM, a new order set OrdSet is created in each PMM. The number of elements in the order set OrdSet is identical to the number of records divided and held by the PMM. On the other hand, in order to maintain processing consistency among the PMMs, it is necessary for each PMM to know which sequence number in all of numbers (elements of the order set) is provided to the record divided and held by each PMM. For this purpose, a global order set array GOrd is provided, which stores the sequence number in all of numbers for each record overall.

FIG. 8 is a flowchart schematically illustrating a compiling process according to the present embodiment. As shown in FIG. 8, first, the initial information block shown in FIG. 6 and FIG. 7 is generated at each PMM (step 801). This can be realized by another external computer providing the order set OrdSet, as well as, pointer array VNo, value list VL, and offset value OFFSET, which forms each information block, each of which are to be divided and held, to the PMMs, and these arrays being stored in a storage device such as memory in the PMM. These arrays are stored in the memory 24 within each PMM. Note that with the processing hereafter, the array is generated within a storage device such as the memory 24. Also, in the case of higher-speed processing, an array may be generated in a register.

In step 802 and thereafter, the processing moves to a processing relating to a local process with each PMM and packet communication between the PMMs. The control circuit 20 for each PMM references the offset values, calculates each value to be located in the global order set array GOrd, and provides the value in the array (step 802). FIG. 9 is a diagram illustrating the provision of values in a global order set array GOrd in the example illustrated in FIG. 6 and FIG. 7. Here, a value in the order set GOrd, which is added by an offset value OFFSET, is provided at a relevant position in a global order set array GOrd. Step 802 can be realized with local processing at each PMM.

Next, the values in the global value number array GVNo are determined, and these values are stored in the array generated in the memory 24, for example (step 803). To determine the value in the global value number array GVNo, the list (value list VL), which is held locally (by each PMM) and has values ordered in ascending order without duplication, needs to be uniquely ordered overall (among the PMMs). Entirely and uniquely ordered values (sequence numbers), as described above, are to be stored in this global value list GVNo. A method for realizing such an ordering at a high rate of speed will be described in detail below.

First Technique for Ordering Values within Value List

First, an example will be described wherein the values are actually transmitted to/received from the other PMMs, and the order of the values, which are divided and held by a relevant PMM, is determined based on the value received from the other PMMs. Now, in order to simplify the description, a value list such as those shown in FIGS. 49B through 49E are thought to be divided and held by each PMM. This value list divided and shared by the PMM is also called a local list (LOCAL LIST). Also, FIG. 49A illustrates an array in which values of these local lists are ordered without duplication and in ascending order. A value list without duplication, for which the values in the local lists in all of the PMMs are taken into consideration, is also called a total list (TOTAL LIST), such as shown in FIG. 49A. That is to say, following value lists are stored in respective memories in four PMMs of PMM-0 through PMM-3. For example, an expression such as [a, b, c] means that values "a", "b", and "c" are stored in a memory in the PMM in fixed order (in ascending order, with the present example).

PMM-0: [100, 300, 500, 600]
PMM-1: [10, 200, 300, 700]
PMM-2: [200, 400, 600, 700]
PMM-3: [10, 100, 300, 500]

FIG. 10 is a flowchart showing an example of processing executed in each PMM of interest for the purpose of counting the occurrence of values in other PMMs. As shown in FIG. 10, the PMM generates a first count array group COUNT-0~3 in a storage device such as memory, for counting the occurrence of other PMM values, and stores the initial values (step 1001). The size of the first count array is the same as the number of values held by the PMM of interest. For example, with the PMM-0, an array having four storage position numbers (0 through 3) is generated. Also, the storage position number of the array corresponds to the storage position number of a value list. For example, with PMM-0, the storage position number "0" of the first count array is associated to the value "100". Accordingly, "1" is stored for each of the values in the first count array relating to the PMM of interest. Also, "0" is stored for each of the values in the first count array relating to each of the other PMMs.

The PMM transmits the value list held by itself to other PMMs via a bus (step 1002). Also, the PMM receives a value list transmitted from other PMMs (step 1003). For example, as shown in FIG. 1, four PMMs are provided in the system, whereby if each PMM has three data receiving units for receiving data from the other three PMMs, the processing for data receiving, and the generating processing for the first count array group, can be realized in parallel.

Next, the PMM of interest references the value lists received from the other PMMs, and in the event a value is found which is held in the value list of the PMM of interest, the value of the storage position number corresponding to the found value in the first count array relating to the relevant other PMM is incremented (step 1004).

Incrementing of the value in the first count array in the case wherein a value list from another PMM is received and the same value exists therein is executed in all of the PMMs (see step 1005). After this, the PMM of interest adds up the corresponding values in the first count array relating to the PMM of interest and in the first count array relating to all of the other PMMs, and generates a first count array having stored the added up values (step 1006).

FIG. 11 through FIG. 14 are each diagrams describing the processing relating to the first count array in the PMM-0 through PMM-3. As shown in FIG. 11, for example, the PMM-0 receives value lists from the respective PMM-1 through PMM-3 (in the diagrams this is called "REMOTE LIST"). Also, the initial value for all of elements in the first count array relating to PMM-0 (of interest) (called "COUNT-0" in FIG. 11) is "1". On the other hand, the initial value for all of elements in the first count array relating to the other PMMs (called "COUNT-1" through "COUNT-3" in FIG. 11) is "0".

Upon receiving the value list from the PMM-1, the PMM-0 references the values included in the received value list. A value in the value list from the PMM-1 which is also held in the value list of PMM-0 (called "LOCAL LIST" in FIG. 11) is found to be "300". Accordingly, the value at the storage position number (=1) for the value "300" in the value list of the first count array (called "COUNT-1" in FIG. 11) relating to the PMM-1 is incremented and listed as "1".

With the PMM-2 and PMM-3 also, the predetermined value within the first count array ("COUNT-2" and "COUNT-3" in FIG. 11) relating to each is similarly incremented. Then, the values corresponding to "COUNT-0" through "COUNT-3" in FIG. 11 are added up altogether, whereby a first count array (simply called "COUNT" in FIG. 11) wherein the added up values are stored is obtained. In actuality, an arrangement may be made wherein a region for the purpose of a new array COUNT is provided in the memory, and the added up values in COUNT-0 through COUNT-3 are stored. Alternatively, an arrangement may be made wherein values in other arrays (COUNT-1 through 3) are accumulated in one of the arrays (for example, CONT-0).

As shown in FIG. 12 through FIG. 14, with PMM-1 through PMM-3 also, a first count array (called "COUNT" in the diagram) is generated wherein the values similarly added up are stored.

FIG. 15A is a diagram showing a virtual value list (called "TOTAL_LIST") wherein the values held by each of PMM-0 through PMM-3 are ordered in ascending order without duplication. These are shown in the diagram for the purpose of understanding the processing for PMM-0 through PMM-3, and are not actually generated by any of the PMMs.

FIG. 15B through FIG. 15E are arrays virtually showing the executing results of the processing shown in FIG. 10 for each of PMM-0 through PMM-3. For example, as shown in FIG. 15B, we can see that PMM-0 has obtained the count values of "2", "3", "3", and "2" as to the virtual LOCAL_LIST values "10", "300", "500", and "600", respectively. By referencing FIG. 15A, we can see that the count values corresponding to the same values are common between PMMs. For example, the count values corresponding to the storage position number "2" (local list value "300") in FIGS. 15B, 15C, and 15E are all "3".

Also, according to the present embodiment, one-sided count processing is executed with each PMM of interest for counting the occurrence of values in other PMMs which are positioned in a position lower than the PMM of interest. In the present embodiment, a higher or lower rank for the PMM is expressed with a PMM suffix number (for example, the number "0" at the suffix of PMM-0), wherein we will say that the greater this number, the higher rank is the PMM. With each PMM of interest, the number of the PMM of interest is held by storing the number in a memory or the like, and the held number only needs to be attached to a value list in the event of transmitting the value list to another PMM.

FIG. 16 is a flowchart showing one-sided processing executed in each PMM. With the processing shown in FIG. 16, transmission of a value list to another PMM (step 1602) or acceptance of the value list from the other PMM (step 1603) is not essential, but transmitting/receiving of the value lists can be omitted if the value list received in step 1003 in FIG. 10 is available.

As shown in FIG. 16, the PMM generates a second count array group COUNT-0 through 3 for counting the occurrence of values in the value lists relating to other PMMs in a storage device such as memory, and stores initial values in the second count array group (step 1601). In the event of executing the processing shown in FIG. 16 parallel with the processing shown in FIG. 10, a second count array separate from the first count array in FIG. 10 must be prepared. The initial values to be stored in the respective second count array are similar to those in the first count array described relating to FIG. 10 (each initial value=1 for the count array of the PMM of interest, and each initial value=0 for a count array of other PMMs).

Next, the PMM of interest determines whether or not the other PMM holding the value list from such other PMM is ranked lower than the PMM of interest (step 1604). In the event that No is determined in step 1604, the processing is moved to the next PMM (see step 1606). On the other hand, in the event that Yes is determined in step 1604, the PMM references the other PMM list, similar to step 1004 in FIG. 10, and in the event that a value held in the value list for the PMM of interest is found, the value at the storage position number corresponding to the found value is incremented in the second count array relating to the relevant other PMM (step 1605). Upon processing finishing for all of the other PMMs (Yes in step 1606), the PMM adds up the corresponding values in the second count array relating to the own PMM and the second count array relating to all of the other PMMs, to generate a second count array wherein the added up values are stored (step 1607).

FIG. 17 through FIG. 20 are diagrams describing processing relating to a second count array in each of PMM-0 through PMM-3. As shown in FIG. 17, the PMM-0 is ranked lower than the PMM-1 through PMM-3. Accordingly, since No is determined in step 1604 for any of the PMMs, the values in the second count array ("COUNT-0" through "COUNT-3" in FIG. 17) do not change, and thus the second count array after adding up ("COUNT-H" in FIG. 17) becomes [1, 1, 1, 1].

Also, as shown in FIG. 18, with regard to the PMM-1, only the PMM-0 is ranked lower than the PMM-1. Accordingly, when the other PMM is equal to PMM-0, the processing in step 1605 is executed, and as a result of this processing, a count value (storage position number=2) corresponding to the value "300" within the second count array ("COUNT-1" in FIG. 18) relating to PMM-0 is incremented. Accordingly, the second count array after adding up ("COUNT-H" in FIG. 18) becomes [1, 1, 2, 1]

As shown in FIG. 19, with regard to the PMM-2, the PMM-0 and PMM-1 are ranked lower than the PMM-2. Accordingly, when the other PMMs are each equal to PMM-0 or PMM-1, the processing in step 1605 is executed. A count value (storage position number=2) corresponding to the value "600" within the second count array ("COUNT-1" in FIG. 19) relating to PMM-0 is incremented. Also, a count value (storage position number=0) corresponding to the values "200" and "700" within the second count array ("COUNT-2" in FIG. 19) relating to PMM-1 is incremented. Accordingly, the second count array after adding up ("COUNT-H" in FIG. 19) becomes [2, 1, 2, 2]. With the example relating to the PMM-3 shown in FIG. 20 also, similarly, a second count array relating to each of the other PMMs (PMM-0 through PMM-2) is generated, and the second count array ("COUNT-H" in FIG. 20) after final adding up becomes [2, 2, 3, 2].

Thus, with the PMM of interest, upon the first count array, for which the number of occurrences of values within the value list of the PMM of interest is counted, and the second count array expressing a one-sided occurrence count, has been generated, the PMM of interest compares the values in each count array. As shown in FIG. 21, the PMM compares the value in the first count array and the corresponding value in the second count array (i.e. the values at the same storage position number) (step 2101), and determines whether or not both values are identical (step 2102). If the values are identical (Yes in step 2102), the PMM takes the value in the first count array as "Nm+1—(corresponding value in the first count array)" and stores the newly computed value in the first count array (step 2103). Note that "Nm" here is the number of PMMs, and is "4" in the above-described example.

On the other hand, if the values are not identical (No in step 2102), the value in the first count array is taken as "1", and "1" is stored in the first counter array (step 21104). Such processing is executed for all values in the first count array (see steps 2105, 2106).

FIG. 22A is a diagram showing a virtual array and a virtual value list in which the order of values are stored. FIG. 22B through FIG. 22E are diagrams describing changes to the first count array values with consideration for the second count array values, according to the processing shown in FIG. 21 for each of PMM-0 through PMM-3. In FIG. 22B through FIG. 22E, an order of values is virtually considered. FIG. 22F is an array illustrating the values as a line-by-line consolidation of the count values.

With PMM-0 and PMM-1, none of the values in the first count array are identical to the corresponding values in the second count array, therefore all of the values in the first count array are "1" (see FIG. 22B and FIG. 22C). Also, with PMM-2 and PMM-3, all of the values in the first count array are identical to the corresponding values in the second count array, therefore all of the values in the first count array are "4+1−(the corresponding values in the first count array)" (see FIG. 22D and FIG. 22E).

Now, regarding an arbitrary value in the value list, upon the count value in the first count array for each PMM being consolidated in a line-by-line manner, the sum thereof becomes "Nm: number of PMMs". For example, for the value "10" at the virtual storage position number "0", the value in the first count array is "1" with the PMM-1, and the value in the first count array is "3" with the PMM-3. Accordingly, upon consolidating the count values in a line-by-line manner, this becomes "1+3=4", and matches the number of modules (see FIG. 22F). This holds true for other count values as well (see FIG. 22F).

Then, each PMM of interest computes the order of each value in the value list held by the PMM of interest. As shown in FIG. 23, the PMM first generates an array Aggr group as the same size as the value list in a storage device such as memory, and stores initial values in the array Aggr group (step 2301). The initial values [0, 1, 2, 3] are stored in the array Aggr-0 relating to the PMM of interest. On the other hand, the initial values [0, 0, 0, 0] are stored in the arrays (arrays Aggr-1 through Aggr-3 in the above example) relating to the other PMMs.

Next, the PMM transmits a remote list (REMOTE LIST) including a pair of a value in a value list for the PMM of interest and the corresponding value in the first count array (Value, Count Value) to the other PMMs (step 2302).

Upon the PMM of interest receiving the remote lists from the other PMMs (step 2303), the value list for the PMM of interest (called "local list") and pointers for the respective remote lists are initialized (step 2304). Each pointer at an initial position indicates the storage position number "0" for the local list and the remote list. The PMM compares the values (the values in the value list, hereinafter also referred to as "current value") in the local list and remote list indicated by the respective pointers with each other (step 2305). Processing differs depending on the relation of these current values (see step 2306).

In the event that "local list current value<remote list current value", the PMM moves the pointer for the local list so that the storage position number is incremented by "1" (step 2401). In the event that "local list current value=remote list current value", the PMM moves the pointer for the local list so that the storage position number is incremented by "1" (step 2402), as well as moving the pointer for the remote list so that the storage position number is incremented by "1" (step 2403).

In the event that "a current value in the local list>a current value in the", the PMM adds the Count value at a position indicated by a remote list pointer (first count array value) to the value at the storage position indicated by a local list pointer in the array Aggr for the other PMMs (step 2404). Next, the PMM moves the remote list pointer so that that the storage position number is incremented by "1" (step 2405).

In the event that one of the pointers is at a position beyond the bottom of the local list or remote list (Yes in step 2406), the PMM of interest determines whether processing for all of the other PMMs have finished (step 2407), and if a remote list for an yet unprocessed other PMM exists (No in step 2407), processing is similarly executed for the relevant other PMM remote list.

FIG. 25A through FIG. 25C and FIG. 26A through FIG. 26C are diagrams describing in detail the processing to be executed in the event the PMM-0 receives a remote list from the PMM-1 serving as another PMM. In FIG. 25A, the pointers for the local list of the PMM-0 and the remote list from the PMM-1 are initialized, and the current values at the respective storage position numbers of "0" for both are compared. In the state shown in FIG. 25A, "local list current value (=100) >remote list current value (=10)", and therefore the count value "1" of the remote list as the value at the storage position number "0" is stored in the array Aggr-1 relating to the PMM-1 (step 2404 in FIG. 24). Also, the remote list pointer is moved so that the storage position number is incremented by "1".

In the following state shown in FIG. 25B, "local list current value (=100)<remote list current value (=200)", and therefore the local list pointer is moved so that the storage position number is incremented by "1" (step 2401 in FIG. 24). In the state in FIG. 25C, "local list current value (=300)>remote list current value (=200)", and therefore the count value "1" of the remote list as the value of the storage position number "2" is stored in the array Aggr-1 relating to the PMM-1 (step 2404 in FIG. 24). Also, the remote list pointer is moved so that the storage position number is incremented by "1".

In the state in FIG. 26A, "local list current value (=300)=remote list current value (=300)", and the pointers for the local list and remote list are moved so that the storage position number is incremented by "1" (steps 2402, 2403 in FIG. 24). In the state in FIG. 26B, "local list current value (=500)<remote list current value (=700)", and the pointer for the local list is moved so that the storage position number is incremented by "1". Further, in the example in FIG. 26C, "local list current value (=600)<remote list current value (=700)", and the pointer for the local list is moved so that the storage position number is incremented by "1". Thus the local list pointer points beyond the bottom of the list; therefore the processing relating to the remote list from the PMM-1 is terminated.

With the PMM-0, processing is executed similarly also when remote lists are received from the other PMMs (PMM-2, PMM-3) other than the PMM-1.

Thus, with the processing in FIG. 23 and FIG. 24, upon values being stored in the array Aggr relating to the PMM of interest (Aggr-0 in this example) and the respective Aggr relating to the other PMMs (Aggr-1 through Aggr-3 in this example), the order of the values is computed, based on the values in these arrays. As shown in FIG. 27, the PMM adds up the values in the arrays Aggr (Aggr-1 through Aggr-3 in this example) relating to the other PMMs (step 2701). The added up values may be temporarily stored in one of the arrays Aggr, or a separate array may be provided for storing the added up values, and the added up values may be stored in such an array. Next, the PMM divides each of the added up values by Nm (i.e., the number of the modules) (step 2702). Then, the PMM accumulates the divided values (step 2703). Accumulation is a process of repeatedly adding a value at a certain position in the array to a value indicated by a next storage position number in the array, in order from the smallest storage position number. Further, the PMM of interest adds the value in the array Aggr (Aggr-0 in this example) relating to the PMM of interest to the array to be accumulated (step 2704). The array, to which the value of the array Aggr relating to the PMM of interest is added, becomes the array indicating the order of the respective values within the value list for the PMM of interest.

FIGS. 28A and 28B through FIGS. 31A and 31B are diagrams describing the state of array or the like when the processing in FIGS. 23, 24, and 27 is executed for the respective PMM-0 through PMM-3. In FIG. 28A, as a result of receiving the remote list from the PMM-1, storing the values in the array Aggr (Aggr-1) relating to the PMM-1 is such that as described in detail with reference to FIG. 25A through FIG. 25C and FIG. 26A through FIG. 26C, whereby the array Aggr-1 value becomes [1, 1, 0, 0]. Similarly, by receiving the respective remote lists from the PMM-2 and PMM-3, and with the results of the processing in FIGS. 23 and 24, the arrays Aggr (Aggr-2, Aggr-3) relating to the PMM-2 and PMM-3 become [0, 3, 4, 0] and [3, 0, 0, 0], respectively. After adding up the values in Aggr-1 through Aggr-3, an outcome [4, 4, 4, 0] is obtained, as shown in FIG. 28B. The added up values can be held by any of Aggr-1 through Aggr-3. Then, when the respective added up values are divided by "Nm=4", the array indicating the division results thereof becomes [1, 1, 1, 0]. Further, by accumulation, an array of [1, 2, 3, 3] is obtained, and further, by adding the values in the array Aggr (Aggr-0) relating to the PMM-0 to the array, a final array [1, 3, 5, 6] can be obtained.

With the other PMMs (PMM-1 through PMM-3) also, by executing the processing in FIGS. 23, 24, and 27 similarly, the respective arrays [0, 2, 3, 7], [2, 4, 6, 7], and [0, 1, 3, 5] are obtained.

The implications of the processing executed in FIG. 23 and FIG. 24 will be described. With FIG. 23 and FIG. 24, a count value is stored in the array Aggr when a certain condition has been satisfied (see step 2404 in FIG. 24). In other words, the PMM of interest counts how many values of the value list (remote list) received from another PMM are located between a certain value in the value list for the PMM of interest (local list) and a value located at a previous position of the certain value (i.e. the storage position number is in a position decremented by "1"). The count of the remote list is then stored in the array Aggr at a position corresponding to the certain value in the value list for the PMM of interest. Also, the PMM does not execute the above count in the event that the certain value in the value list for the PMM of interest (local list) and the value in the other PMM value list (remote list) are identical.

FIG. 32A is a diagram illustrating a virtual value list and a virtual array storing the order of the values, as in FIG. 22A. FIGS. 32B through 32E are diagrams illustrating the order of values in each value list computed with the respective PMM-0 through PMM-3. Considering PMM-0 through PMM-4 overall, the value list becomes [10, 100, 200, 300, 400, 500, 600, 700] as shown in "TOTAL_LIST" in FIG. 32A, and the order thereof is such as shown in an array named "Order No.".

FIG. 32B indicates that the order for the respective values in the value list (LOCAL_LIST) held by the PMM-0 [100, 300, 500, 600] is [1, 3, 5, 6]. Also, FIG. 32C indicates that the order for the respective values in the value list (LOCAL_LIST) held by the PMM-1 [10, 200, 300, 700] is [0, 2, 3, 7]. Also, FIG. 32D and FIG. 32E indicate the values held by PMM-2 and -3 and the order thereof. As shown in FIG. 32B through FIG. 32E, we can see that, as a result of executing the processing according to the present embodiment with each PMM of interest, the order of the values held by each PMM of interest are appropriately computed.

Thus, an array representing a global order for each value in the respective PMM value lists (local list) can be obtained. That is to say, for the PMM-0 an array [1, 3, 5, 6] assumes a global value number array GVNo for the value list VL [100, 300, 500, 600] of the PMM-0. Similarly, the arrays [0, 2, 3, 7], [2, 4, 6, 7], and [0, 1, 3, 5] assume the global value number arrays GVNo for the respective value lists VL.

Returning to the example in FIG. 6 and FIG. 7, as a result of executing the above-described processing for each of the fields "sex", "age", "height", and "weight", the arrays GVNo shown in FIG. 63 and FIG. 64 can be obtained.

Thus, as described in detail above, in order to realize a first technique for ordering the values in a value list, each PMM of interest in an information processing system has
    data transmitting means to transmit storage values included in the value list to other PMMs;
    data receiving means to receive storage values included in the value lists from other PMMs;
    occurrence count array generating means to complete an occurrence count array, by generating the occurrence count array of the same size as the value list held by the PMM of interest, storing initial values in the occurrence count array, and by increasing a value in the occurrence count array corresponding to a storage value in the value list held by the PMM of interest in order to indicate the existence of the value in the value list from any of other PMMs when the storage value in the value list held by the PMM of interest exists in the value list from any of other PMMs;

one-sided count array generating means to complete a one-sided count array by generating the one-sided count array of the same size as the value list held by the PMM of interest, storing initial values in the one-sided count array, and by increasing a value in the one-sided count array corresponding to a storage value in the value list held by the PMM of interest in order to indicate the existence of the value in any of other PMMs, which have sent the value list, when a rank of the any of other PMMs is one-sidedly below or above that of the PMM of interest and the storage value in the value list held by the PMM of interest exists in the value list from the any of other PMMs;

outgoing list array generating means to complete an outgoing list array by generating the outgoing list array that is to be transmitted to other PMMs and of the same size as the value list held by the PMM of interest, comparing a value in the occurrence count array and a corresponding value in the one-sided count array, and, if both values are identical, storing a first value in the outgoing list array, wherein the first value indicates that the PMM of interest has a highest or lowest rank among the PMMs having a storage value relating to such matching value, and otherwise if the both are not identical, storing a second value other than the first value in the outgoing list array; and order computing means to compute the order of the storage values within the value list held by the PMM of interest based on remote lists including the value lists and the outgoing list arrays for the other PMMs which has been transmitted by the data transmitting means of the other PMMs and received by the data receiving means of the PMM of interest.

[Converting Values into Integers]

Next, handling of the value list (local list) containing values other than integers (for example, a character string or floating-point) will be described. As shown in FIG. 33A, the values of a character stream to be ordered are stored so as to be distributed among PMM-0 through PMM-3. Thus, ordering the values in an alphabet order (ascending order) leads to an outcome as shown in FIG. 33B.

Also, as shown in FIG. 34A, in the event that the values of floating-points to be ordered are stored so as to be distributed in PMM-0 through PMM-3, results as shown in FIG. 34B can be obtained. A value is not limited to a single value. For example, as shown in FIG. 35A, a value may be a set of multiple integers (for example, (50, 100)). Of course, this is not limited to the set of integers, and a set of a character string and an integer, or a set of an integer and a floating-point may be used. In these cases also, ordering can be performed as shown in FIG. 35B.

Processing for providing values (i.e. sequence number) indicating the order of values to the values other than integers will be described. An order is a series of consecutive integers starting with "0". Alternatively, an order can be thought of as integers starting with "1" by adding "1" to the above series of consecutive integers.

According to the present embodiment, integers having a fixed order but which are not necessarily consecutive are assigned to values other than the integers as mentioned above (first step), and further, the processing described with reference to FIG. 8 through FIG. 32E is applied to integers having a fixed order but which are not consecutive (second step), thereby finally computing the order for a value list (local list).

FIG. 36 is a flowchart showing an example of processing executed in the event of assigning integers, having a fixed order as in the above first step, which are not necessarily consecutive, to the values for each PMM.

As shown in FIG. 36, the PMM of interest generates a first count array group COUNT-0 through Count-3 for counting the occurrence of values from other PMM in a storage device such as memory, and stores the initial values in the first count array group (step 3601). The size of the first count array is the same as the number of values held by the PMM of interest. For example, with PMM-0, an array having four storage position numbers (0 through 3) is generated. Also, the storage position numbers in the array correspond to the storage position numbers in the value list. For example, for PMM-0, the values of the storage position numbers "0" through "3" in the first count array are associated to the values "AZ", "CX", "EX", "FX" respectively held in the PMM-0. "1" is stored as the respective value in the first count array relating to the PMM of interest (PMM-0). Also, "0" is stored as the respective value in the first count array relating to each of the other PMMs. As shown in FIG. 37A, the first count array (COUNT-0) of the PMM-0 is [1, 1, 1, 1] and the first count arrays (COUNT-1 through -3) relating to the other PMMs is [0, 0, 0, 0].

The PMM transmits the value list held itself to the other PMMs via a bus (step 3602). Also, the PMM receives value lists transmitted from the other PMMs (step 3603).

Also, with reference to the value lists received from the other PMMs, the PMM counts how many values in the value lists received from the other PMMs are located between a certain value in the value list held by the PMM of interest and a value located at a previous position of the certain value (i.e., having the storage position number less than the certain value by 1) (step 3604). Note that in the case that a certain value in the value list held by the PMM of interest is the same as the value in a value list from other PMMs, the value which is the same in the other value list is thought as a value which is "located between" as described above.

For example, in the example shown in FIG. 37A, it is assumed that the PMM-0 has received a value list (remote list) [AX, BX, CX, GX] from the PMM-1. Since the value "AZ" of the storage position number "0" in the PMM-0 value list (local list) is equal to or greater than "AX", "1" is stored as the value of the first count array relating to "AZ" (i.e., the value at the storage position number "0").

Next, the value "CX" at the storage position number "1" in the value list (local list) for the PMM-0 will be discussed. There are two values "BX" and "CX" between the value "CX" and the preceding (i.e., storage position number "0") value "AZ" in the value list (remote list) for the PMM-1. Accordingly, "2" is stored as the value in the first count array relating to "CX".

For the value "EX" at the storage position number "2" and the value "FX" at the storage position number "3" in the PMM-0 value list (local list), there are no values in the value list (remote list) from the PMM-1 located between the value and the preceding value. Accordingly, the value in the first count array relating to these values is "0".

Receiving values lists from other PMMs and storing the values in the first count arrays are executed for all of the PMMs (see step 3605). Then, the PMM of interest adds up the values in the first count array relating to the PMM of interest and the values corresponding to the first count arrays relating to all of the other PMMs, and generates a first count array in which the added up values are stored (step 3606).

In the example in FIG. 37A, the first count array of the PMM-0 or interest is [1, 1, 1, 1], the first count arrays relating to the PMM-1 through PMM-3 are [1, 2, 0, 0], [0, 1, 1, 1,], and [2, 1, 1, 0], respectively, whereby when the corresponding values are added up, the added up first count array becomes [4, 5, 3, 2]. Further, the PMM accumulates the added up first count array values, and generates an accumulative array Aggr (ID) (step 3607). For example, as shown in FIG. 37A, the PMM-0 accumulates the values in the added up first count array [4, 5, 3, 2].

Now, accumulating will be described with FIG. 37A by way of illustration. The leading value in the accumulative array Aggr(ID) (storage position number "0") is identical to the value "4" in the count array. Next, the value "5" in the count array and the value "4" in the Aggr(ID) at the previous position (i.e. storage position number "0") summed up and the summed up value is stored as a value at the next position (storage position number "1") in the Aggr(ID). Thus, for a value at a certain storage position number in the Aggr(ID), a value in the count array at the same storage position as the certain storage position number and a value in the accumulative array Aggr(ID) at the storage position number smaller than the certain storage position number by 1, and the added up value is stored in the Aggr(ID). As a result of the processing, the accumulative array Aggr(ID) for the PMM-0 becomes [4, 9, 12, 14].

With the other PMMs (PMM-1 through PMM-3) also, the processing shown in FIG. 36 is executed, whereby accumulative arrays Aggr(ID) are obtained for the respective PMMs (see FIG. 37B, FIG. 38A, FIG. 38B). The accumulative array Aggr (ID) is stored in a predetermined region of the PMM memory.

The integer values in the accumulative array Aggr(ID) obtained in the respective PMMs are regarded as integers, which are assigned to respective values at the same storage position number as those of the integer values in the value list (local list) and are "integers having a fixed order but which are not necessarily consecutive". Accordingly, if the values in the value lists (local lists) are the same, then the integer values in the corresponding accumulative arrays Aggr(ID) become the same. For example, as shown in FIG. 37B, the integer value in the accumulative array Aggr(ID) corresponding to the value "AX" at the storage position number "0" in the PMM-1 value list (local list) is "2". Also, as shown in FIG. 38, the integer value in the accumulative array Aggr(ID) corresponding to the value "AX" at the storage position number "0" in the PMM-3 value list (local list) is "2".

FIG. 39A is a diagram illustrating the values in the PMM-0 through PMM-3 ordered alphabetically, wherein the integer values in the accumulative array obtained in the processing shown in FIG. 36 virtually correspond to the respective values therein. As shown in FIG. 39A, the integer values in the accumulative array are not consecutive, but are in ascending order following the order of the values. In other words, it should be clear that these are "integers having a fixed order but which are not necessarily consecutive". Also, FIG. 39B through FIG. 39E are diagrams showing the integer values in the accumulative array Aggr(ID), which are obtained as a result of the processing in FIG. 36 at each PMM, are correlated to the respective values in the value list (local list) and virtually placed. Thus, it can be shown that even if the PMM is different, if the values in the value list (local list) are the same, the corresponding integer values of the accumulative array Aggr(ID) are also the same. According to the present invention, due to the fact that only each PMM of interest receives a value list (local list) from the other PMMs, integer values, which maintain the order of the value list held by the PMM of interest (local list) and are commonly used with the other PMMs can be obtained, as described above. The values in the accumulative array Aggr(ID) and the values in the value list (local list) are corresponding to each other one-to-one, so the accumulative array Aggr(ID) can be used as a conversion array.

Thus, with the present embodiment, values other than integers (an alphabet, in the above example) can be correlated to integers whose order is maintained. Further, each PMM can obtain a conversion array having integer values corresponding to the respective values in the value list (local list). Accordingly, by applying the above-described technique in the section "Ordering the values in the value list" to this conversion array, each PMM of interest can compute the order of the respective values in the value list held by each PMM of interest.

Description will be omitted in cases wherein the values in a value list (local list) are other than an alphabet, e.g. they are floating-points or sets of multiple values, but it should be clear that by executing the process in FIG. 36 at each PMM, a conversion array having integer values maintaining the order thereof can be obtained.

As described in detail above, in order to realize conversion of values into integers, each PMM of interest in an information processing system has:
  data transmitting means to transmit storage values included in a value list to other PMMs;
  data receiving means to receive storage values included in the value lists from other PMMs; and
  integer array generating means to determine the number of the storage values, which are contained in the value lists from the other PMMs and exist between adjacent storage values based on the storage values in the value lists from the other PMMs, which have been transmitted from the data transmitting means of the other PMMs and received by the data receiving means of the PMM of interest, and generate an array of integers assigned to the respective storage values in the value list held by the PMM of interest with consideration for the value lists from the other PMMs based on the determined number of the storage values, wherein the integers have a fixed order, but are not necessarily consecutive.

Second Technique for Ordering Values in a Value List

With the above-described "ordering" process, following the generating process for the occurrence count array (see FIG. 10), generating process is executed for a one-sided array (see FIG. 16), following which, the count array values are weighted with the comparisons of the count array values (see FIG. 21).

Hereafter, by using an array wherein flags are set, such as that to be described below, instead of the one-sided count processing, the generating of occurrence count array, the generating of one-sided count array, and the comparison of count array values as described above can be omitted.

FIG. 40 is a flowchart illustrating the generating process of a detecting flag array and a logical OR array. As shown in FIG. 40, the PMM generates a detecting flag array group in a storage device such as a memory for detecting the occurrence of values in the value list relating to other PMMs, and stores initial values in the detecting flag array group (step 4001). In step 4001, it is sufficient to generate as many flag arrays as the numbers of other PMMs. The initial values of the detecting flag arrays are "0" to indicate that the flags are not set initially.

The PMM transmits the value list to the other PMMs (step 4002) and also receives a value list from another PMM (step 4003).

Next, the PMM of interest determines whether or not another PMM having the received value list is ranked lower than the PMM of interest (step 4004). In the case that it is determined "No" in step 4004, the flow is moved to the processing for the next PMM (see step 4006). On the other hand, in the case that it is determined "Yes" in step 4004, the PMM of interest references the list from another PMM, and if a value is found in the value list held by the PMM of interest, sets a flag at the storage position number corresponding to the found value in the detecting flag array relating to another PMM, i.e., stores a "1" as the value at the position corresponding to the found value (step 4005). Upon the process ending for all of the other PMMs (Yes in step 4006), the PMM takes the logical OR of the corresponding values in the detecting flag array relating to all of the other PMMs (step 4007). That is to say, if any of the values in the detecting flag array at the same storage position number is "1", the value, which corresponds to the same storage position, in the logical OR array indicating an operation outcome is set to "1". This logical OR array also may be generated in a storage device such as memory.

FIGS. 41A and 41B and FIGS. 42A and 42B are diagrams describing the process relating to detecting flag arrays for the PMM-0 through PMM-3. As shown in FIG. 41A, the PMM-0 is ranked lower than all of the PMM-1 through PMM-3. Accordingly, in step 4004, since it is determined No regardless of the PMMs, the values of the detecting flag array do not change, and thus, the logical OR array after adding up is [0, 0, 0, 0].

Also, as shown in FIG. 41B, with regard to the PMM-1, only the PMM-0 is ranked lower than the PMM-1. Accordingly, when the other PMM is the PMM-0, the processing in step 4005 is executed, and as a result of this process, the flag corresponding to the value "300" (storage position number=2) in the detecting flag array relating to the PMM-0 is set to "1". Accordingly, the logical OR array subjected to logical OR becomes [0, 0, 1, 0].

As shown in FIG. 42A, for the PMM-2, the PMM-0 and PMM-1 are ranked lower than the PMM-2. Therefore, when the other PMM is PMM-0 or PMM-1, the processing in step 4005 is executed. The flag corresponding to the value "600" (storage position number=2) in the detecting flag array relating to the PMM-0 is set. Also, the flags corresponding to the values "200" and "700" (storage position number=0, 3) in the detecting flag arrays relating to the PMM-1 are set. Accordingly, the logical OR array becomes [1, 0, 1, 1]. Further, even with the example relating to the PMM-3 shown in FIG. 42B, similarly the detecting flag array relating to the respective PMM (PMM-0 through PMM-2) is generated, and the logical OR array subjected to logical OR becomes [1, 1, 1, 1].

In a following process, the value list (remote list) transmitted by the PMM of interest is made up of values, which have a value of "0" at a corresponding position in the logical OR array, included in the value list (local list) held by the PMM of interest. FIG. 43A is a diagram illustrating a virtual value list arranging the values held by each of PMM-0 through PMM-3 in ascending order without duplication, and a virtual array for storing the order of values in this value list. As shown in FIG. 43B through FIG. 43E, for each PMM, only values, which have a value of "0" in the logical OR array, in the value list (local list) are stored in an outgoing value list (labeled as "outgoing list" in FIG. 43B through FIG. 43E).

FIG. 44 is a flowchart showing processing for determining value order, which is executed by the PMM according to another embodiment of the present invention. As shown in FIG. 44, the PMM first generates an outgoing list made up of values such that within the value list (local list) the corresponding values in the logical OR array are "0" (step 4401). This outgoing list (remote list) is shown in FIG. 43B through FIG. 43E.

Next, the PMM of interest stores the initial values in the accumulative array Aggr relating to the value list held by the PMM of interest (local list) and also in the respective count arrays Count-1 through -3 based on the other outgoing lists (step 4402). These arrays only need to be provided to a storage device such as memory. For example, as shown in FIG. 45A, the PMM stores numbers in ascending order starting from "0", such as "0, 1, 2, 3, . . ." as values in the accumulative array relating to the own PMM. This is based on the fact that, for the value list (local list) held by the PMM of interest, the number of values located at the storage position number preceding the storage position number of any one of the values is incremented by 1. Also, all of the initial values for the respective count arrays Count-1 through -3 become "0".

The PMM of interest transmits outgoing lists (remote lists) to the other PMMs (step 4403), and also receives an outgoing list (remote list) from another PMM (step 4404).

The PMM of interest counts the number of the values, which are included in the outgoing list (remote list) from another PMM, located between a certain value in the value list (local list) held by the PMM of interest and a value located at a previous position of the certain value (i.e., the value located at the storage position number less than that of the certain value by 1) (step S4405). The counted value is then stored in a count array as a count value for the certain value in the value list (local list) held by the PMM of interest. The process in step 4405 is executed for the outgoing lists (remote lists) from all of the other PMMs.

As shown in FIG. 45A, the PMM-0 receives the outgoing list (remote list) [10, 200, 700] from the PMM-1. With the PMM-0, the value at the storage position number "0" in its own value list (local list) is "100". Accordingly, since there is a smaller value "10" in the outgoing list (remote list) from the PMM-1, the value at the storage position number "0" becomes "1" in the count array Count-1. Also, the value at the storage position number "1" is "300". Thus, since there is a value "200" between the values "100" and "300" in the outgoing list (remote list) from the PMM-1, the value in the count array Count-1 at the storage position number "1" is "1".

Note that in step 4405, in the case there is a value in the outgoing list from the other PMM which is identical to a certain value in the value list (local list) held by the PMM of interest, the PMM of interest does not perform a counting which is influenced by this identical value reflects. For example, in FIG. 45B the value at the storage position number "2" is "300" in the value list (local list) of the PMM-1. Now, there are no values, which are located between a preceding value of "200" and the value of "300" from the outgoing list from the PMM-0, in the value list, except for the value of "300". However, in the case the values are identical to each other, counting is not performed in the count array so the value at the storage position number "2" remains as "0" in the count array Count-1.

Next, the PMM adds up the corresponding values (i.e., the values having the same storage position number) and obtains a count array containing added up values (step 4407). This can be realized by adding, to any one of the counter arrays, each of the values in the other count arrays. Further, the PMM of interest accumulates the values in the count array having the values being added up, and obtains an accumulative array (step 4408). Further, the PMM of interest adds up the values in the accumulative array obtained in step 4408 and the corresponding values in the accumulative array Aggr, which has been previously prepared for the value list held by the PMM of interest in step 4402 and has the initial values being stored (step 4409). The values of the array obtained in step 4409 indicate the order of the values in the value list (local list).

As shown in FIG. 45A, the PMM-0 receives the outgoing lists (remote lists) from the PMM-1 through PMM-3 serving as the other PMMs, and generates the count arrays Count-1 through Count-3 with the processing in step 4405. Upon adding up the values in these count arrays, the added up array is found to be [1, 1, 1, 0]. Further, by accumulating these values, the accumulative array [1, 2, 3, 3] can be obtained. The values of the accumulative array Aggr [0, 1, 2, 3] relating to the value list (local list) held by the PPM-0, which has been generated in step 4402, is added to the respective values in the obtained array. The resulting array [1, 3, 5, 6] indicates global orders for the respective values in the value list (local list) held by the PMM-0.

FIG. 45B and FIGS. 46A and 46B are diagrams describing the processing in FIG. 44 relating to PMM-1, 2, and 3. As shown in these diagrams, we can see that by performing the processing in FIG. 44, arrays indicating global orders for the respective values in the value list (local list) can be obtained in PMM-1 through PMM-3.

Thus, as described in detail above, in order to realize a second technique for ordering values in a value list, each PMM of interest in the information processing system comprises:

outgoing list array generating means to generate an outgoing list array including a storage value, to which information indicating that the PMM of interest is a representative module for the storage value has been attached, in a value list held by the PMM of interest; and order computing means to compute orders of storage values in the value list held by the PMM of interest, based on the storage values contained in the outgoing list arrays of other PMMs, which have been transmitted from the data transmitting means in the other PMMs and received by the data receiving means in the PMM of interest.

[Third Technique for Ordering Values in a Value List]

Ordering the values in a value list can be realized even without executing one-sided count processing (FIG. 16) or generating detecting flags (FIG. 40). In this case, after executing the occurrence count processing (FIG. 10), the first count array obtained in this process is transmitted along with the corresponding value list.

FIG. 50 is a flowchart showing a generating process of the count arrays for the purpose of assigning order, using another technique. As shown in FIG. 50, the PMM generates a third count array group COUNT-1 through -3 for counting the occurrence of values in the value lists from the other PMMs in a storage device such as memory, and stores the initial values in the third count array group (step 5001). "0" is given as an initial value for the count array. Note that in step 5001, the PMM of interest may generate an array Aggr-0 storing the initial order for the respective values in the value list held by the PMM of interest, and may create initial values in this array. The initial values of the array Aggr-0 are values in ascending order starting with "0".

That is to say, if there are only four values in the value list held by the PMM of interest, the initial values in the array Aggr-0 are found to be [0, 1, 2, 3]. Of course, generating the array Aggr-0 and storing the initial values in the array do not need to be performed at this stage, but the array can be generated in the event of being used and initial values are stored in the array at that time.

Next, the PMM of interest transmits the remote list (RE-MOTE_LIST) including a set of the value in the value list held by the PMM of interest and a value in the corresponding first count array (Value, Count values) to other PMMs (step 5002). Upon receiving the remote list from another PMM (step 2303), the PMM of interest performs the processing described below and stores the values in the count array.

If a value in the remote list received from another PMM is located between a certain value and a value preceding the certain value (i.e., a value located at a location whose storage position number is smaller than that of the certain value by "1") in the value list held by the PMM of interest (local list), the PMM of interest stores a reciprocal value of a count value corresponding to this value in the third count array at a corresponding location (step 5004). If multiple values from the remote list are located between adjacent values in the local list in a manner as described above, a sum of reciprocal values of the respective Count values is stored in the third count array. Note that if the value in the local list and the value in the remote list from the other PMM are identical, the above-mentioned reciprocal value is not stored in the third count array.

FIG. 51 through FIG. 54 are diagrams illustrate a process for storing values in a third count array and a process for adding up the values in each of PMM-0 to PMM-3 according to the processing shown in FIG. 50. For example, for the PMM-0, the values in the remote list from the PMM-1 includes "10", "200", "300", and "700". Comparing these values with the values in the value list held by the PMM-0 (local list) yields "10<100", so the reciprocal value of the Count value "2", which is "½", is stored in the count array COUNT-1 as the value of the position corresponding to the local list value "100" (having the storage position number "0")). Similarly, with regard to the value "300" in the value list held by the PMM-0 (local list), there is a value "200" in the value list of the PMM-1 located between "100" and "300", so the reciprocal value of the Count value "2", which is "½", is stored in the count array COUNT-1 as the value of the position corresponding to the local list value "300" (having the storage position number "1").

The PMM executes the process for storing the reciprocal values in the count arrays for all of the remote lists received from the other PMMs (step 5005). Following this, the PMM adds up the corresponding values in the third count array (step 5006), and further accumulates the added up values (step 5007). With the example in FIG. 51, by counting the third count array [½, ½, 0, 0] relating to the PMM-1, the third count array [0, ½, ½, 0] relating to the PMM-2, and the third count array [½, 0, 0, 0] relating to the PMM03, a count array (indicated as COUNT in the diagram) [1, 1, 1, 0] in which the adder up values are contained can be obtained. Similarly with the PMM-1 through PMM-3, count arrays in which the added up values are contained can be obtained (see FIG. 52 through FIG. 54).

FIGS. 55A and 55B and FIGS. 56A and 56B are diagrams illustrate a process for generating an accumulative array and a process for generating an array containing final orders for each of PMM-0 to PMM-3 in accordance with the processing in FIG. 50. For example, as shown in FIG. 55A, for the PMM-0, the added up count array [1, 1, 1, 0] is accumulated and the accumulative array AGGR [1, 2, 3, 3] is obtained. For the PMM-1 through -3, similarly, the accumulative arrays AGGR are obtained (see FIG. 55B, FIG. 56A, and FIG. 56B).

Further, the PMM of interest obtains the final array by adding the values in the obtained accumulative array AGGR and corresponding values in an array Aggr-0 in which initial order as to the respective values in the value list held by the PMM of interest is stored (step 5008). The array obtained by addition of these values is regarded as the array to indicate the order for the respective values in the value list held by the PMM of interest. In FIG. 55A through FIG. 56B, an array GVNo indicates the array specifying the above-mentioned order.

Thus, an array can be generated which stores the order as to the values of the value list, even without using a second count array or detecting flag array from one-sided count processing.

Thus, as described in detail above, in order to realize a third technique for ordering values in a value list, each PMM of interest in the information processing system comprises:
- data transmitting means to transmit storage values included in the value list to other PMMs;
- data receiving means to receive storage values included in the value lists from other PMMs;
- occurrence count array generating means to complete an occurrence count array, by generating the occurrence count array of the same size as the value list held by the PMM of interest, storing initial values in the occurrence count array, and by increasing a corresponding value in the occurrence count array in order to indicate that there exists a value from another PMM, which is equal to the storage value in the value list held by the PMM of interest, when the storage value within the value list held by the PMM of interest exists in the value list from another PMM; and
- order computing means to compute the order of storage values within the value list held by the PMM of interest, based on remote lists including the value lists and the occurrence count arrays from the other PMMs, which are transmitted by the data transmitting means of the other PMMs and received by the data receiving means of the PMM of interest.

[Selection Process for Representative Module]

Next, the specific processing of selecting a representative module will be described. In order to select the representative module, processing similar to the above-described first technique and second technique for ordering values in a value list should be executed.

First, the first technique for representative module selection will be described. With the first technique, a module to represent a value in the value list can be determined by executing one-sided count processing (see FIG. 16). It is assumed that each PMM performs the process shown in FIG. 16 and obtains a one-sided count array (COUNT-H). Specifically, let the one-sided count arrays (COUNT-H) shown in FIG. 17 through FIG. 20 are obtained. FIG. 57A is a diagram virtually showing an array including the values in the value list shown in FIG. 17 through FIG. 20 arranged without duplication and in ascending order. The representative module selection processing is intended to determine an individual PMM each representing each value in the virtual array shown in FIG. 57A. FIGS. 57B through 57E are diagrams illustrating the value lists (LOCAL_LIST) held by the respective PMM-1 through PMM-3 and the generated one-sided count arrays (COUNT-H).

In the first technique for representative module selection, as shown in FIG. 58A, after executing the one-sided count processing (step 5801), the PMM of interest reads values from the one-sided count array (COUNT-H) in the storage device such as memory (step 5802), and when the value in the read out one-sided count array (COUNT-H) is "1", the PMM of interest determines that the representative module relating to the corresponding value in the value list (LOCAL_LIST) is the PMM of interest ("Yes" in step 5803). Accordingly, in this case, the PMM of interest associates the relevant value in the value list (LOCAL_LIST) held by the PMM of interest with information (e.g., a given mark such as a flag) indicating that the PMM of interest is the representative module for the relevant value, and stores the information in a storage device such as memory (step 5804).

In the example shown in FIG. 57B through FIG. 57E, for the first value of "10" in the virtual value list (TOTAL_LIST), the PMM-1 is found to be the representative module (see reference numeral RV-0). For an element of "100" at the storage position number "1" in the virtual value list (TOTAL_LIST), the PMM-0 is found to be the representative module (see reference numeral RV-1). In FIG. 57B through FIG. 57E, each of the RV-0 through RV-7 indicates a PMM, which is supposed to be the representative module for the relevant value in the virtual value list.

The first technique follows the following logic. In the processing shown in FIG. 16, the one-sided count array is added up if the value in the list held by the PMM of interest is received from a PMM ranked lower than the PMM of interest. Accordingly, the fact the one-sided count array is "1" means that the PMM of interest is the lowest ranked PMM among the PMMs holding the same value. That is to say, the lowest ranked PMM holding the value can be uniquely determined. Accordingly, one PMM serving as the representative module transmits the relevant value to the transmission path, and the other PMM, which executes the processing for generating the above TOTAL_LIST, receives the relevant value from the transmission path and generates an array including the received value, thereby enabling an array without duplicating values to be obtained. Further, an array (TOTAL_LIST) considering the order of values as shown in FIG. 57A can be obtained in any of the PMMs if the PMM transmits the order of the values, which has been obtained in the above-described "ordering of values" processing to the transmission path.

Next, the second technique for representative module selection will be described. In the second technique, both of the occurrence count processing (see FIG. 10) and the one-sided count processing (see FIG. 16) are executed (step 5811) as shown in FIG. 58B, the corresponding values among the obtained array ("first count array: occurrence count array" and "second count array: one-sided count array") are read at the PMM (step 5812), and in the event these values are identical ("Yes" in step 5813) it is determined that the PMM is the representative module for the value in the value list (LOCAL_LIST) relating to the identical values (step 5814). In the following description, it is assumed that, specifically, the occurrence count arrays (COUNT) shown in FIG. 11 through FIG. 14 are obtained from the processing shown in FIG. 10. Also, it is assumed that the one-sided count arrays (COUNT-H) shown in FIG. 17 through FIG. 20 are obtained from the processing shown in FIG. 16.

FIG. 59A is a diagram illustrating an array in which the values in the value list are virtually arranged without duplication and in ascending order. FIG. 59B through FIG. 59E are diagrams illustrating the values lists (LOCAL_LISTs) held by the PMM-0 through PMM-3, the occurrence count arrays (COUNT) and the one-sided count arrays (COUNT-H), respectively.

In the second technique for selecting the representative module, when the value in the occurrence count arrays (COUNT) and the corresponding value in the one-sided count array (COUNT-H) are identical, the PMM of interest determines that the PMM of interest is the representative module relating to the relevant value in the value list (LOCAL_LIST). Accordingly, in this case, the PMM of interest associates the relevant value in the value list (LOCAL_LIST) held by the PMM of interest with information (e.g., a given mark such as a flag) indicating that the PMM of interest is the representative module for the relevant value, and stores the information in a storage device such as memory.

In the example shown in FIG. 59B through FIG. 59E, for the first value "10" in the virtual value list (TOTAL_LIST), the occurrence count array (COUNT) and the one-sided count array (COUNT-H) are compared in the PMM-1 and PMM-3. For the PMM-3, since the values in these arrays are identical, it is determined that the PMM-3 is the representative module for the value "10" in the value list (see reference numeral PV-0). For an element of "100" at the storage position number "1" in the virtual value list (TOTAL_LIST), the occurrence count array (COUNT) and the one-sided count array (COUNT-H) are compared in the PMM-0 and PMM-3. For the PMM-3, since the values in these arrays are identical, it is determined that the PMM-3 is the representative module for the value "100" in the value list (see reference numeral PV-1). In FIG. 59B through FIG. 59E, each of RV-0 through RV-7 indicates a PMM, which is supposed to be the representative module for the relevant value in the virtual value list.

The second technique follows the following logic. The fact that the value in the occurrence count array and the corresponding value corresponding in the one-sided count are identical in the PMM of interest means that the PMM of interest is the highest ranked module for the relevant value among the PMMs holding the relevant value. That is to say, the highest ranked PMM holding the relevant value can be uniquely determined.

In the first technique, the representative module for each value is determined by the PMM of interest serving as the representative module in that the PMM of interest determines the PMM of interest is the lowest ranked module among the PMM holding the relevant value. In the second technique, the representative module for each value is determined by the PMM of interest serving as the representative module in that the PMM of interest determines the PMM of interest is the highest ranked module among the PMM holding the relevant value. However, the representative module is not restricted to the highest ranked or lowest ranked module, and rather a PMM ranked in an intermediate position may be determined as the representative module. The third technique for representative module selection will be described below. In the third technique, as shown in FIG. 60, if the value in the occurrence count array (COUNT) is an even number ("Yes" in step 6003), the PMM of interest determines whether or not "value of COUNT/2" and the corresponding values in the one-sided count array (COUNT-H) are identical ("Yes" in step 6004). IF it is affirmatively determined in step 6004, the PMM of interest determines that the PMM of interest is the representative module for the value in the values list (LOCAL_LIST) with respect to these values (step 6006). On the other hand, if the value in the occurrence count array (COUNT) is an odd number ("No" in step 6003), the PMM of interest determines whether or not "(value of COUNT+1)/2" and the corresponding value in the one-sided count array (COUNT-H) are identical (step 6005). If it is affirmatively determined in step 6005, the PMM of interest determines that the PMM of interest is the representative module for the values in the value list (LOCAL_LIST) with respect to these values (step 6006).

Further, a representative module can be selected by using a detecting flag array without using an occurrence count array or one-sided count array. In a fourth technique for representative module selection, the PMM of interest generates the detecting flag array and generates a logical OR array based on the detecting flag array, as shown in FIG. 40 (step 6201), and then reads the values of the generated logical OR array from the storage device such as memory, and if the value of the read out logical OR array is "0", the PMM of interest determines that the representative module for the corresponding value in the value list (LOCAL_LIST) is the PMM of interest (Yes in step 6203). Accordingly, in this case, the PMM of interest associates the relevant value in the value list (LOCAL_LIST) held by the PMM of interest with information (e.g., a given mark such as a flag) indicating that the PMM of interest is the representative module for the relevant value, and stores the information in a storage device such as memory (step 6204).

In the example shown in FIG. 61B through FIG. 61E, for the first value of "10" in the virtual value list (TOTAL_LIST) shown in FIG. 61A, the PMM-1 is found to be the representative module (see reference numeral RV-0). For an element of "100" at the storage position number "1" in the virtual value list (TOTAL_LIST), the PMM-0 is found to be the representative module (see reference numeral RV-1). In FIG. 61B through FIG. 61E, each of RV-0 through RV-7 indicates a PMM, which is supposed to be the representative module for the relevant value in the virtual value list. These results are the same as in the example shown in FIG. 57B through FIG. 57E.

The fourth technique follows the following logic. The fact that the value of the logical OR array obtained in the processing shown in FIG. 40 is "0" means that the PMM of interest is the lowest ranked module among the PMMs holding this value. That is to say, the lowest ranked PMM holding the value can be uniquely determined. Accordingly, one PMM serving as the representative module transmits the relevant value to the transmission path, and the other PMM, which executes the processing for generating the above TOTAL_LIST, receives the relevant value from the transmission path and generates an array including the received value, thereby enabling an array without duplicating values to be obtained.

Further, an array (TOTAL_LIST) considering the order of values as shown in FIG. 61A can be obtained in any of the PMMs if the PMM transmits the order of the values, which has been obtained in the above-described "ordering of values" processing to the transmission path.

Thus, as described in detail, in order to realize the representative module selection processing, each PMM of interest in the information processing system comprises:

data transmitting means to transmit storage values included in the value list to other PMMs;

data receiving means to receive storage values included in the value lists from other PMMs; and representative module determining means to determine, for the storage values in the value list held by the PMM of interest, whether or not the PMM of interest is a representative module for representing one or more PMMs holding a relevant storage value held by the PMM of interest based on the value lists from the other PMMs, which have been received by the data receiving means according to an order previously assigned to each of the PMMs, and if the PMM of interest is the representative module, associates the relevant storage value with information indicating that the PMM of interest is the representative module and store the information.

The present invention is not limited to the embodiments described above, and may be subject to various modifications within the scope of the invention described in the claims, with explicit understanding that such modifications are within the scope of the present invention.

In the embodiments described above, a PMM having memory, an interface, and a control circuit is used, but the invention is not limited to these embodiments, and a personal computer, server and so on serving as an information processing unit for dividing and holding local tabular-format data may be used instead of a PMM. Alternatively, a configuration may be made available such that a single personal computer or server has multiple information processing units. In these cases as well, records can be specified by the information processing unit accepting values indicating the order of the records and referencing a global ordered set array GOrd. Also, by referencing a global value number array GVNo, field values can also be specified.

Further, in the above-described embodiments, though the PMM transforms the data into packets and transmits them to a transmission path, the invention should not be limited to these embodiments, with explicit understanding that data may be transmitted in a format other than in packets.

In addition, the following processes according to the embodiments of the invention: "obtaining value lists without duplication (selection of representative module)", "ordering values in a value list", and "converting values into integers" can be applied not only to tabular-form data divided and held by a plurality of PMMs, but also to value lists having a plurality of values which are divided and held by a plurality of PMMs.

Furthermore, in the above-described embodiments, for the "second technique for ordering values in a value list" (see FIG. 40 through FIG. 46B, for example), the PMM of interest generates detecting flag arrays and a logical OR array taking the logical OR of the values in the detecting flag arrays, generates an outgoing list including only values in the value list such that the corresponding value in the logical OR array is "0", and transmits this outgoing list to the other PMMs. In the above-described "second technique for ordering values in a value list", the fourth technique for representative module selection processing (technique using a detecting flag array) is used to generate the outgoing list including the values in the value list such that the PMM of interest is supposed to be the representative module. However, the present invention is not limited to the above-described modes, and arrangements may be made wherein techniques described for the representative module selection processing (for example, the first technique using a one-sided count array, or a second technique or third technique using an occurrence count array and one-sided count array) are used for each PMM of interest to generate an outgoing list including only values from the value list held by the PMM of interest such that the PMM of interest is supposed to be the representative module, and transmit the outgoing list to the other PMMs.

BRIEF DESCRIPTION OF THE DRAWINGS

FIG. 3 is a diagram illustrating an example of data in tabular format.

Figure 4:
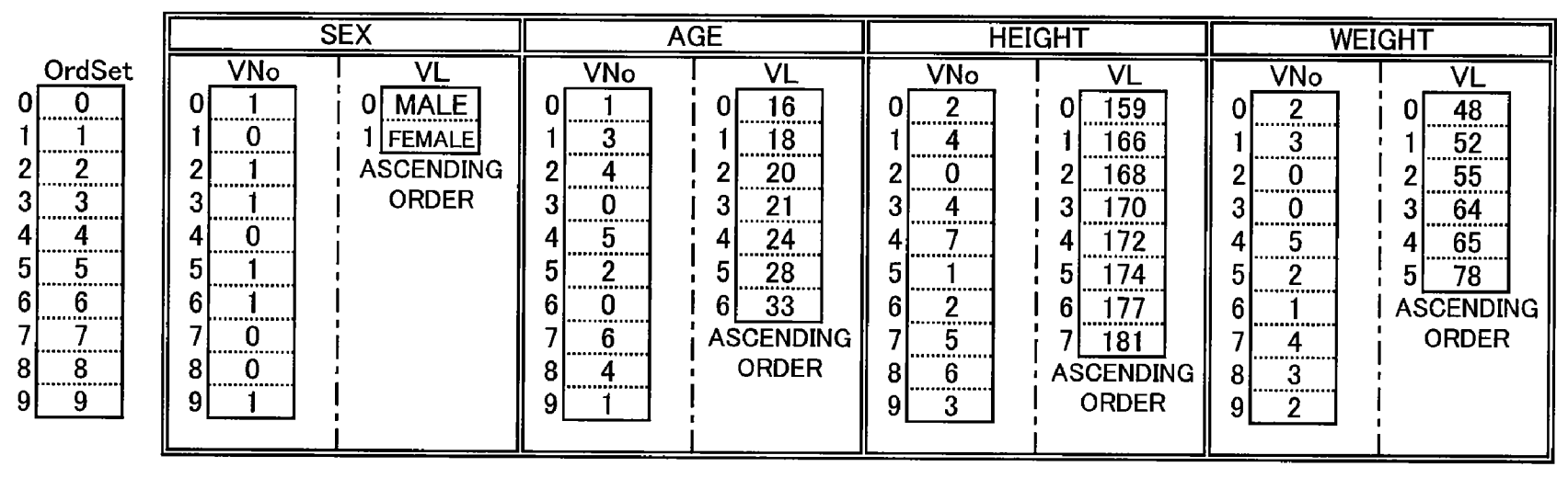

FIG. 4 is a diagram describing a principle of a configuration holding the data in tabular format, according to the present embodiment.

FIG. 5 is a diagram describing an array and values in the array divided and held by each PMM, according to the present embodiment.

Figure 6:
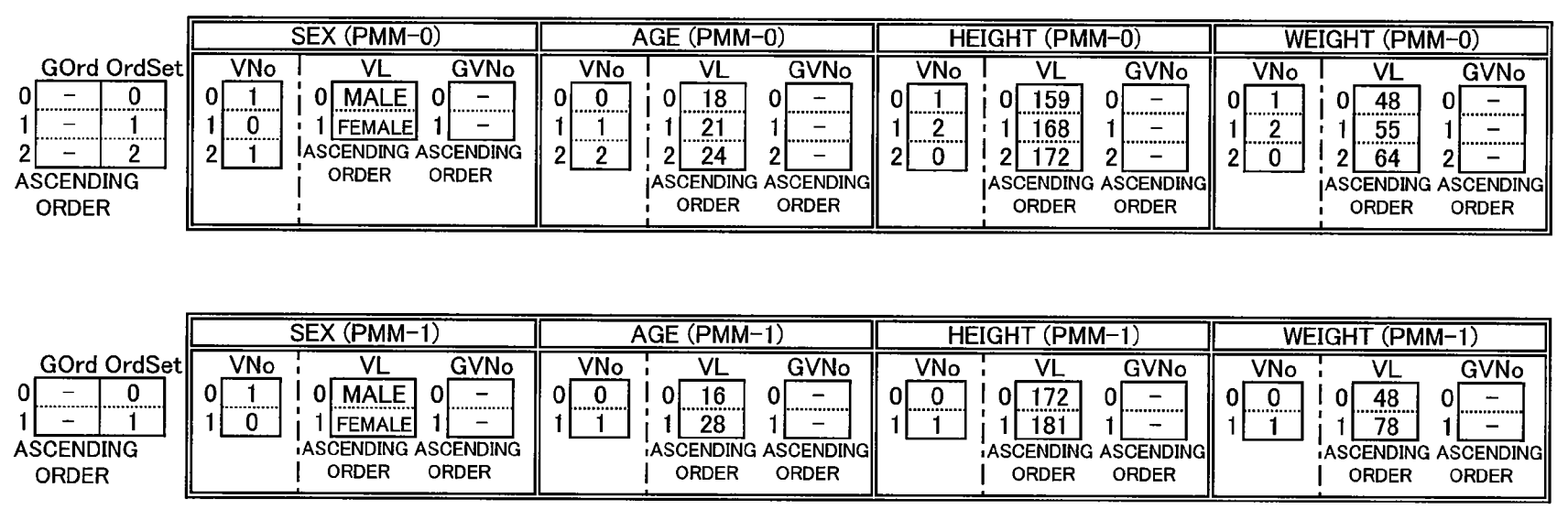

FIG. 6 is a diagram illustrating an example of tabular format data divided and held by each of PMM-0 through 4 initially.

Figure 7:
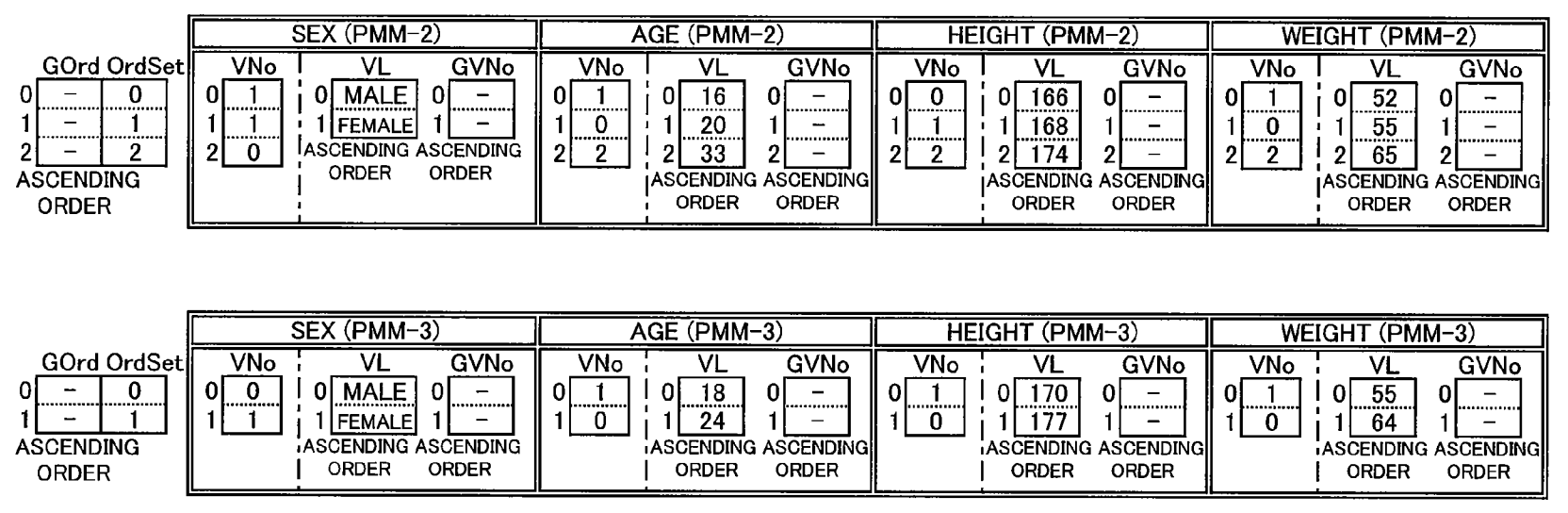

FIG. 7 is a diagram illustrating an example of tabular format data divided and held by of PMM-0 through 4 initially.

FIG. 22A is a diagram illustrating a virtual array storing a virtual value list and the order of the values, FIGS. 22B through 22E are diagrams describing changes to the first count array values with consideration for the second count array values, according to the processing shown in FIG. 21 for each of PMM-0 through PMM-3, and FIG. 22F is an array illustrating the values as a line-by-line consolidation of the count values.

FIG. 23 is a flowchart showing a process executed by each PMM for computing the order of each value within the value list to be held by each PMM.

FIG. 25A through FIG. 25C are diagrams describing in detail a process to be executed in the event the PMM-0 receives a remote list from the PMM-1 serving as another PMM.

FIGS. 30A and 30B are diagrams describing the state of array or the like when the process in FIGS. 23, 24, and 27 is executed for each of PMM-0 through PMM-3.

FIG. 32A is a diagram illustrating a virtual array storing a virtual value list and the order of the values, and FIGS. 32B through 32E are diagrams illustrating the order of values in each value list computed with each of PMM-0 through PMM-3.

FIGS. 33A and 33B are diagrams each illustrating examples of a value list which includes a character string as a value and an example of the value list to which ordering is applied.

FIGS. 34A and 34B are diagrams each illustrating examples of a value list which includes a floating-point value and an example of the value list to which ordering is applied.

FIG. 39A is a diagram illustrating a virtual value list and an array of integers which are assigned to the values in the virtual value list, wherein the integers have a fixed order and are not necessarily consecutive, and FIG. 39B through FIG. 39E are diagrams each virtually arranging the integer values in the accumulative number arrays Aggr (ID) obtained as a result of the processing of each PMM in FIG. 36, such that the integer values are associated with the values in the value list (local list).

FIG. 43A is a diagram illustrating a virtual value list wherein the values held by each of PMM-0 through PMM-3 are arranged in ascending order without duplication, and a virtual array for containing the order of values in this value list, and FIG. 43B through FIG. 43E are diagrams illustrating a virtual value list, logical OR array, and outgoing list regarding each PMM.

FIG. 44 is a flowchart showing a process for determining value order, which is executed with the PMM according to another embodiment of the present invention.

FIGS. 46A and 46B are diagrams illustrating the state of array for each of PMM-2 and PMM-3 when the process shown in FIG. 44 is executed.

FIGS. 57A through 57E are diagrams for describing a first technique for representative module selection.

FIGS. 59A through 59E are diagrams for describing a second technique for representative module selection.

FIG. 60 is a diagram illustrating another example of a process to be executed by the PMM for representative module selection.

FIGS. 61A through 61E are diagrams for describing a fourth technique for representative module selection.

FIG. 62 is a diagram illustrating yet another example of a process to be executed by the PMM for representative module selection.

Figure 63:
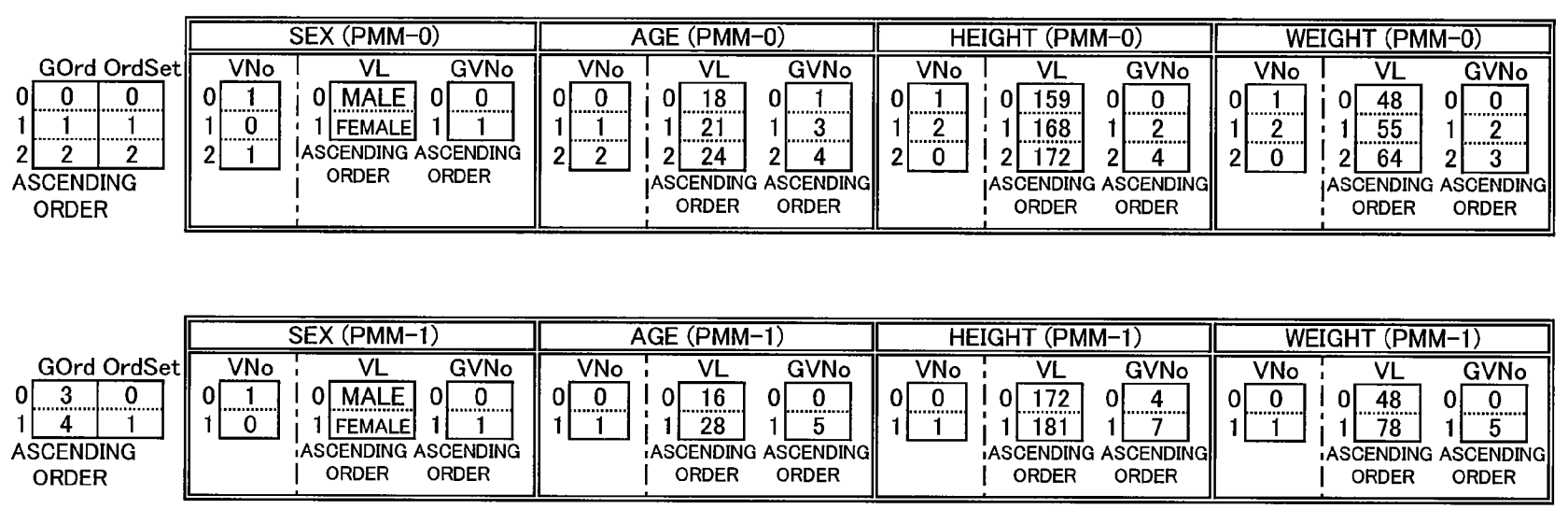

FIG. 63 is a diagram illustrating an array GVNo or the like obtained as a result of the process in terms of the example in FIG. 6.

Figure 64:
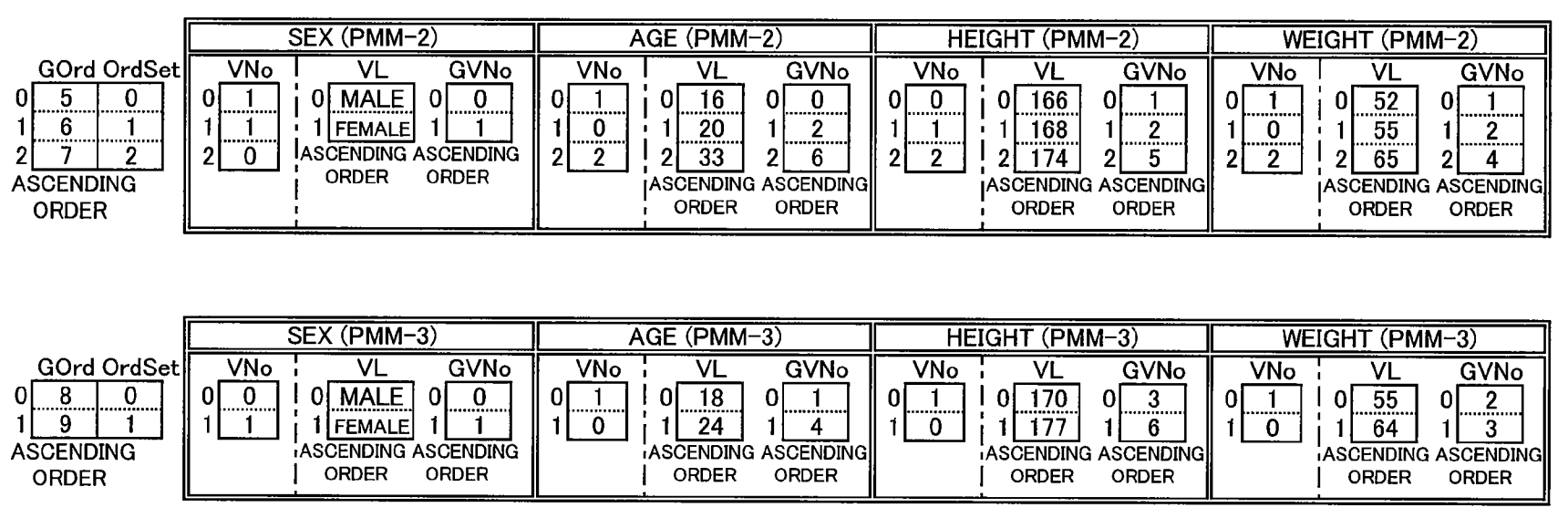

FIG. 64 is a diagram illustrating an array GVNo or the like obtained as a result of the process in terms of the example in FIG. 7.

REFERENCE NUMERALS

Figure 1:
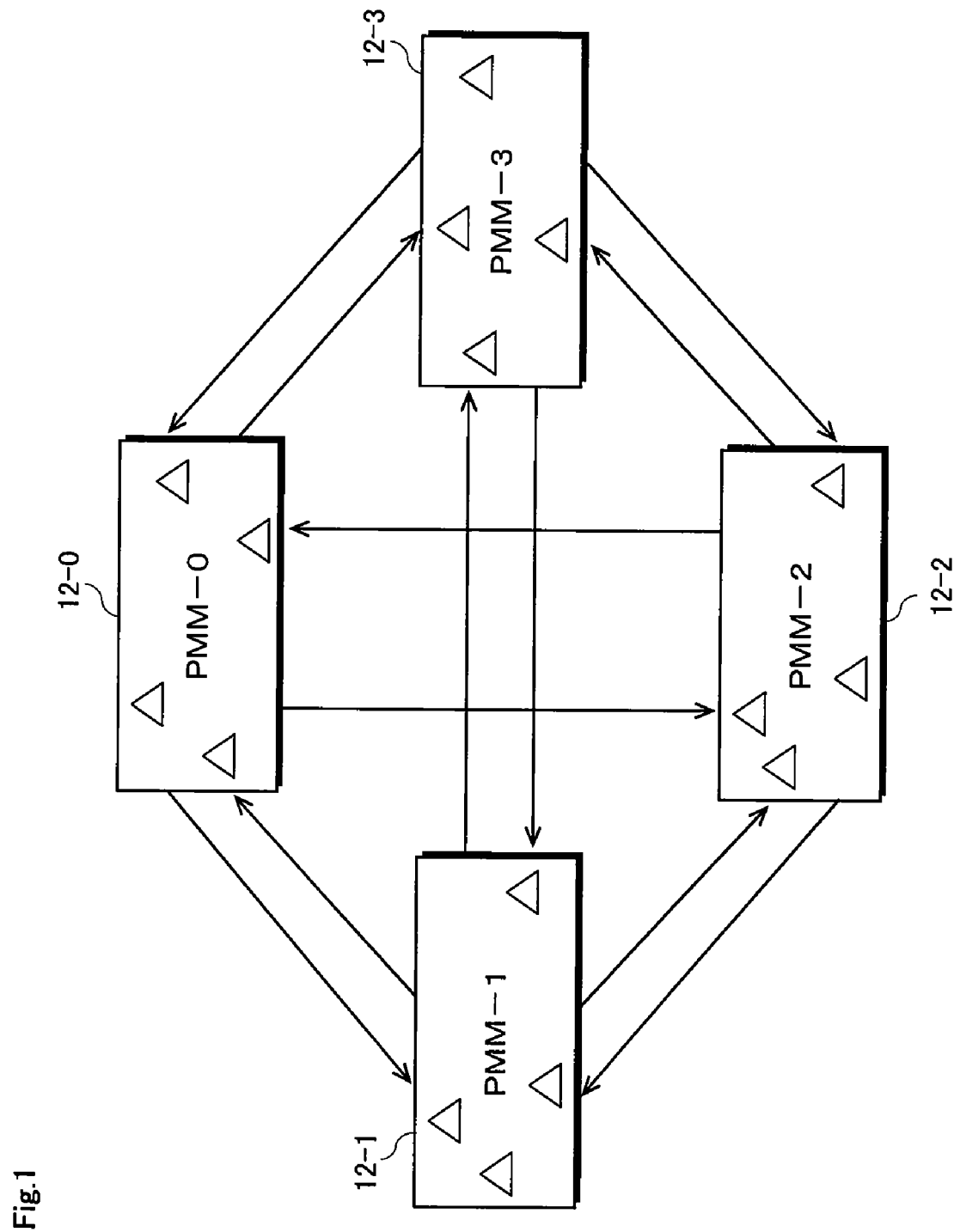
FIG. 1 is a block diagram illustrating the schematics of an information processing system according to an embodiment of the present invention.
Figure 2:
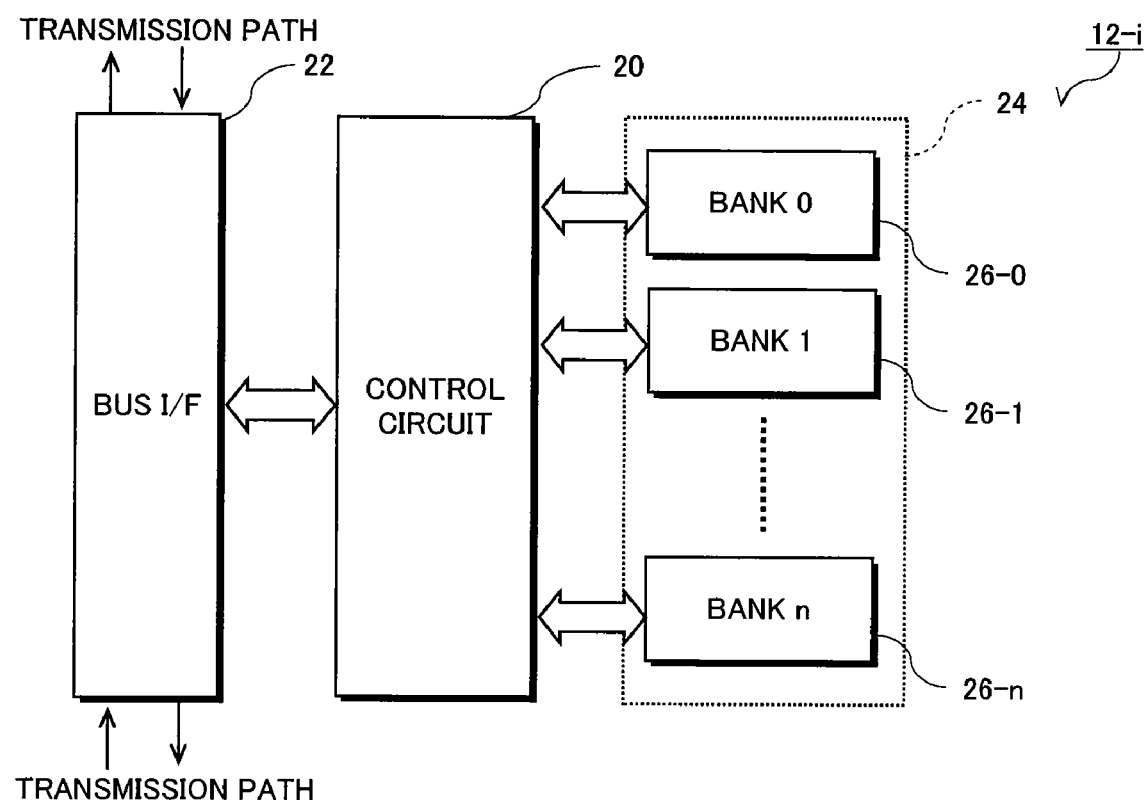
FIG. 2 is a diagram illustrating an example of a PMM configuration according to an embodiment of the present invention.
Figure 8:
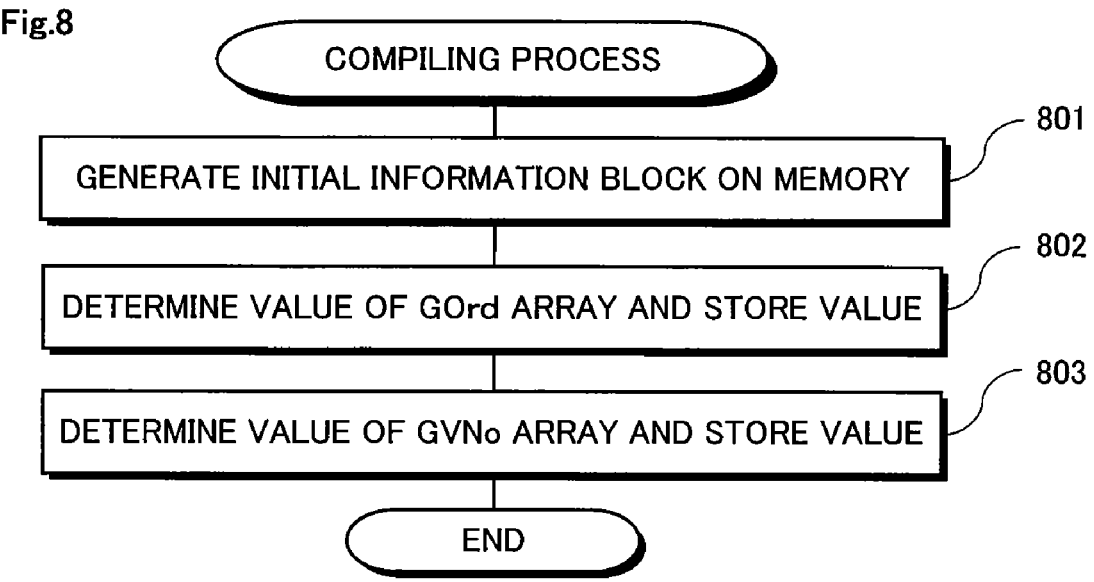
FIG. 8 is a flowchart schematically illustrating compiling process according to the present embodiment.
Figure 9:
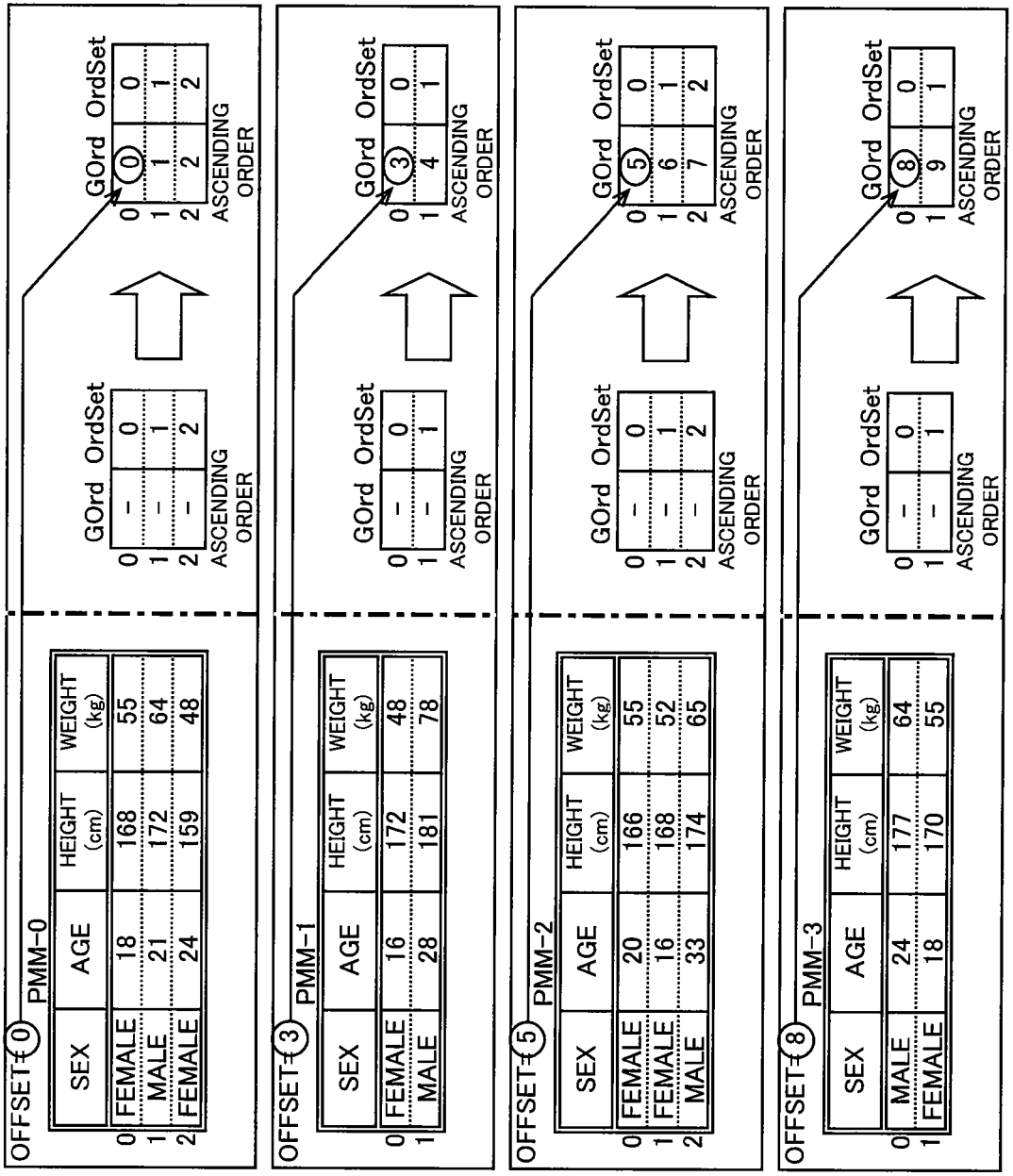
FIG. 9 is a diagram illustrating the arrangement of values in a global ordered set array GOrd in the example illustrated in FIG. 6 and FIG. 7.
Figure 10:
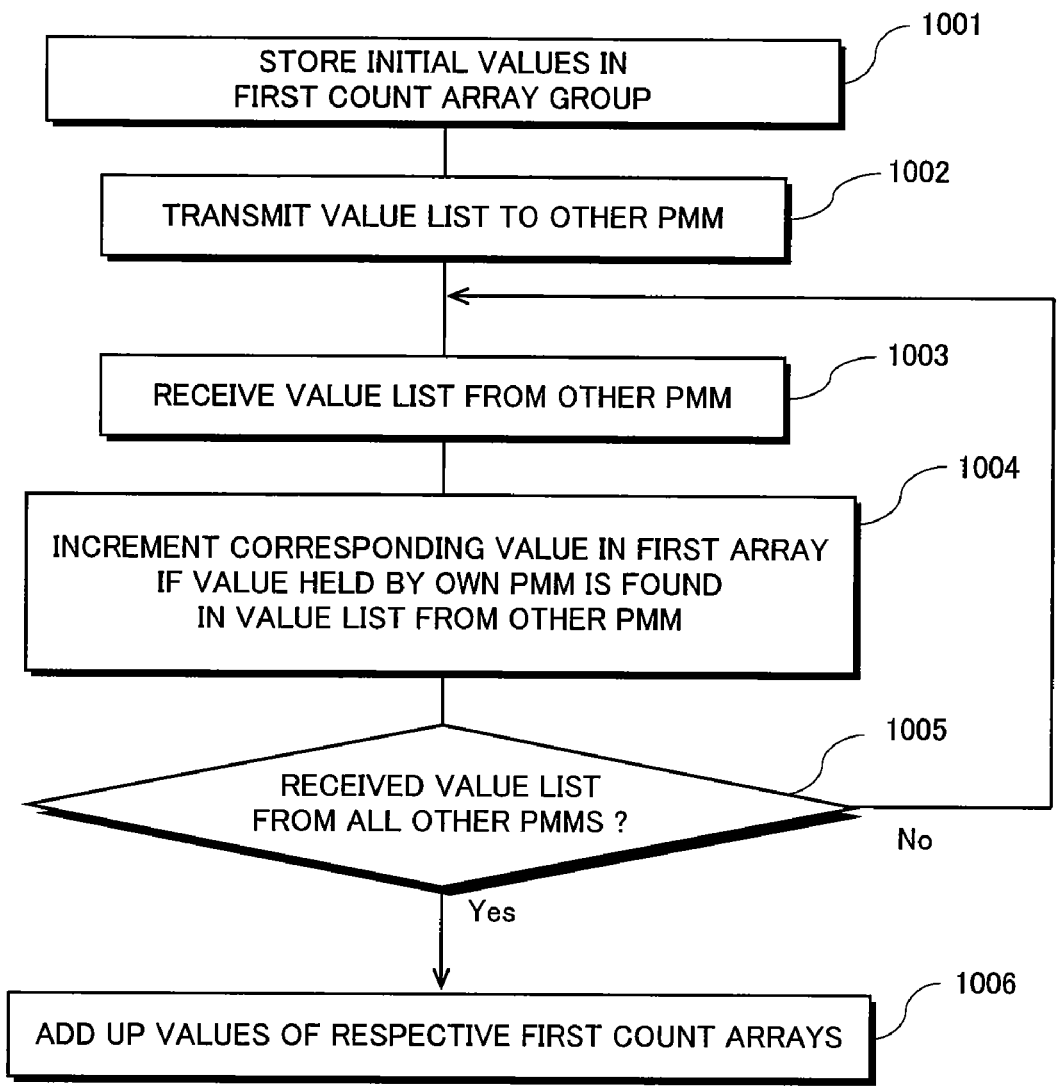
FIG. 10 is a flowchart showing an example of processing executed by each PMM for the purpose of counting the occurrence values in other PMMs.
Figure 11:
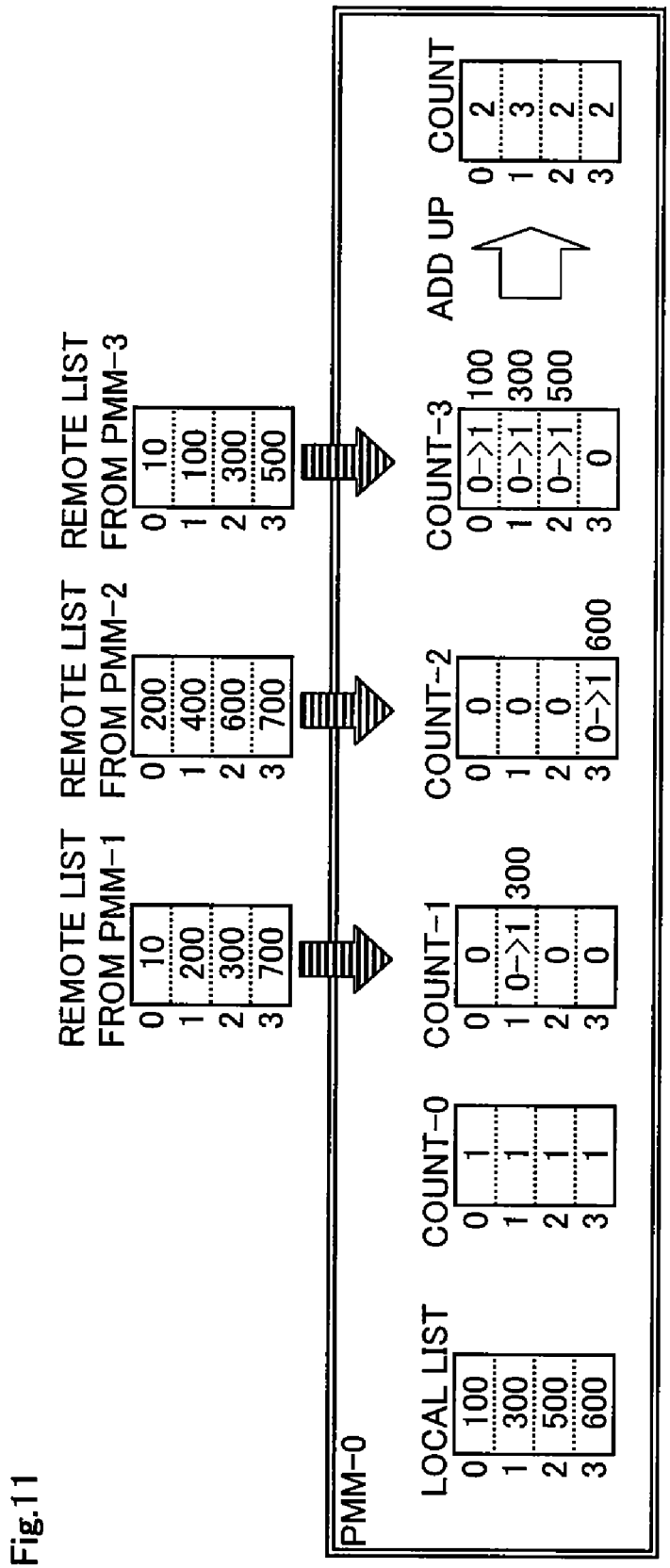
FIG. 11 is a diagram describing processing relating to a first count array within PMM-0.
Figure 12:
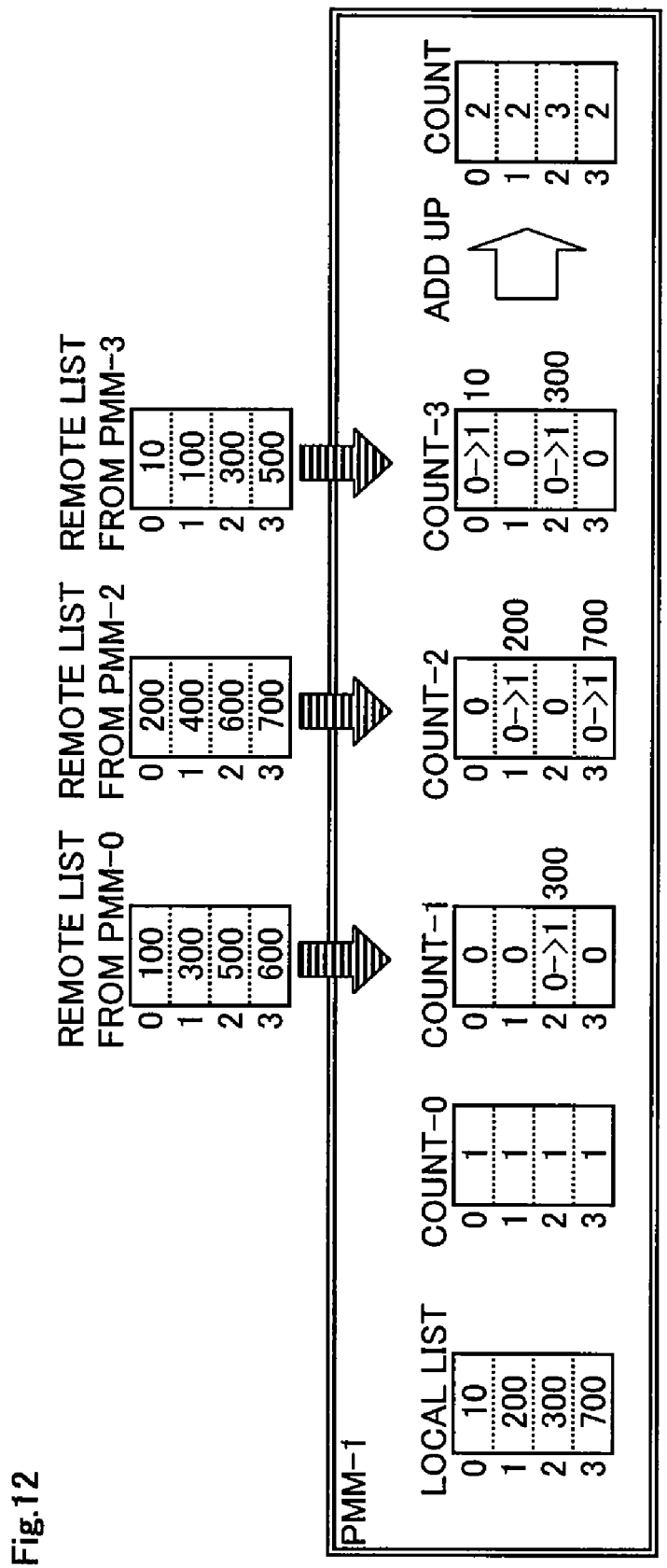
FIG. 12 is a diagram describing processing relating to a first count array within PMM-1.
Figure 13:
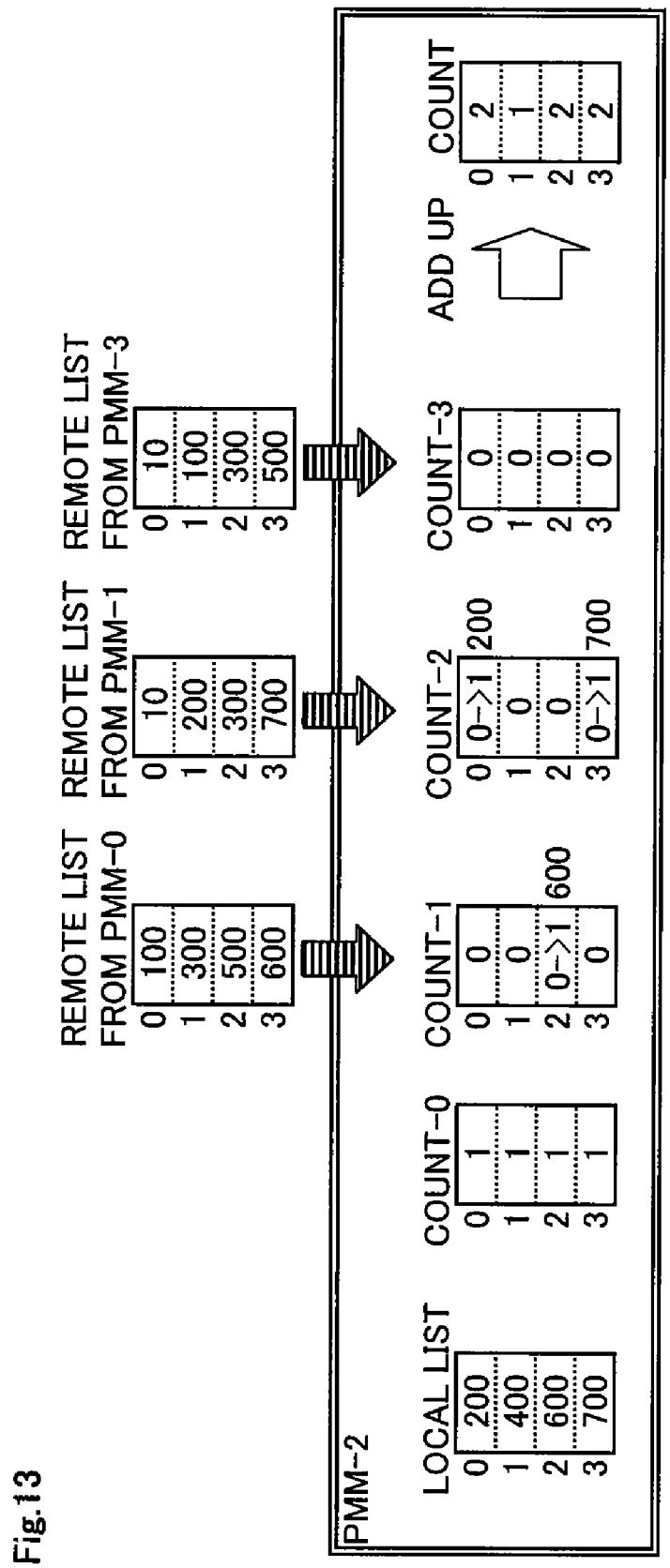
FIG. 13 is a diagram describing processing relating to a first count array within PMM-2.
Figure 14:
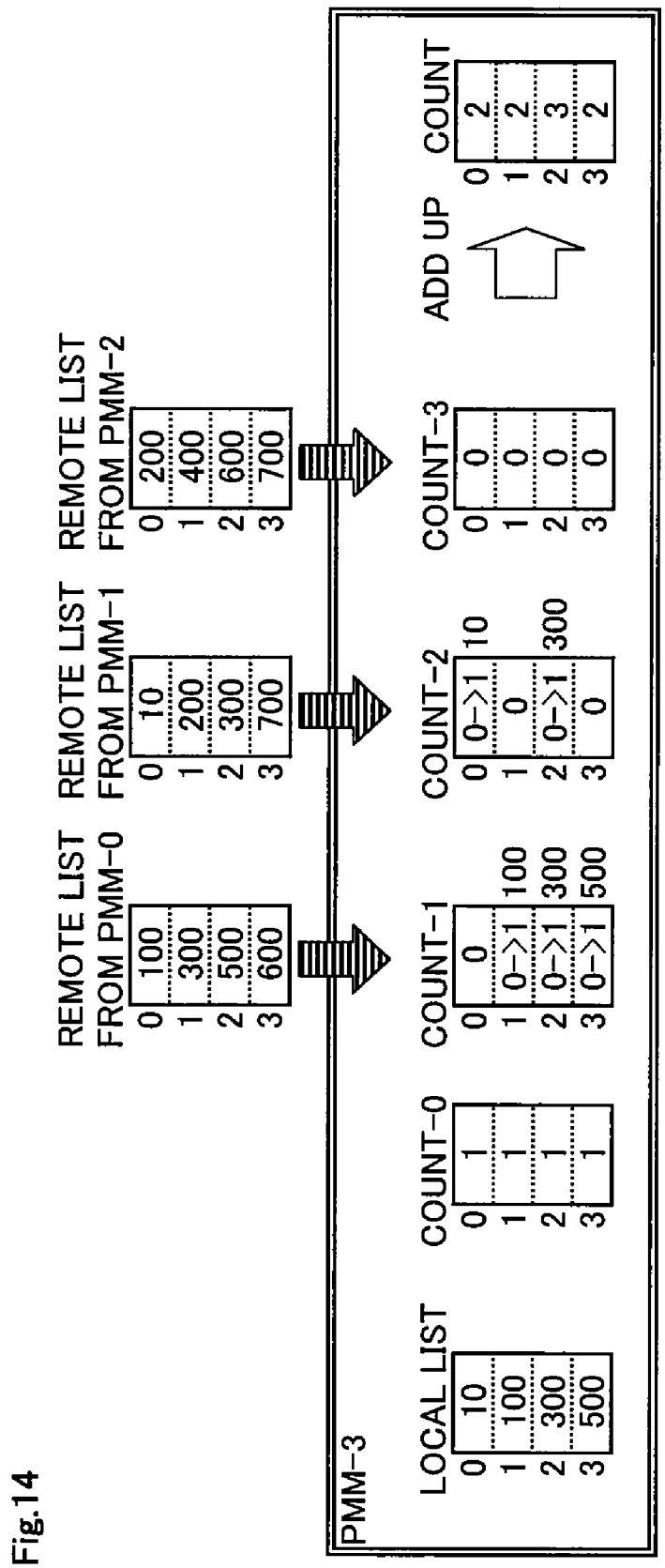
FIG. 14 is a diagram describing processing relating to a first count array within PMM-3.
Figure 15:
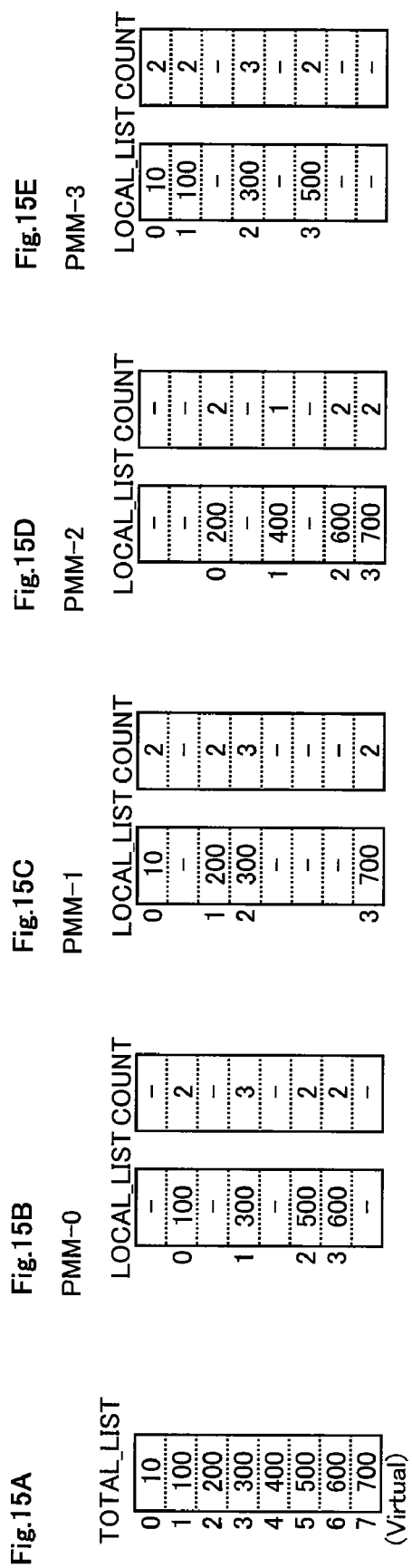
FIG. 15A is a diagram illustrating a virtual value list arranging the values held by each of PMM-0 through PMM-3 in ascending order without duplication.
FIGS. 15B through 15E illustrate arrays virtually representing virtual execution outcomes of the processing shown in FIG. 10 for each of PMM-0 through PMM-3.
Figure 16:
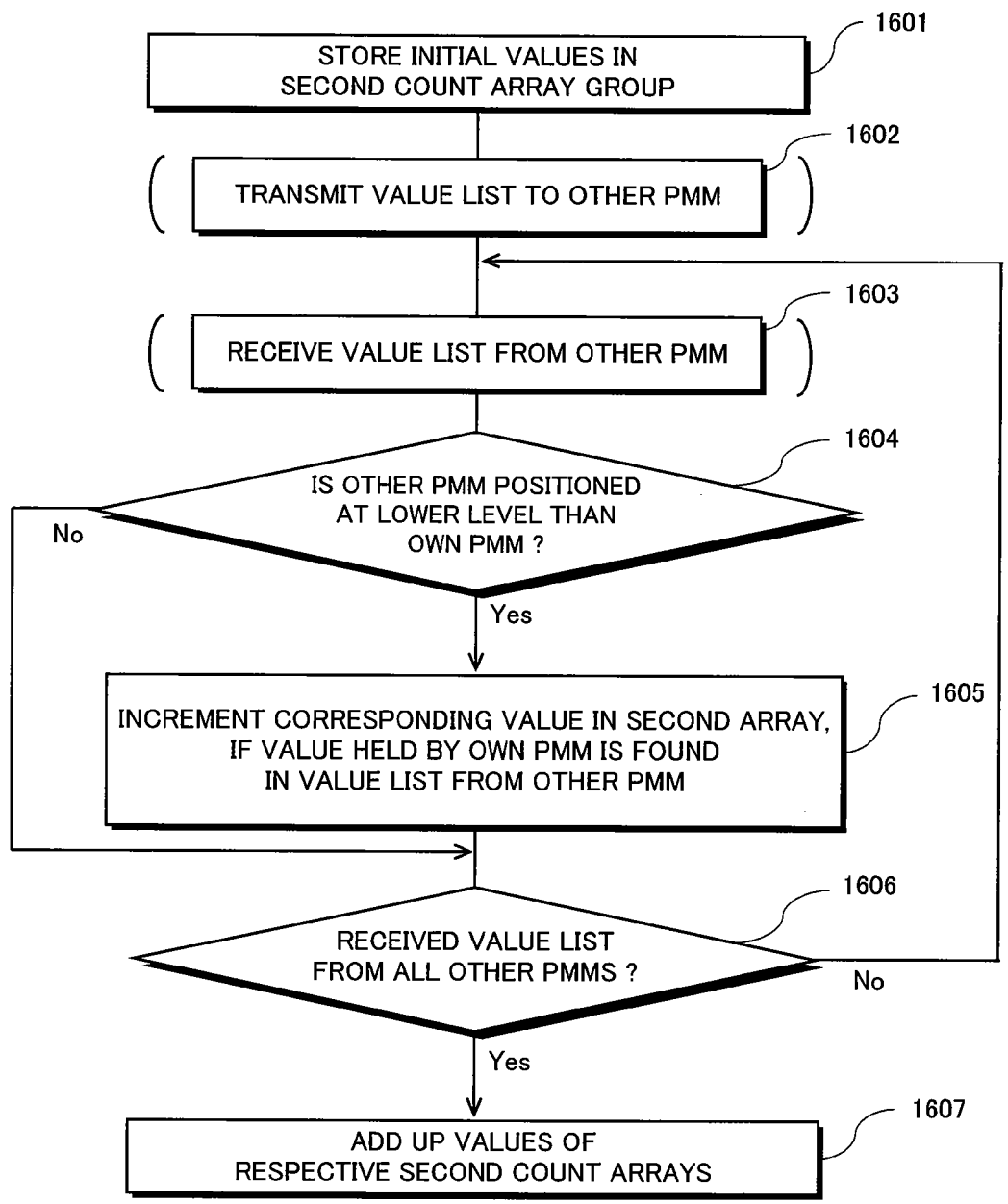
FIG. 16 is a flowchart showing one-sided count processing executed by each PMM.
Figure 17:
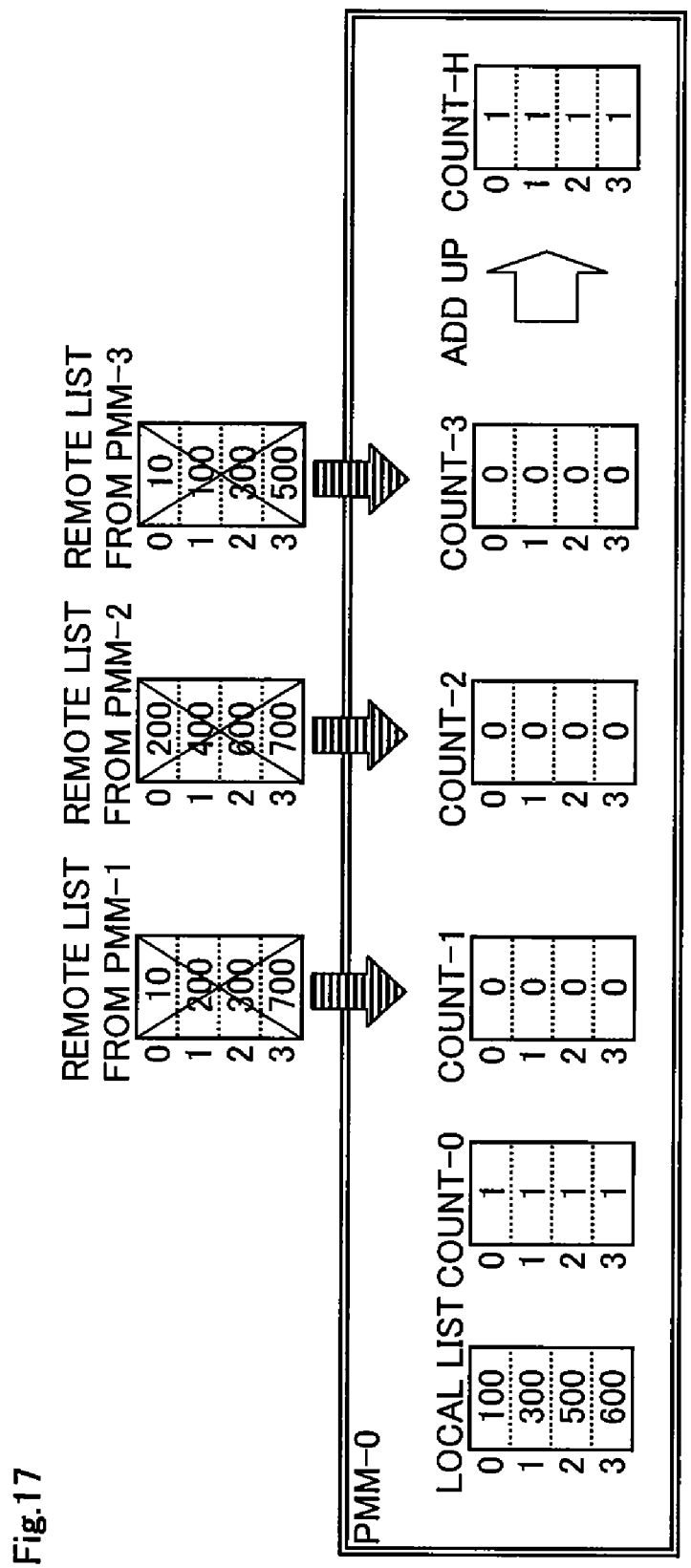
FIG. 17 is a diagram describing processing relating to a second count array within PMM-0.
Figure 18:
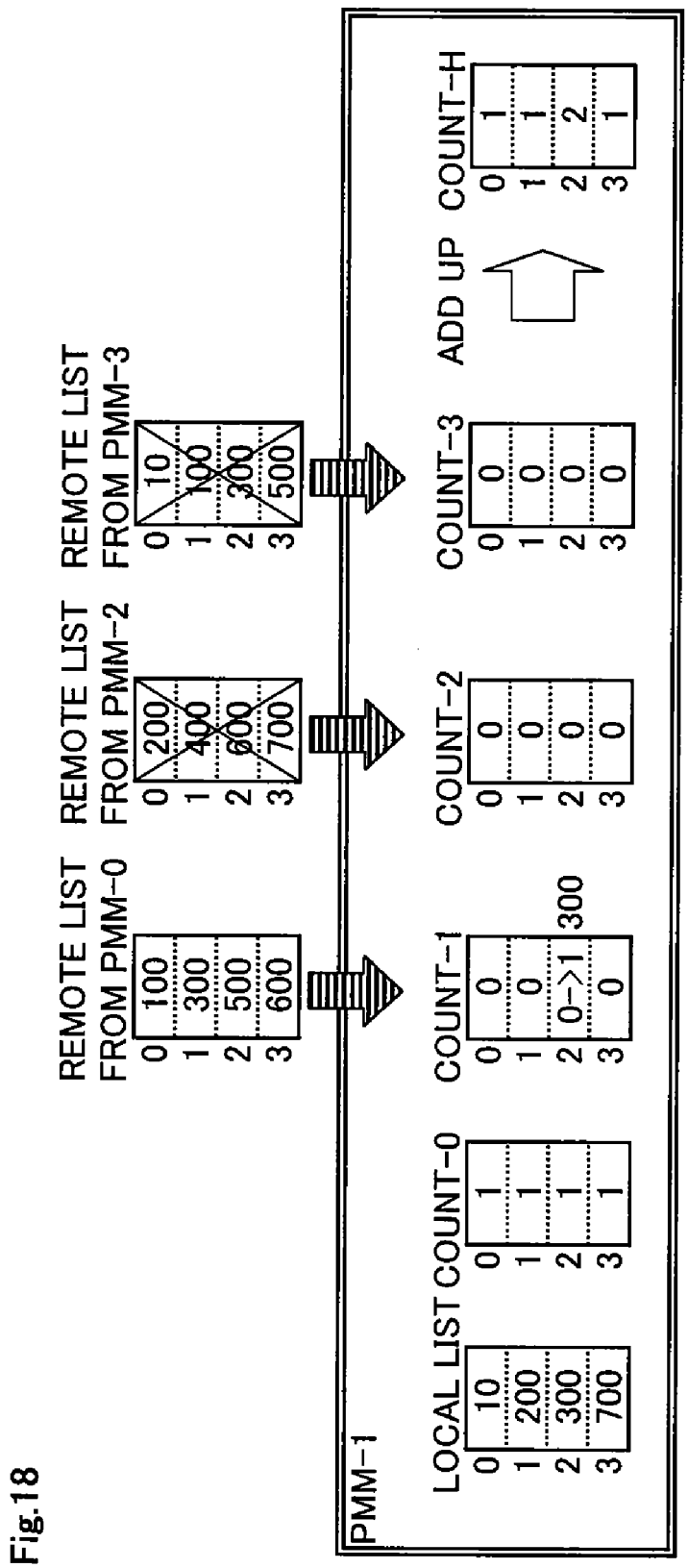
FIG. 18 is a diagram describing processing relating to a second count array within PMM-1.
Figure 19:
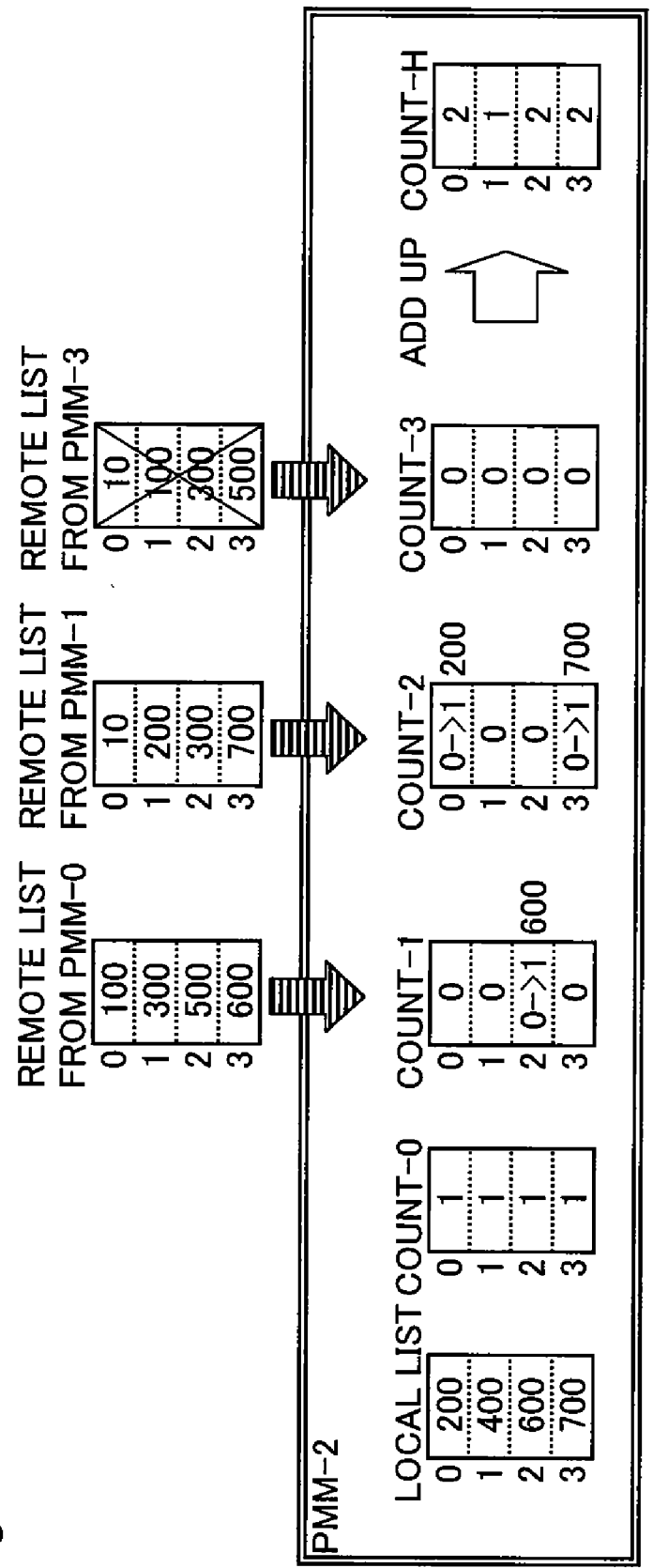
FIG. 19 is a diagram describing processing relating to a second count array within PMM-2.
Figure 20:
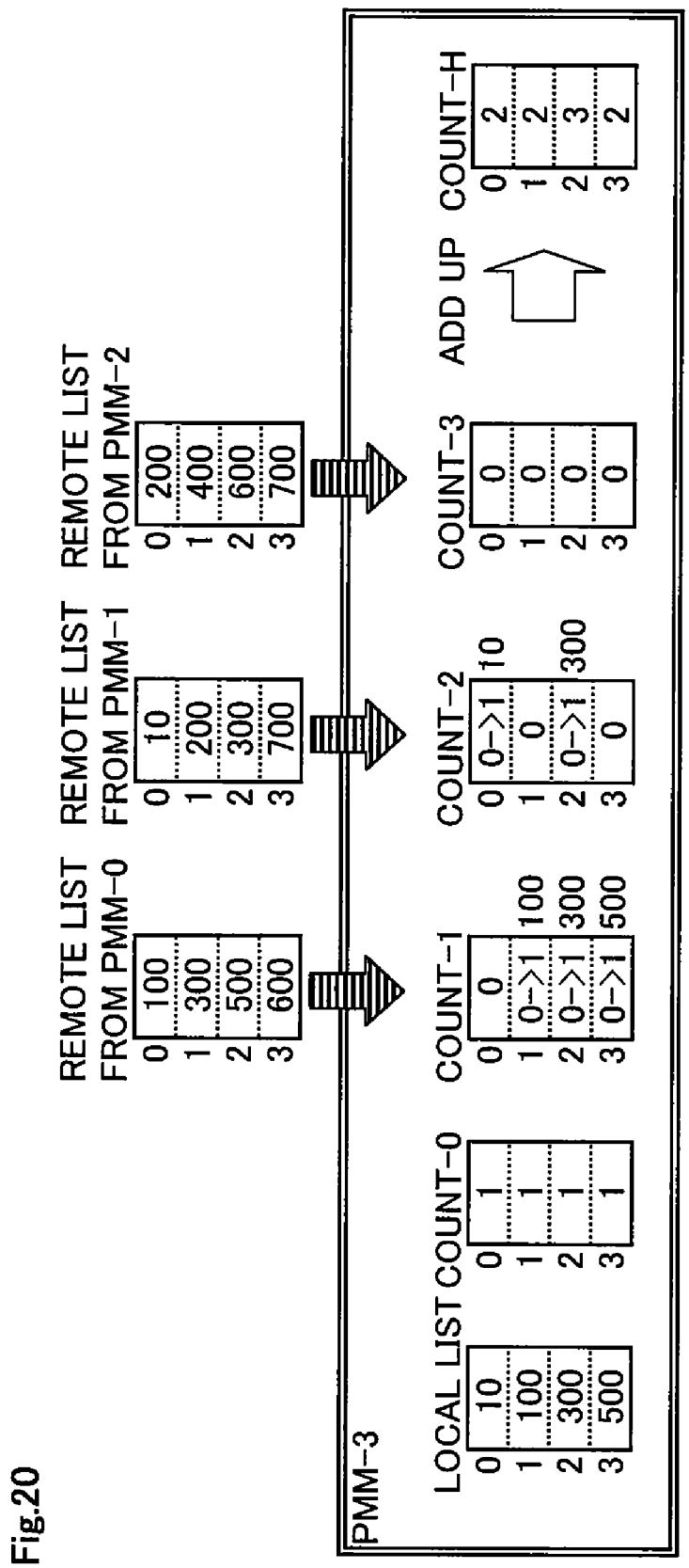
FIG. 20 is a diagram describing processing relating to a second count array within PMM-3.
Figure 21:
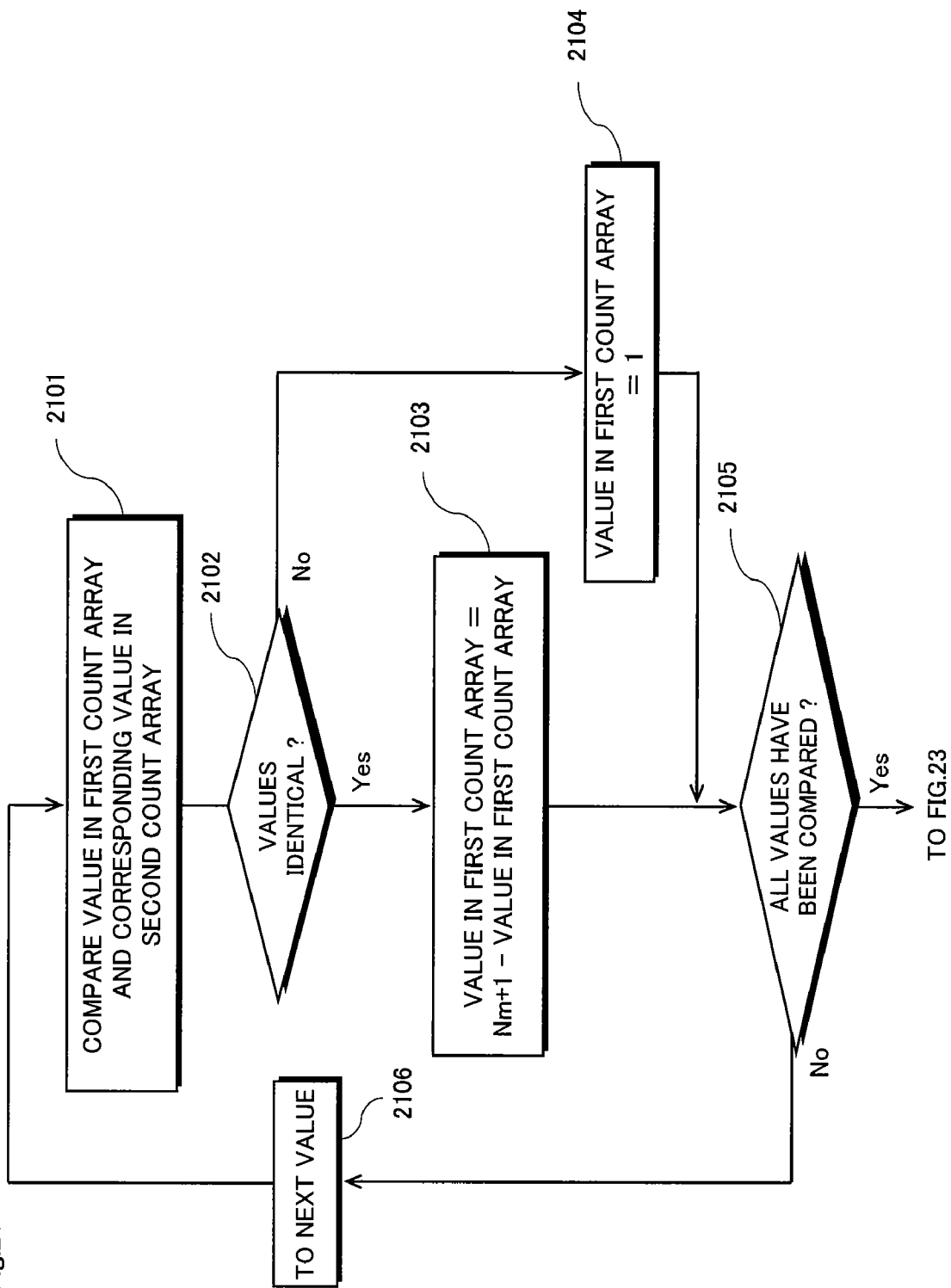
FIG. 21 is a flowchart showing processing executed by each PMM to provide weight to the count values.
Figure 24:
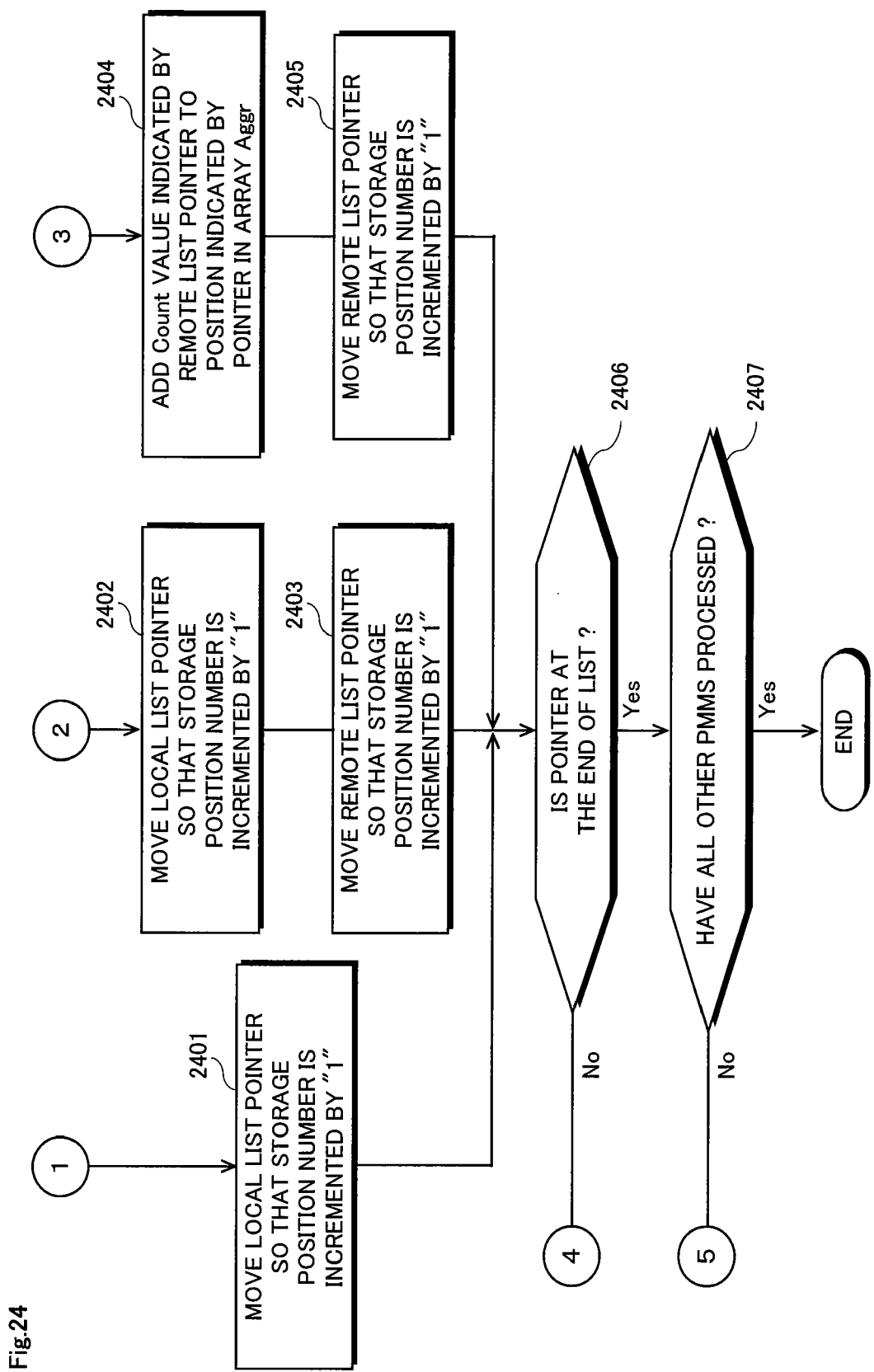
FIG. 24 is a flowchart showing a process executed by each PMM for computing the order of each value within the value list to be held by each PMM.
Figure 26B:
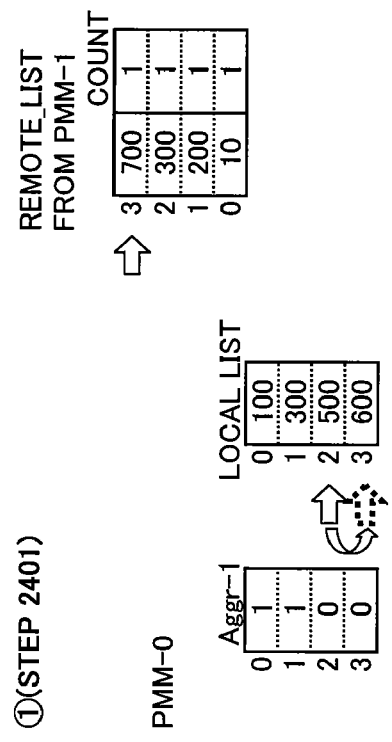
FIG. 26A through FIG. 26C are diagrams describing in detail a process to be executed in the event the PMM-0 receives a remote list from the PMM-1 serving as another PMM.
Figure 26A:
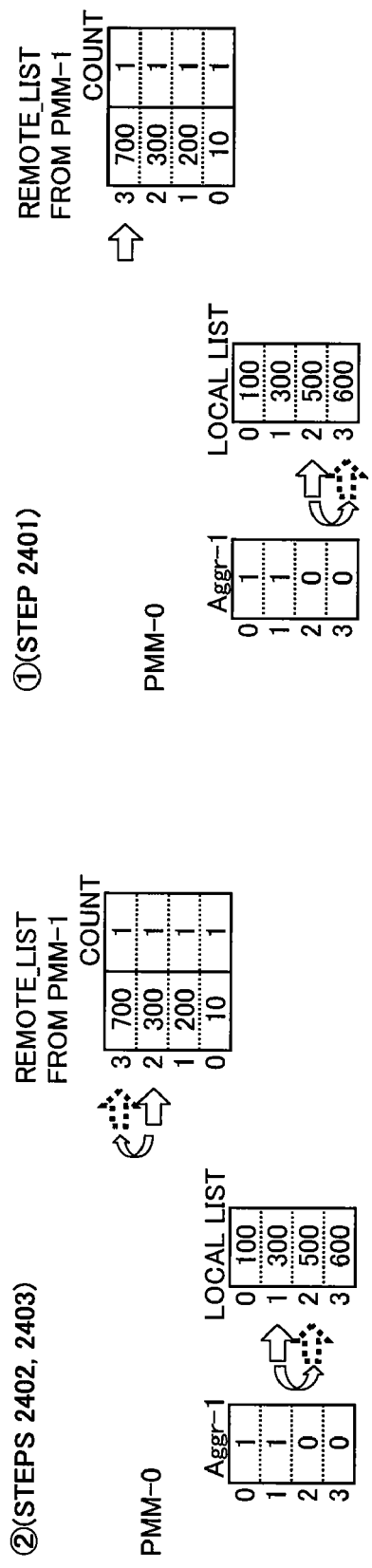
Figure 26C:
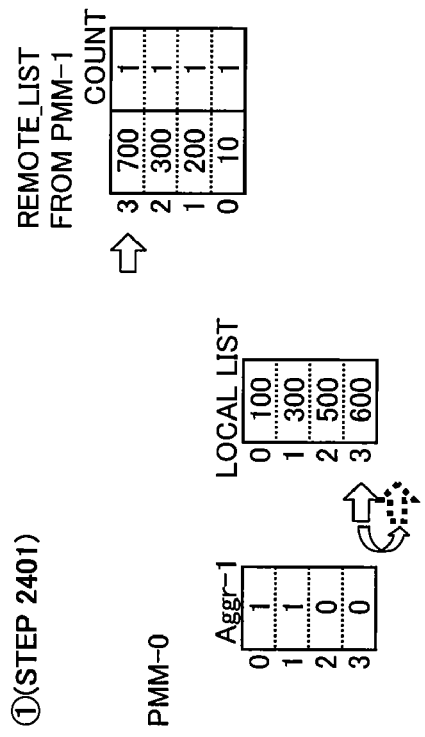
Figure 27:
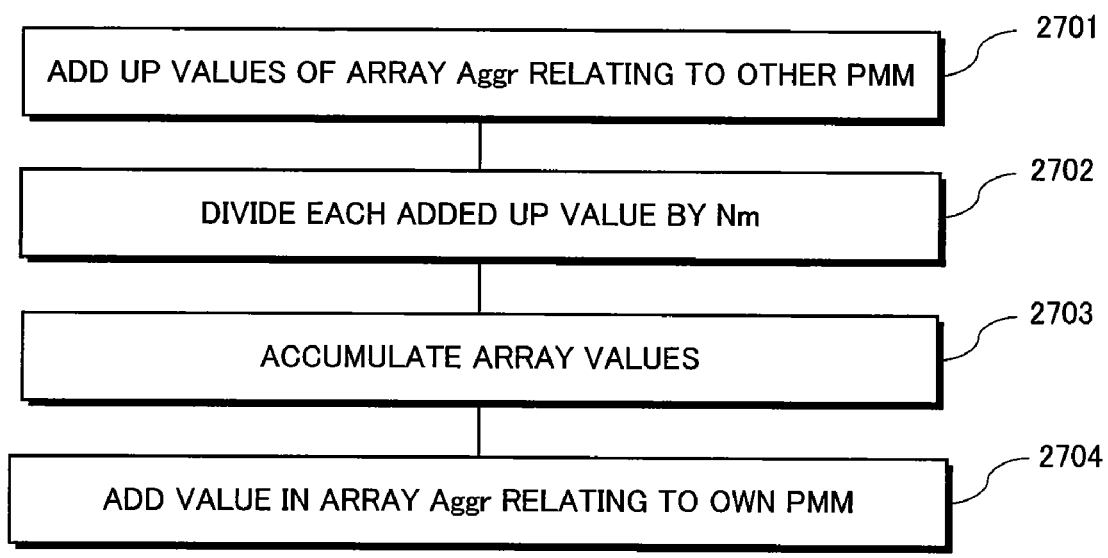
FIG. 27 is a flowchart showing a process executed by each PMM to compute the order of each value within the value list to be held by each PMM.
Figure 28A:
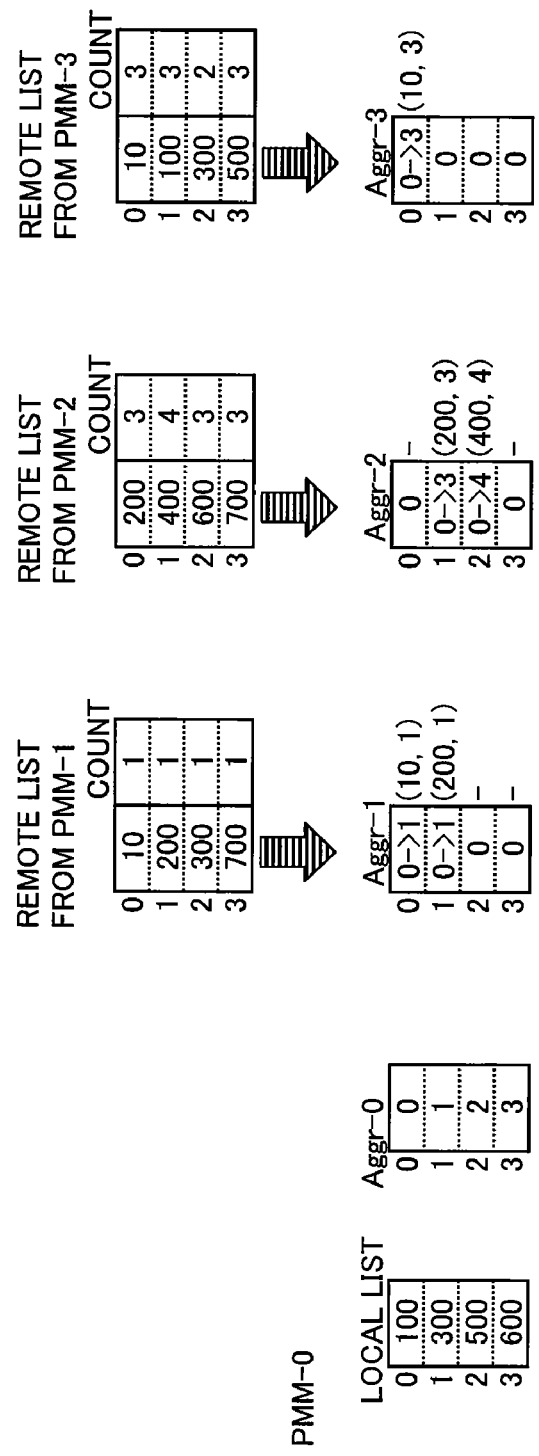
FIGS. 28A and 28B are diagrams describing the state of array or the like when the process in FIGS. 23, 24, and 27 is executed for each of PMM-0 through PMM-3.
Figure 28B:
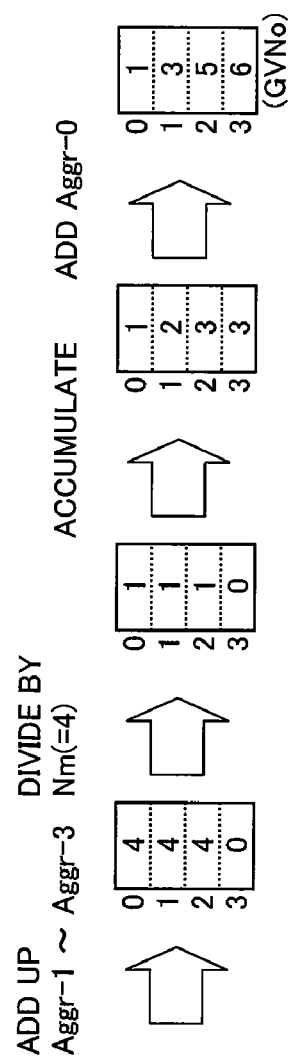
Figure 29A:
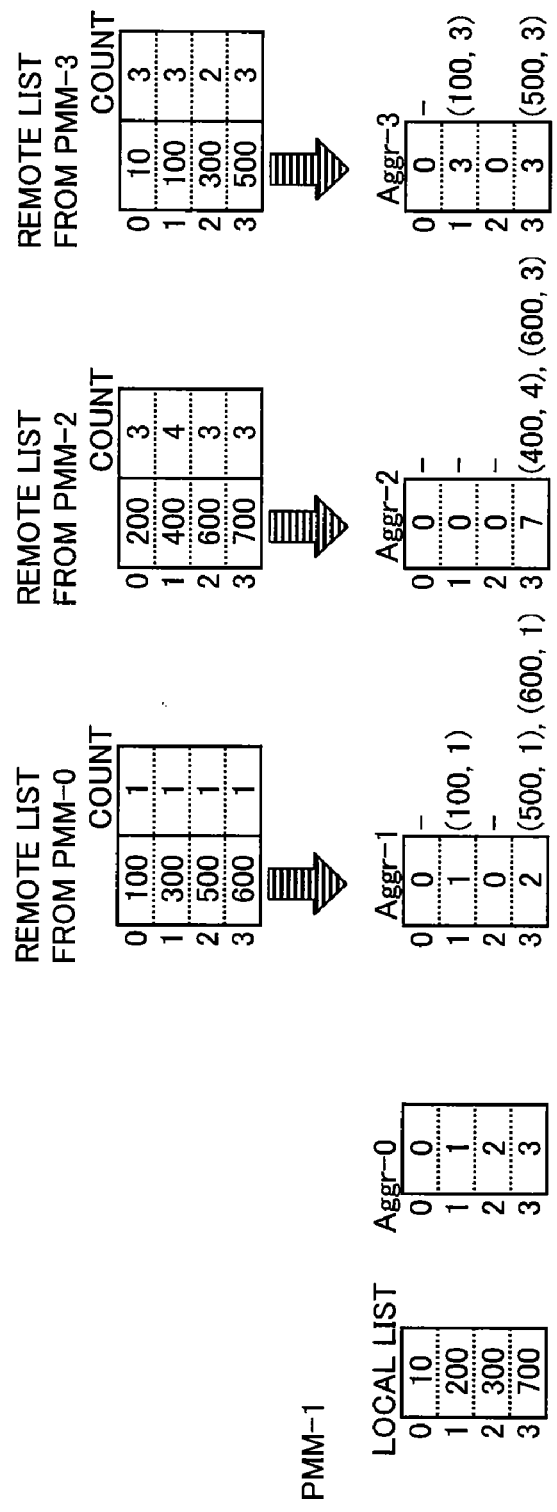
FIGS. 29A and 29B are diagrams describing the state of array or the like when the process in FIGS. 23, 24, and 27 is executed for each of PMM-0 through PMM-3.
Figure 29B:
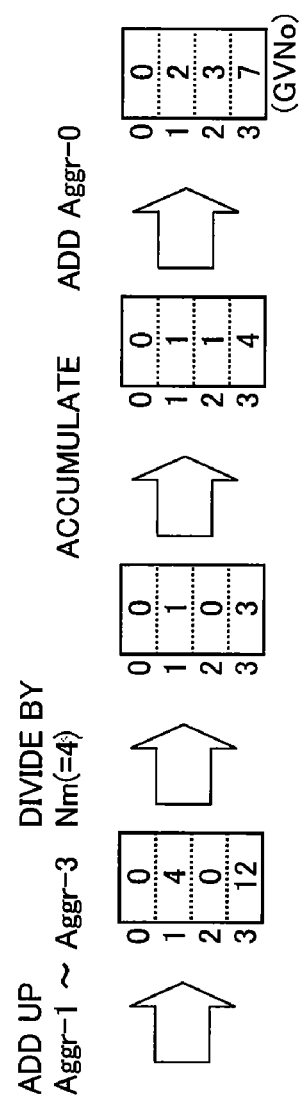
Figure 31A:
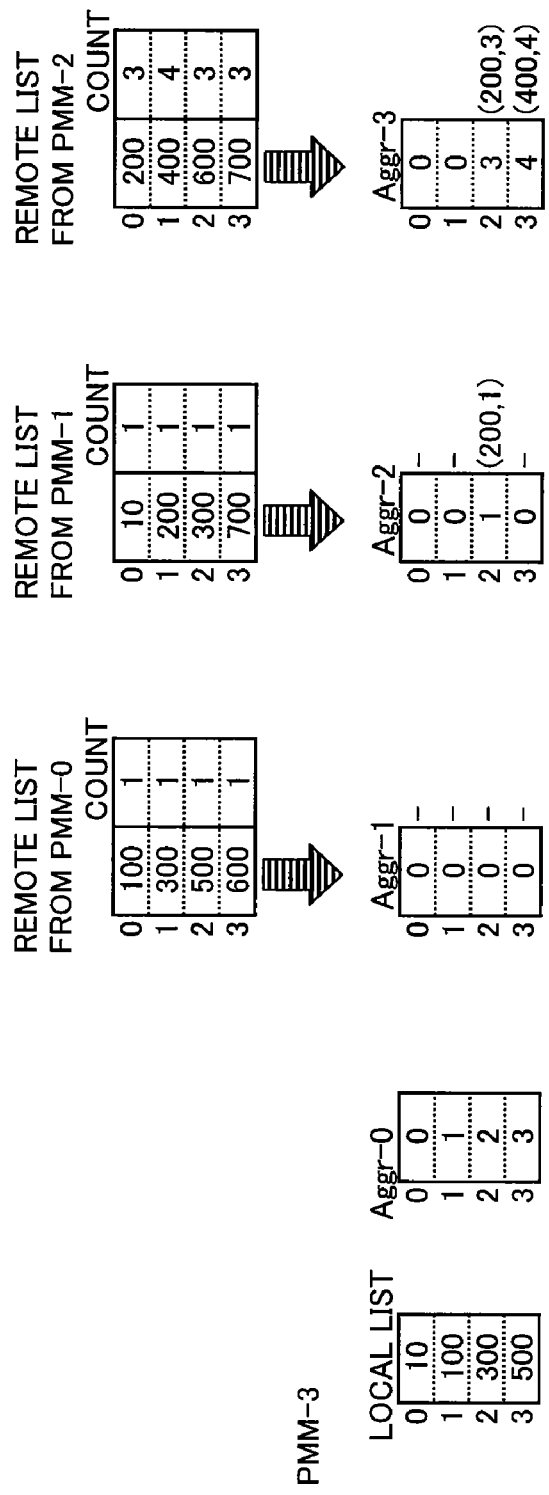
FIGS. 31A and 31B are diagrams describing the state of array or the like when the process in FIGS. 23, 24, and 27 is executed for each of PMM-0 through PMM-3.
Figure 31B:
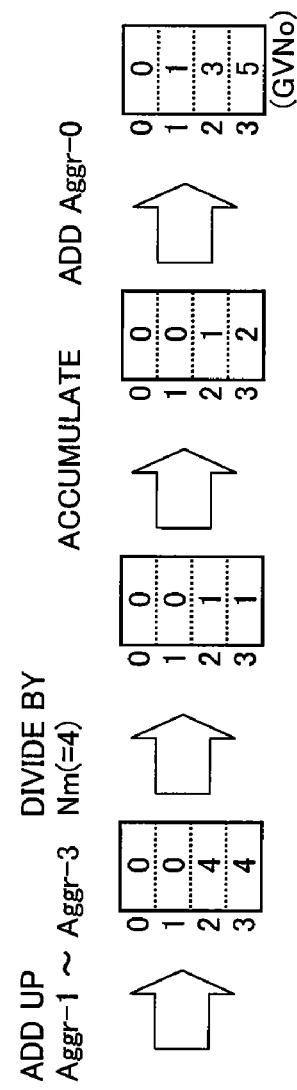
Figures 35A, 35B:
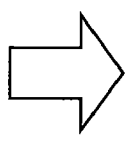
FIGS. 35A and 35B are diagrams each illustrating examples of a value list which includes a set of integers and an example of the value list to which ordering is applied.
Figure 36:
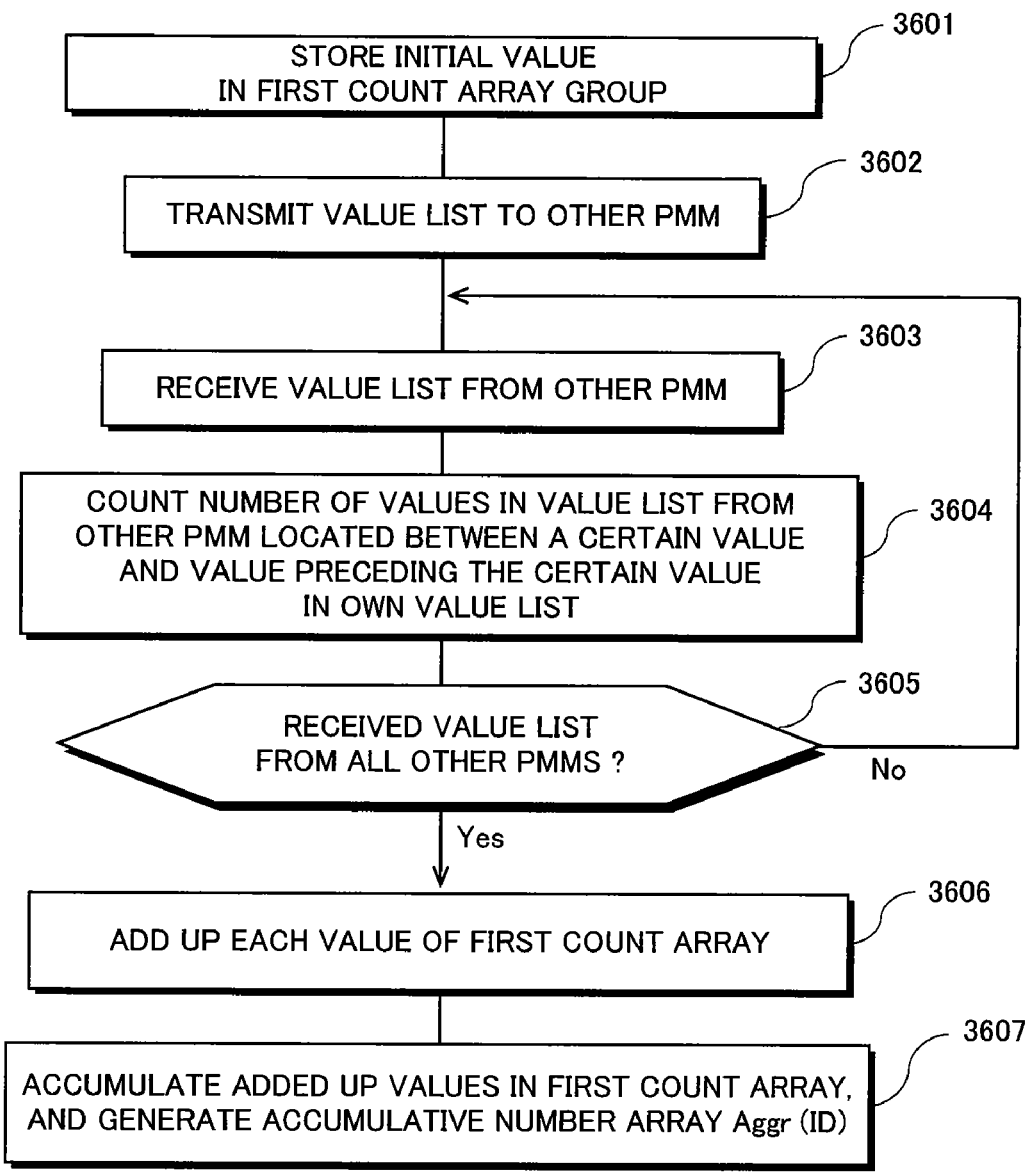
FIG. 36 is a flowchart showing an example of a process corresponding to a first step executed by each PMM when assigning integers, which have a fixed order and are not necessarily consecutive, to the values.
Figure 37A:
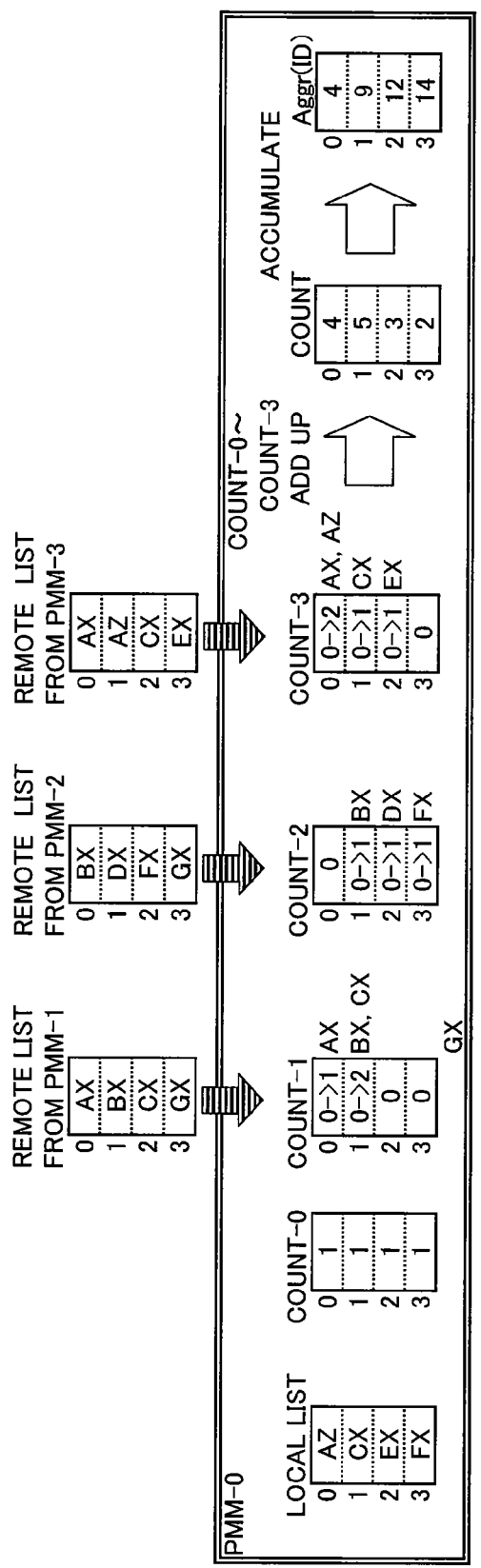
FIGS. 37A and 37B are diagrams describing generating of accumulative number arrays Aggr (ID) by each of PMM-0 and PMM-1.
Figure 37B:
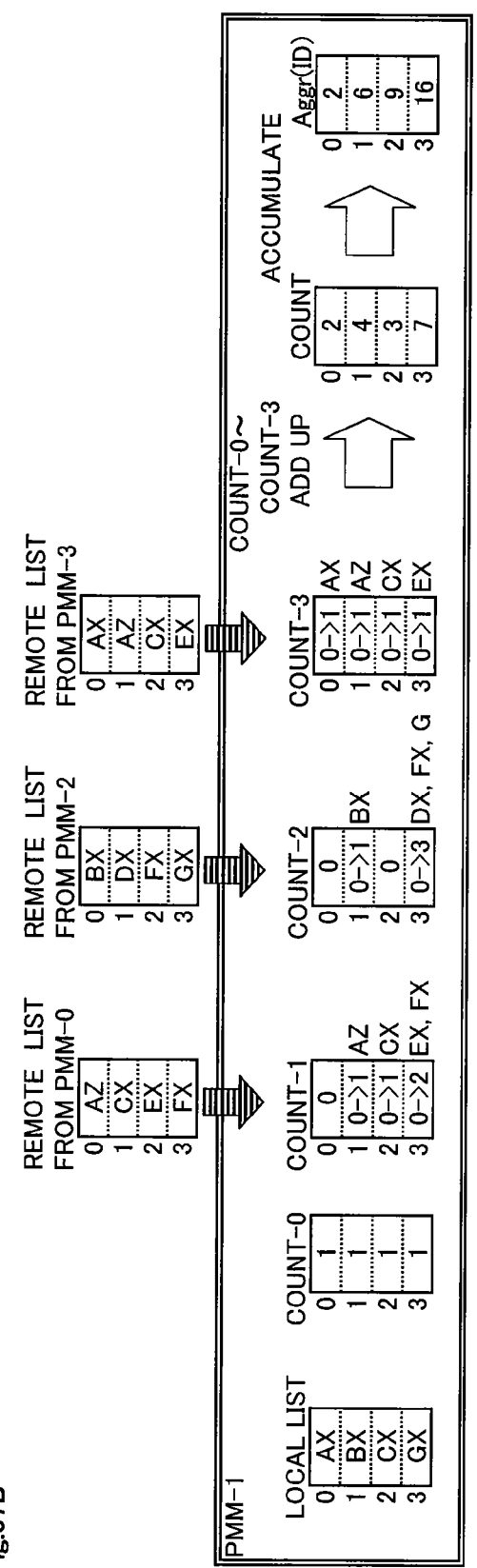
Figure 38A:
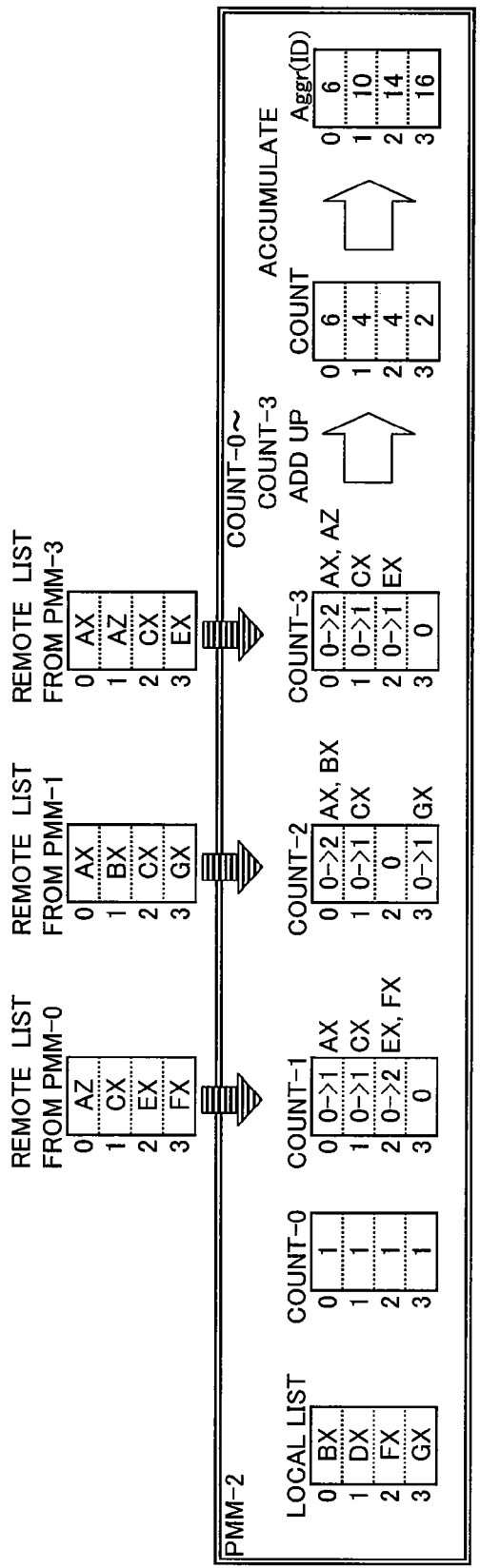
FIGS. 38A and 38B are diagrams describing generating of accumulative number arrays Aggr (ID) by each of PMM-0 and PMM-1.
Figure 38B:
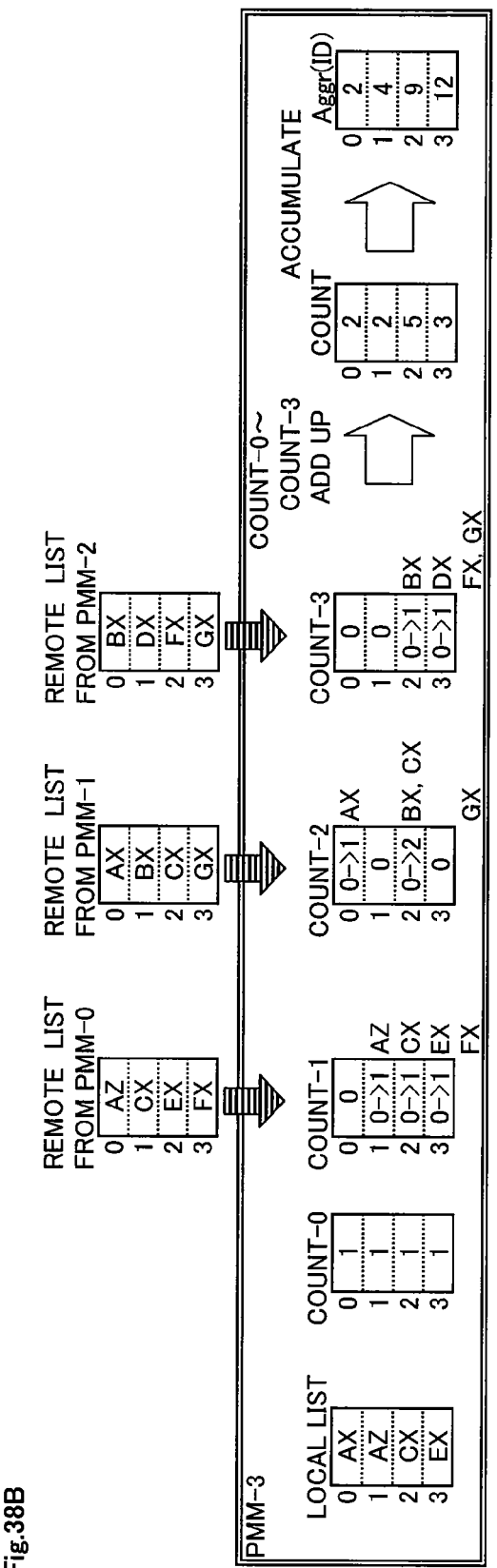
Figure 40:
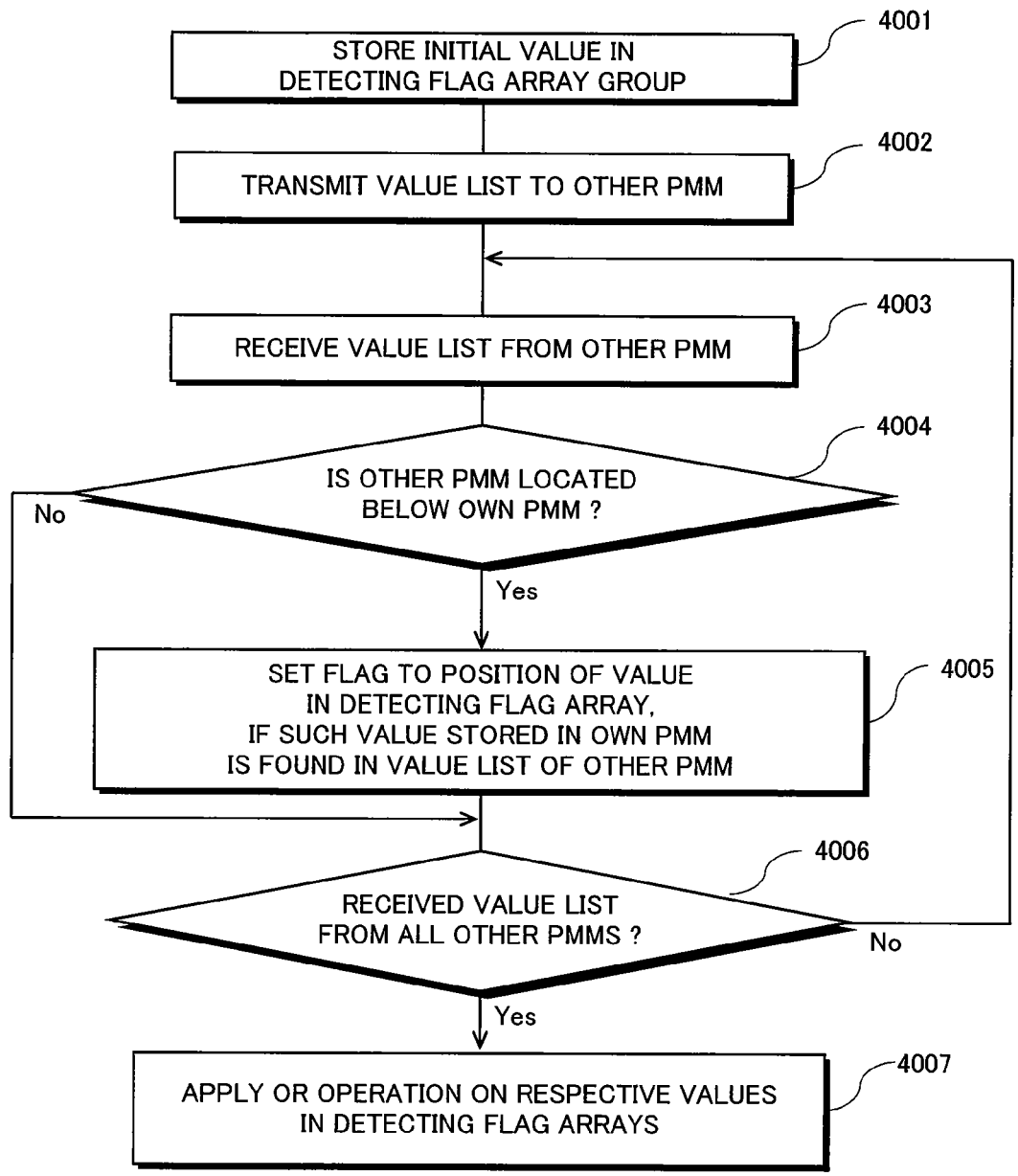
FIG. 40 is a flowchart showing generating processing of a detecting flag array and logical OR array.
Figure 41A:
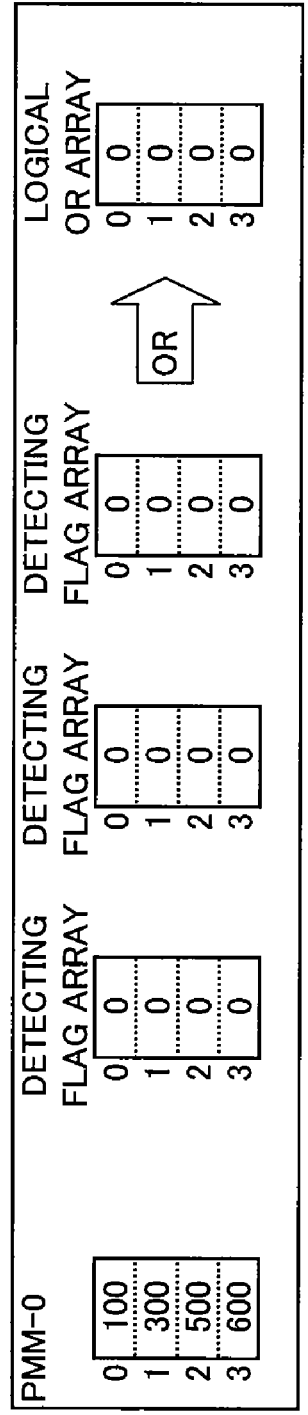
FIGS. 41A and 41B are diagrams describing processing relating to detecting flag arrays for PMM-0 and PMM-1.
Figure 41B:
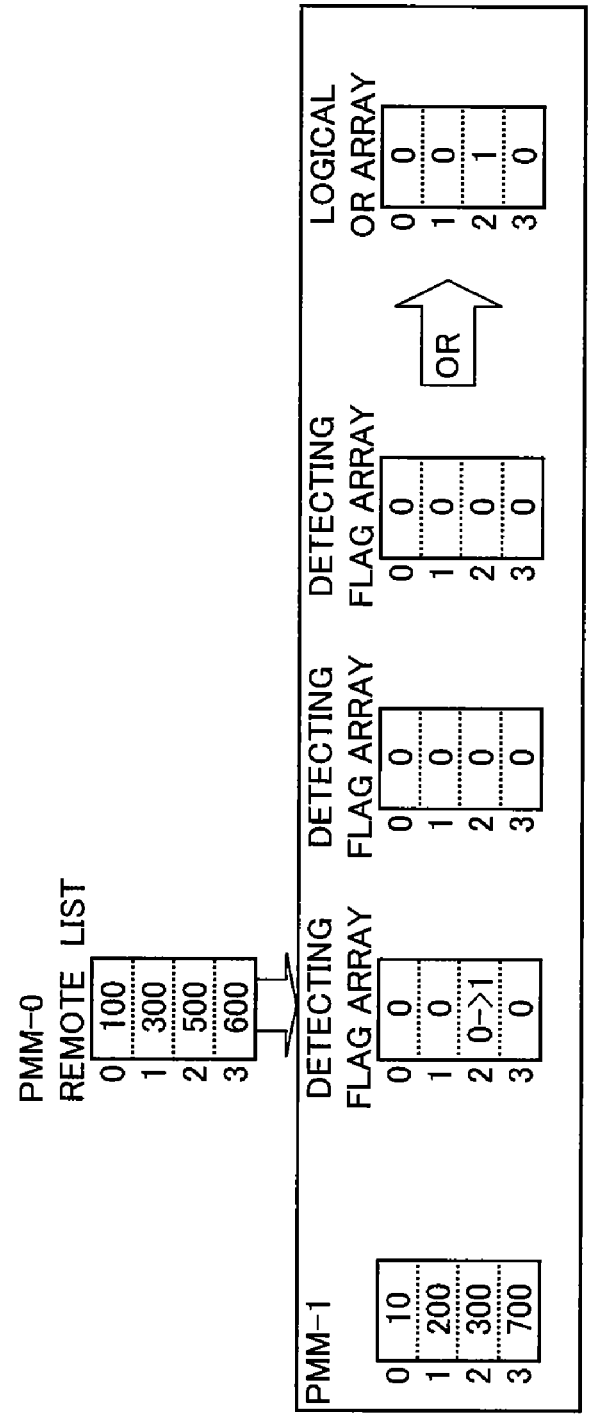
Figure 42A:
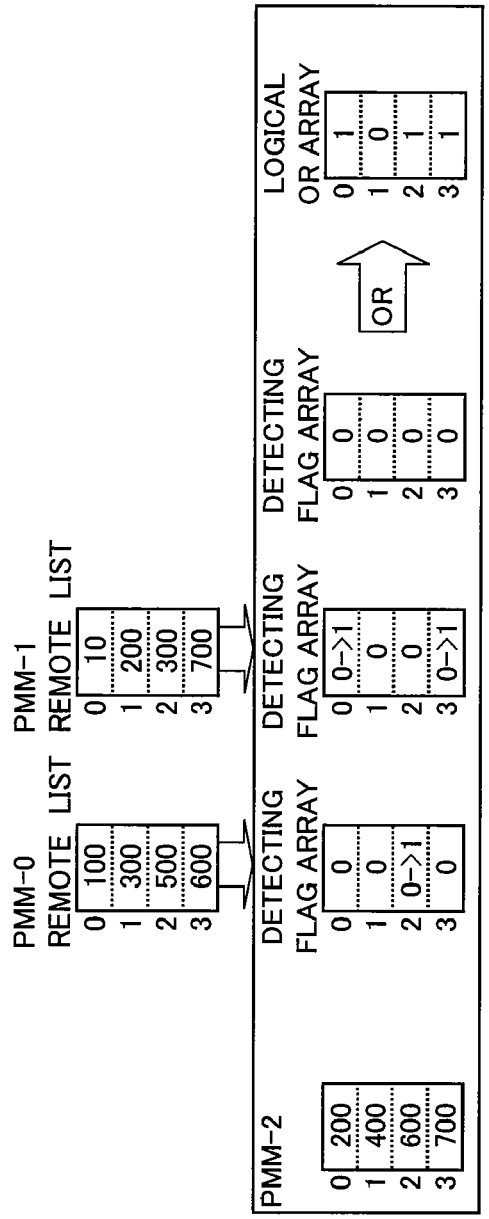
FIGS. 42A and 42B are diagrams describing processing relating to detecting flag arrays for PMM-2 and PMM-3.
Figure 42B:
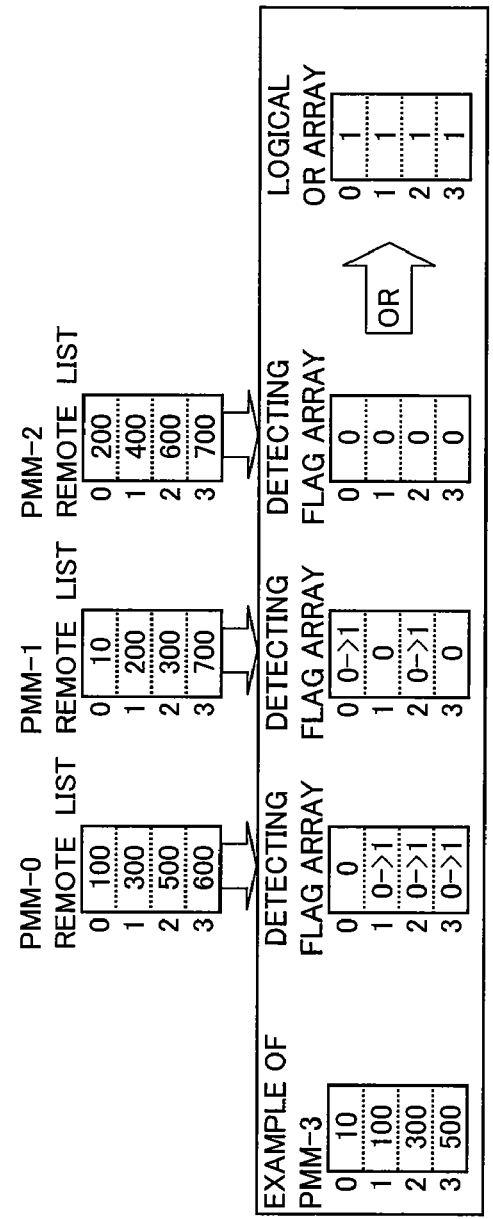
Figure 45A:
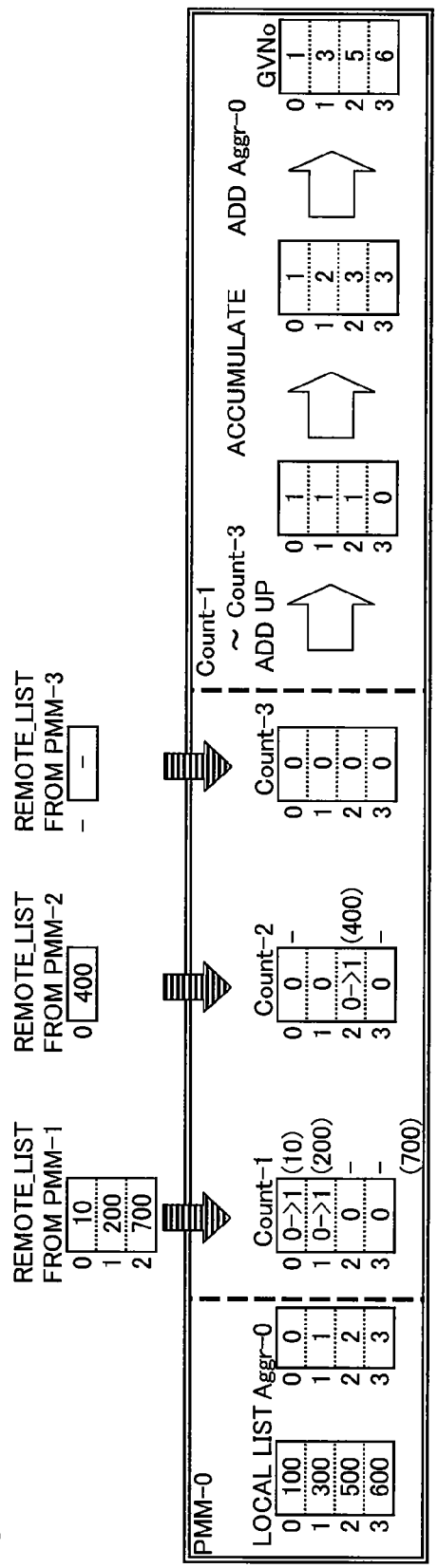
FIGS. 45A and 45B are diagrams illustrating the state of array for each of PMM-0 and PMM-1 when the process shown in FIG. 44 is executed.
Figure 45B:
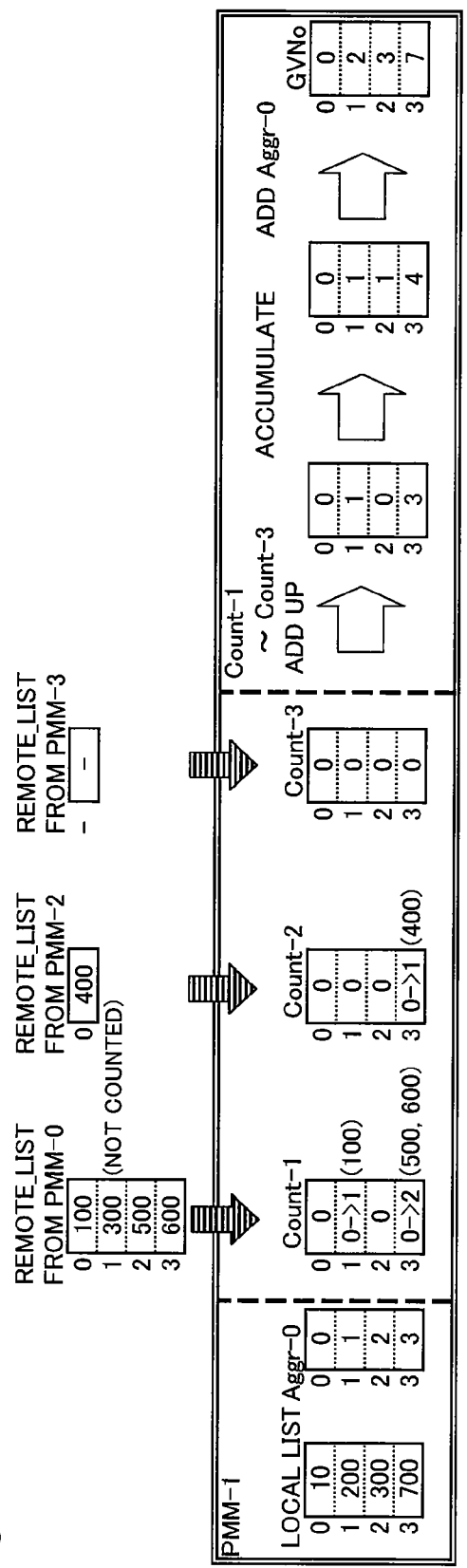
Figure 47:
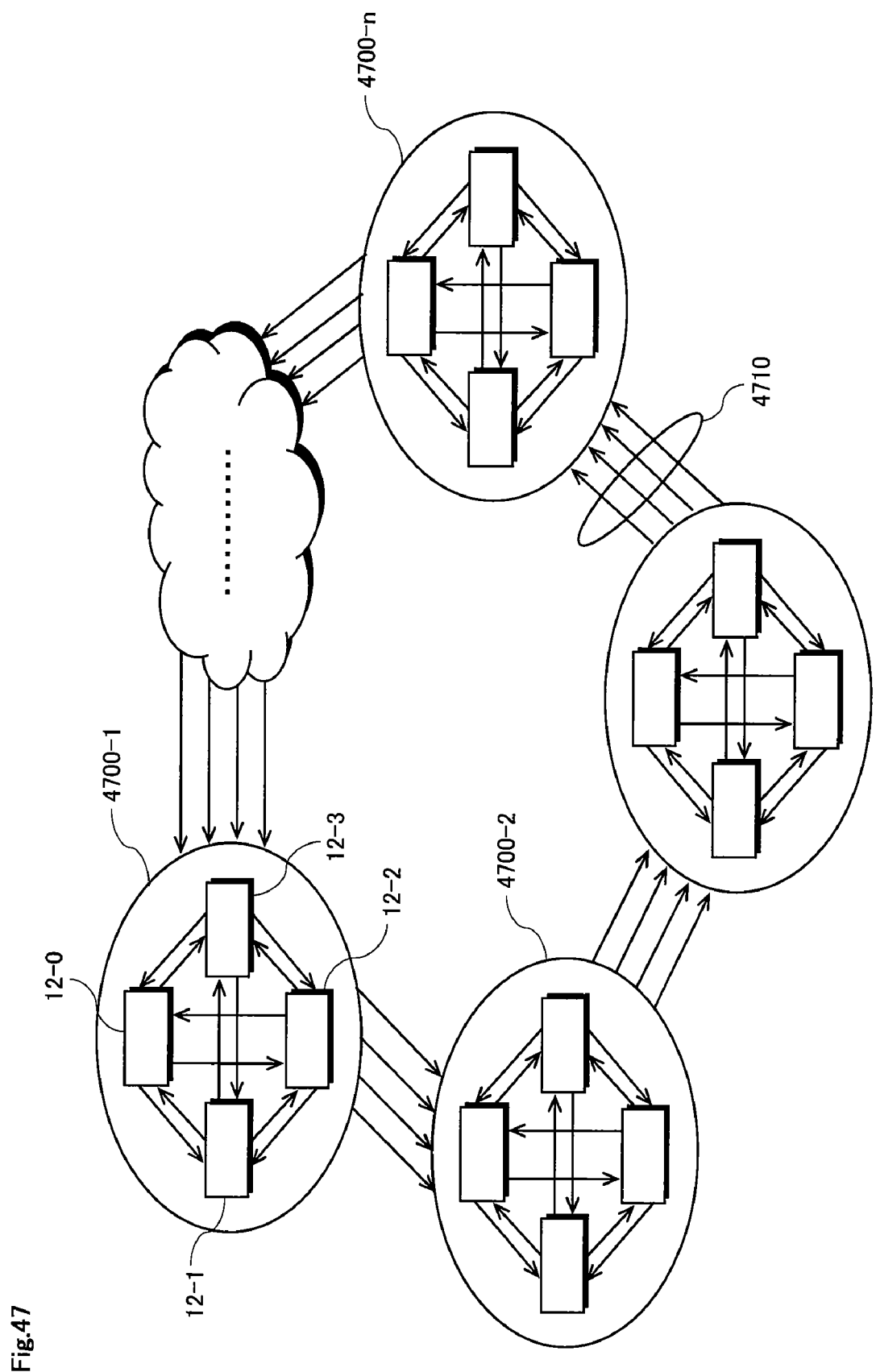
FIG. 47 is a block diagram showing an entire information processing system according to an embodiment of the present invention.
Figure 48:
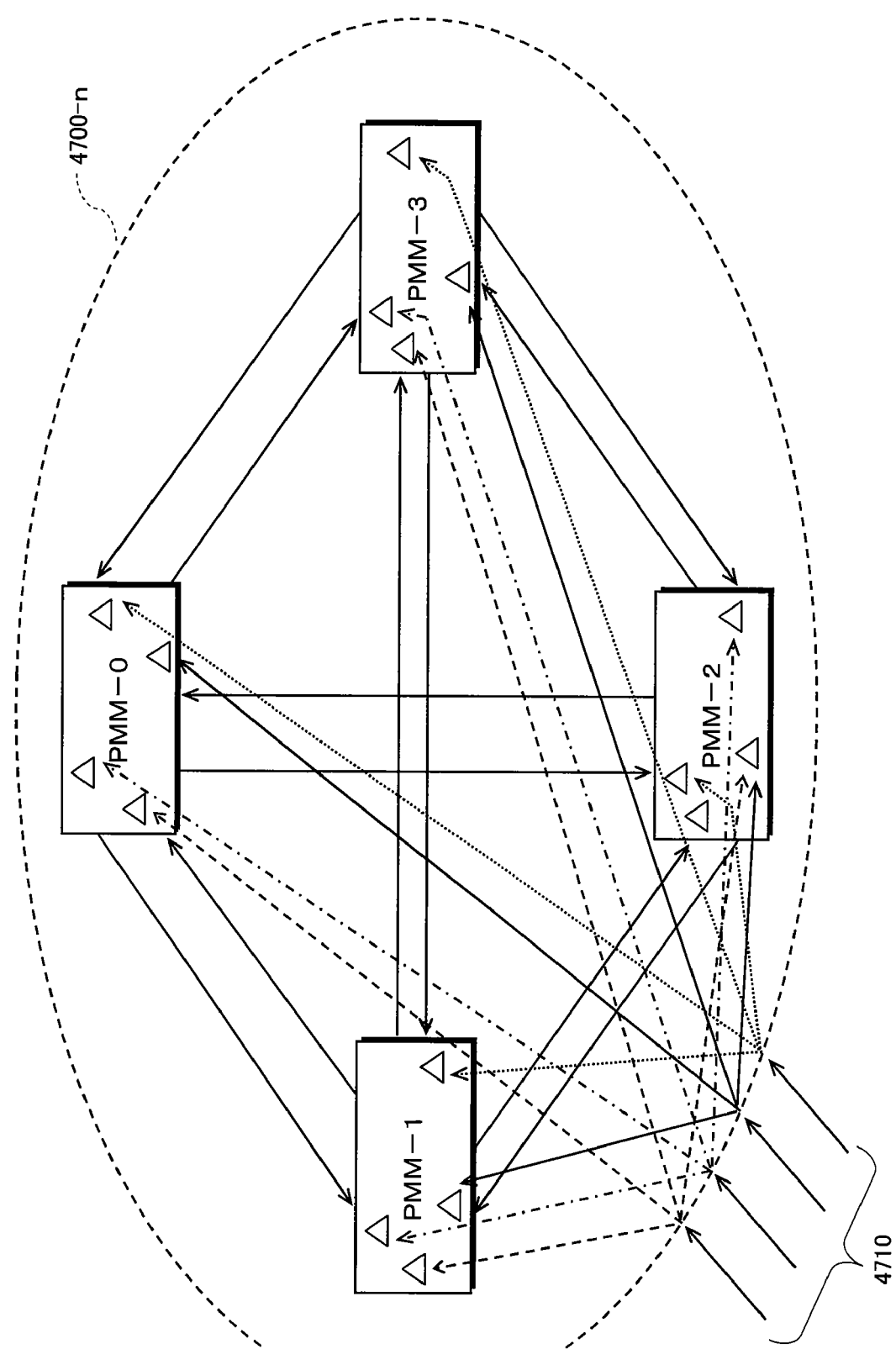
FIG. 48 is a diagram, similar to a block diagram in FIG. 1, except that transmission paths for data communication from other groups are added.
Figure 49:
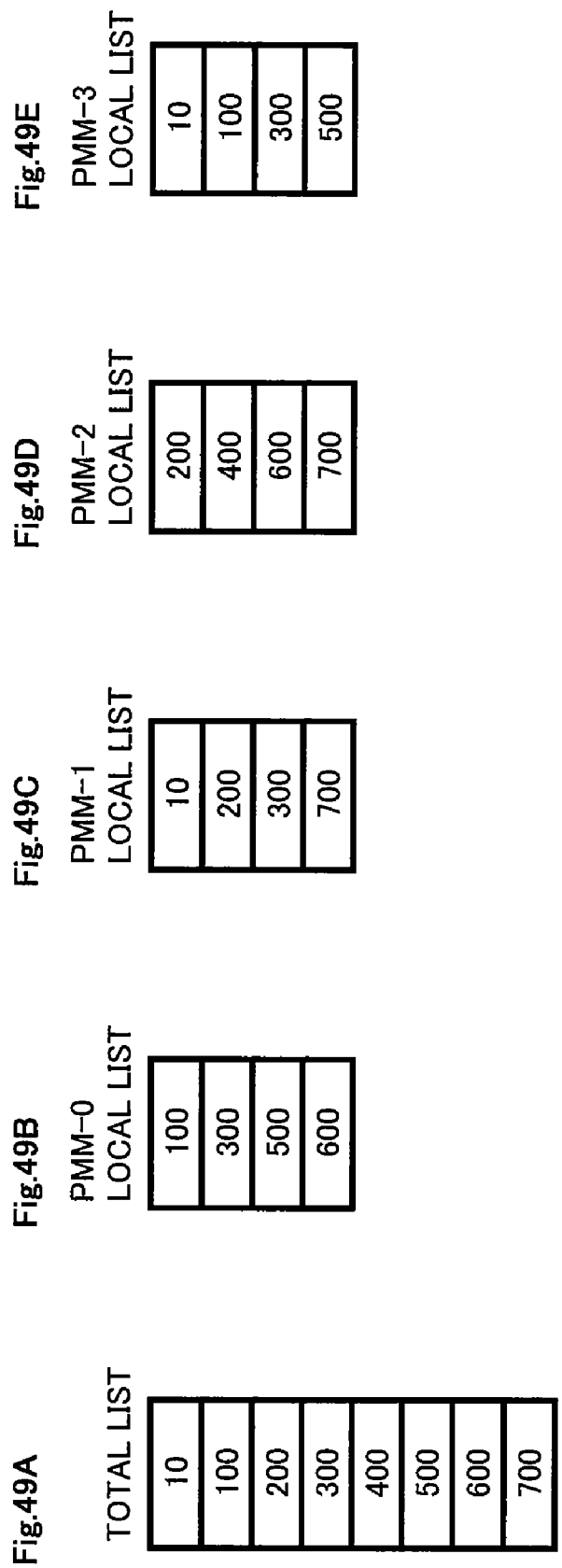
FIG. 49A is a diagram illustrating a virtual value list.
FIG. 49B through FIG. 49E are diagrams each illustrating an example of a value list divided and held by each PMM.
Figure 50:
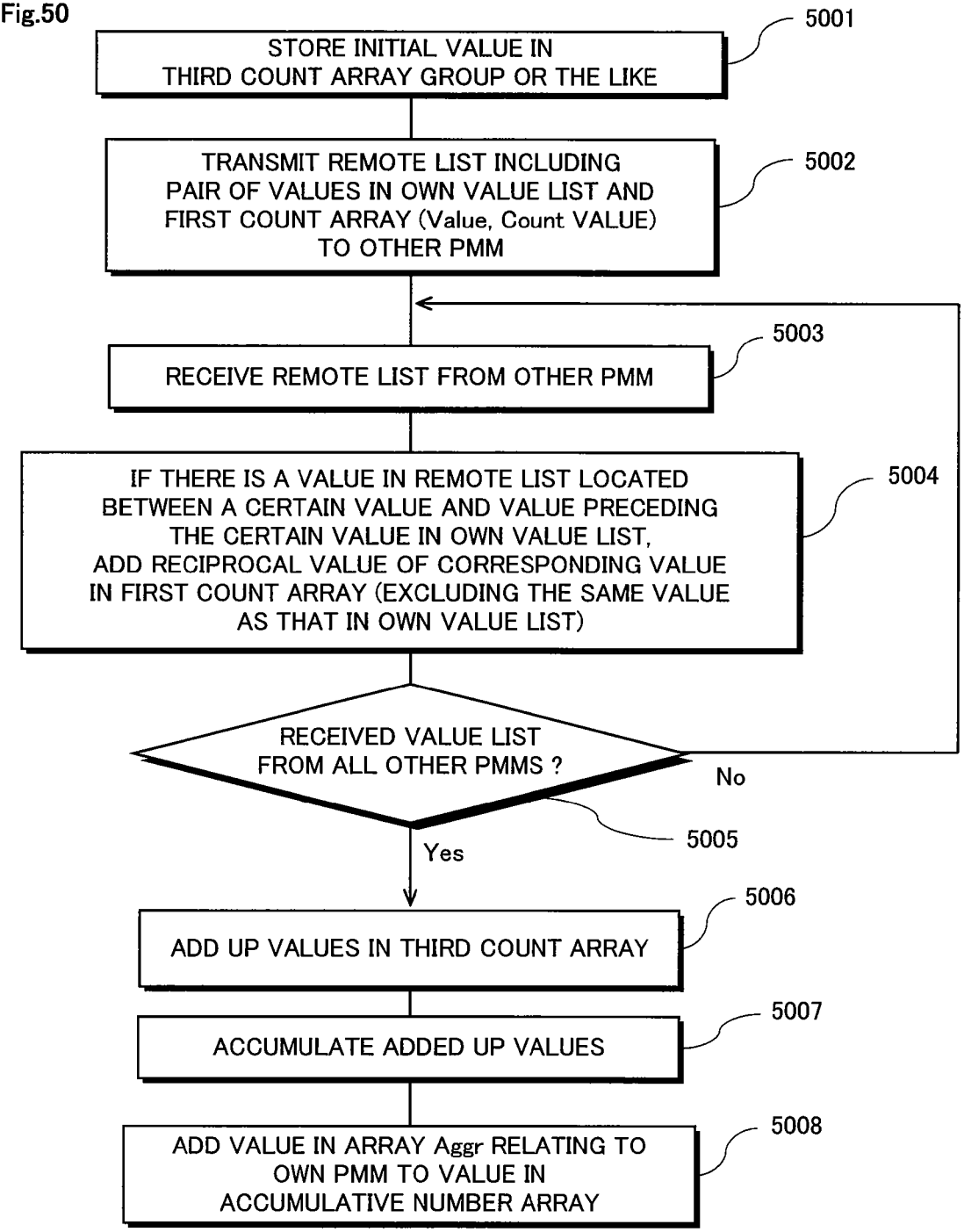
FIG. 50 is a flowchart showing another example of a generating process of the count arrays for the purpose of ordering.
Figure 51:
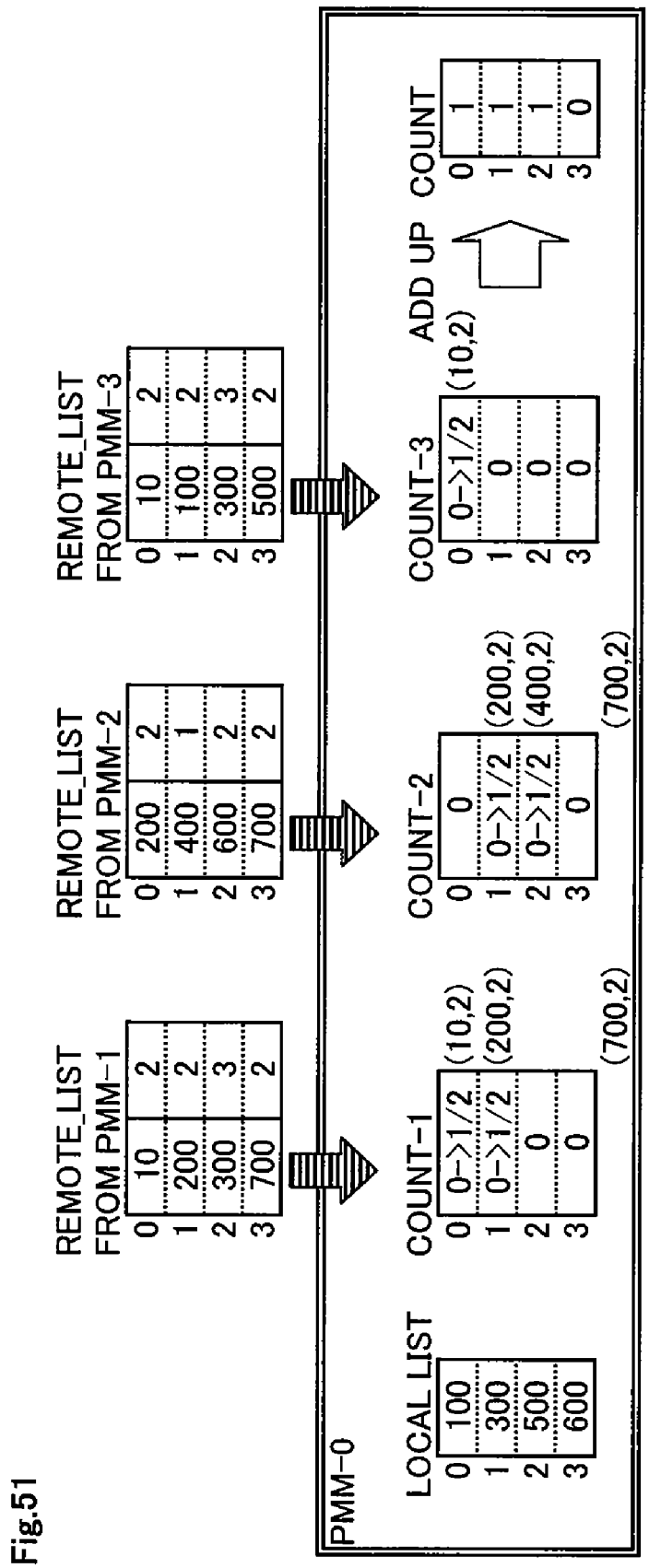
FIG. 51 is a diagram describing the process shown in FIG. 50.
Figure 52:
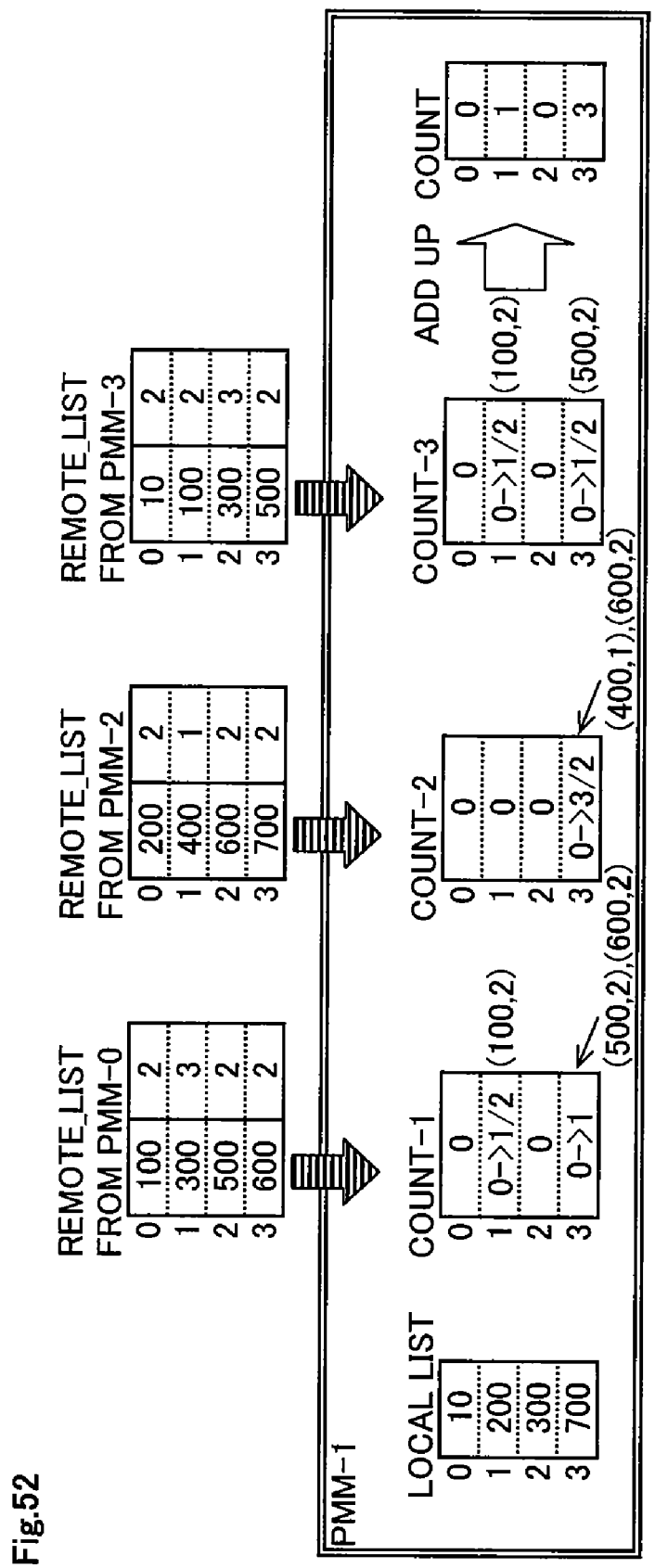
FIG. 52 is a diagram describing the process shown in FIG. 50.
Figure 53:
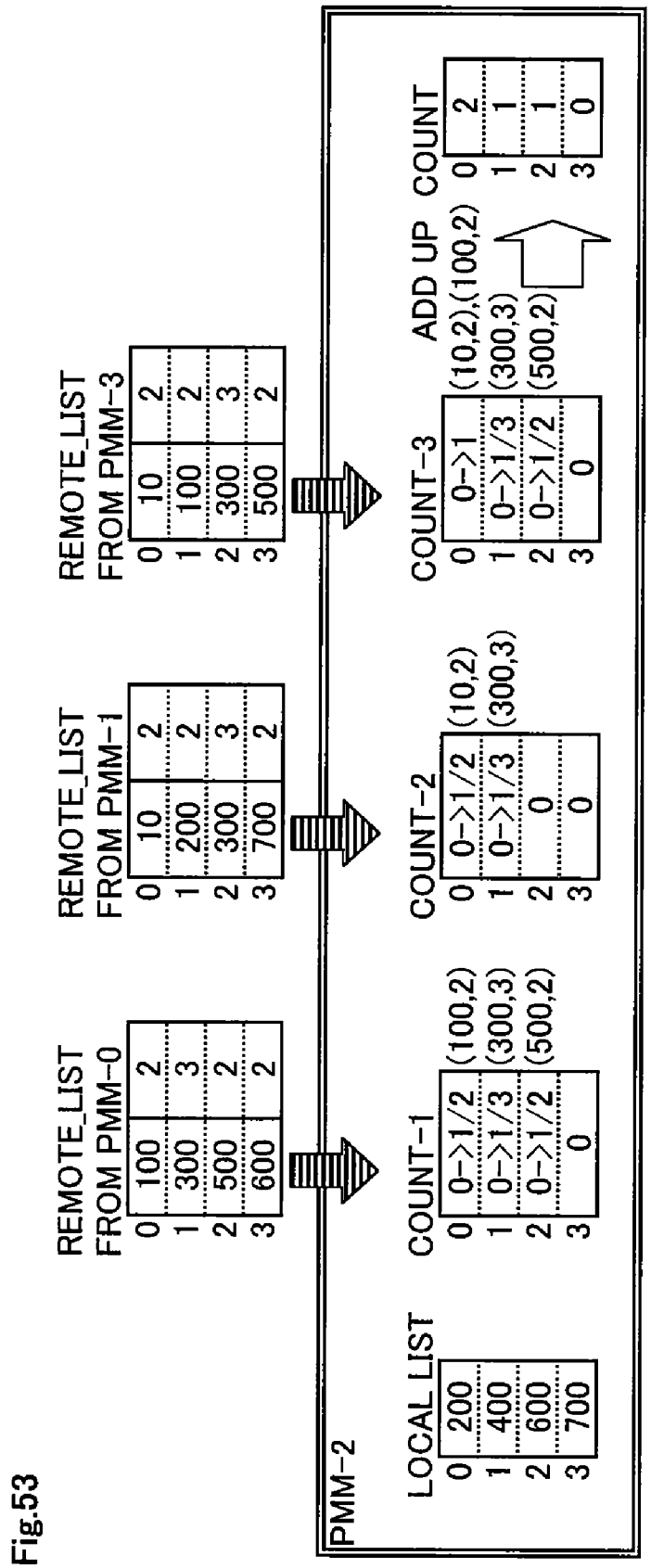
FIG. 53 is a diagram describing the process shown in FIG. 50.
Figure 54:
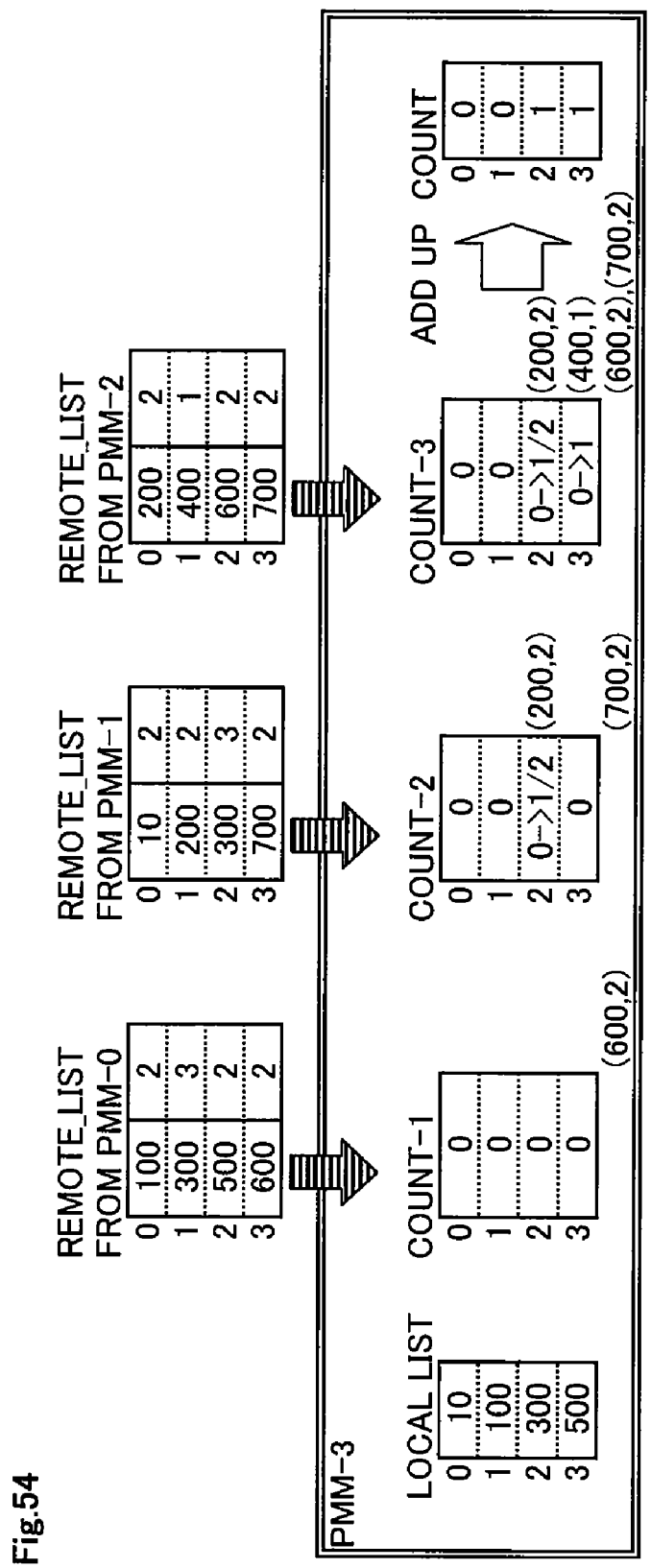
FIG. 54 is a diagram describing the process shown in FIG. 50.
Figure 55A:
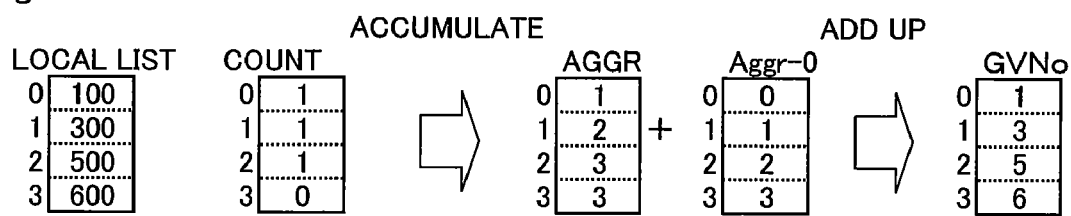
FIGS. 55A and 55B are each diagrams describing the process shown in FIG. 50.
Figure 55B:
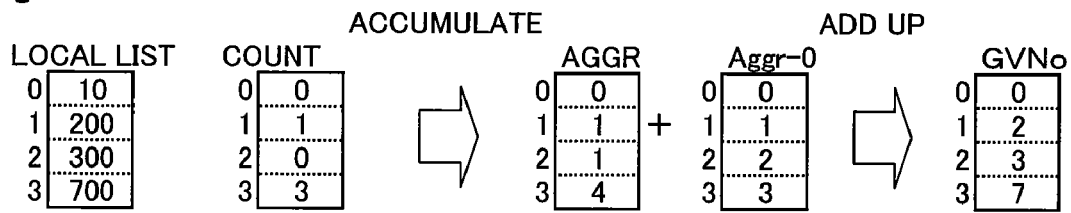
Figure 56A:
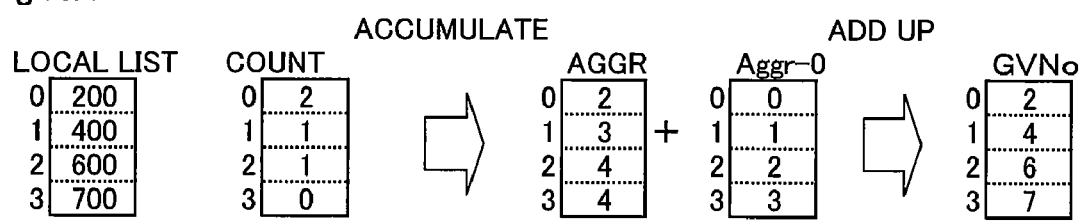
FIGS. 56A and 56B are each diagrams describing the process shown in FIG. 50.
Figure 56B:
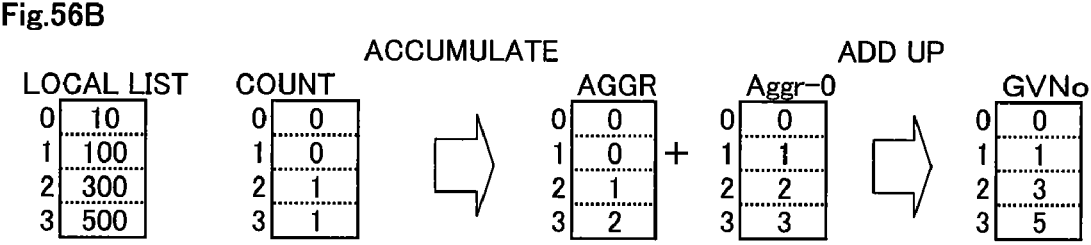
Figure 58A:
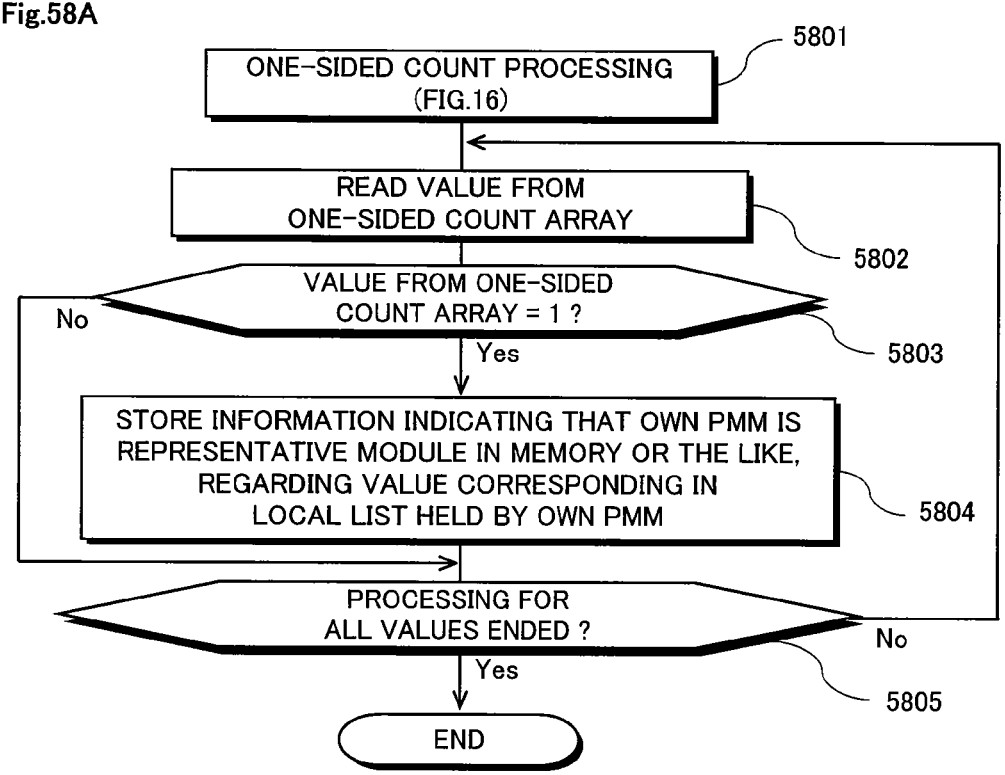
FIGS. 58A and 58B are diagrams illustrating an example of a process to be executed by the PMM for representative module selection.
Figure 58B:
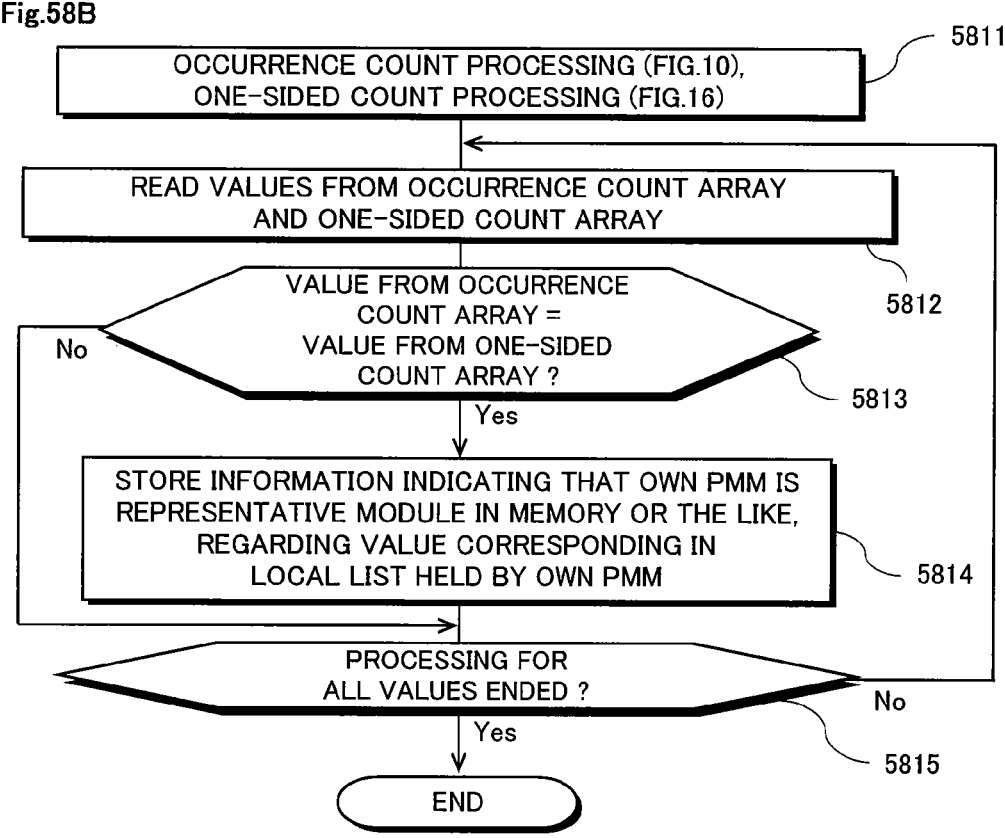

12 PMM
20 control circuit
22 bus interface
24 memory
26 bank

The invention claimed is:

1. An information processing system comprising:
(a) a plurality of memory modules, each having a memory and a control device; and
(b) a data transmission path to interconnect the memory modules and to transmit data held by any one of the memory modules to other memory modules, wherein the memory of each memory module holds a value list ordered in ascending order or descending order without duplication, wherein the control device in each memory module of interest comprises
i. data transmitting means to transmit storage values included in the value list held by the memory module of interest to other memory modules;
ii. data receiving means to receive from the other memory modules storage values included in the value lists held by the other memory modules; and iii. representative module determining means to determine, for a storage value in the value list held by the memory module of interest, whether or not the memory module of interest is a representative module representing one or more memory modules holding the storage value based on the value lists received from the other memory modules by the data receiving means, rankings determined for the other memory modules and a ranking determined for the memory module of interest, and, if the memory module of interest is the representative module, stores information indicating that the memory module of interest is the representative module in association with the storage value, wherein the representative modules for the respective storage values in the value lists held by the plurality of memory modules are determined.

2. The information processing system as claimed in claim 1, wherein the representative module determining means of the memory module of interest determines that the memory module of interest is the representative module for a certain storage value in the value list held by the memory module of interest if the ranking determined for the memory module of interest has a predetermined relationship with the rankings determined for one or more memory modules holding the certain storage value.

3. The information processing system as claimed in claim 2, wherein the rankings of the plurality of memory modules are determined by module numbers assigned to the plurality of memory modules, the representative module determining means generates a one-sided count array of the same size as the value list held by the memory module of interest, and stores initial values in the one-sided count array, the representative module determining means increases a value in the one-sided count array corresponding to the certain storage value in the value list held by the memory module of interest in order to indicate that the certain storage value exists in any other memory module if the module number assigned to the other memory module, which has transmitted the value list, is ranked at either a high or low side of the module number of the memory module of interest and the certain storage value in the value list held by the memory module of interest exists in a value list from the other memory module, and the representative module determining means determines that the memory module of interest is the representative module for the storage value in the value list, which corresponds to a value in the one-sided count array, if the value in the one-side count array remains the initial value.

4. The information processing system as claimed in claim 2, wherein the rankings of the plurality of memory modules are determined by module numbers assigned to the plurality of memory modules, the representative determining means of the memory module of interest generates an occurrence count array of the same size as the value list held by the memory module of interest, and stores initial values in the occurrence count array, the representative determining means increases a value in the occurrence count array corresponding to the certain storage value in the value list held by the memory module of interest in order to indicate that the certain storage value exists in any other memory module if the certain storage value in the value list held by the memory module of interest exists in the value list from the other memory module, the representative module determining means generates a one-sided count array of the same size as the value list held by the memory module of interest, and stores initial values in the one-sided count array, the representative module determining means increases a value in the one-sided count array corresponding to the certain storage value in the value list held by the memory module of interest in order to indicate that the certain storage value exists in any other memory module if the module number of the other memory module, which has transmitted the value list, is ranked at either a high or low side of the module number of the memory module of interest and the certain storage value in the value list held by the memory module of interest exists in the value list from the other memory module, and the representative module determining means determines that the memory module of interest is the representative module for the certain storage value in the value list, which corresponds to a value in the one-sided count array and a value in the occurrence count array, if the value in the one-sided count array and the corresponding value in the occurrence count array are found to be identical by comparing those values.

5. The information processing system as claimed in claim 2, wherein the rankings of the plurality of memory modules are determined by module numbers assigned to the plurality of memory modules, the representative determining means of the memory module of interest generates a flag array of the same size as the value list held by the memory module of interest, and stores initial values in the flag array;

the representative module determining means sets a value in the flag array corresponding to the certain storage value in the value list held by the memory module of interest in order to indicate that the certain storage value exists in any other memory module if the module number of the other memory module, which has transmitted the value list, is ranked at either a high or low side of the module number of the memory module of interest and the certain storage value in the value list held by the memory module of interest exists in the value list from the other memory module, and the representative module determining means determines that the memory module of interest is the representative module for the certain storage value in the value list, which corresponds to a value in the flag array, if the value in the flag array is found to be an initial value.

6. The information processing system as claimed in claim 1, wherein the control device in each memory module of interest comprises i. outgoing list array generating means to generate an outgoing list array including a storage value, to which information indicating that the memory module of interest is a representative module for the storage value has been attached, in a value list held by the memory module of interest; and ii. order computing means to compute orders of storage values in the value list held by the memory module of interest, based on the storage values contained in the outgoing list arrays of other memory modules, which have been transmitted from the data transmitting means of the other memory modules and received by the data receiving means of the memory module of interest.

7. The information processing system as claimed in claim 6, wherein the order computing means in the memory module of interest determines the number of storage values that are contained in the outgoing arrays from the other memory modules and are ordered between adjacent storage values in the value list held by the memory module of interest, and computes the orders of the respective storage values based on the determined number of the storage values.

8. An information processing system comprising:
(a) a plurality of memory modules, each having memory and a control device, wherein each memory module has been assigned its own ranking; and
(b) a data transmission path to interconnect the memory modules and to transmit data held by a given memory module to other memory modules, wherein the memory of each memory module holds a value list having values ordered in ascending order or descending order without duplication, wherein the control device in each memory module of interest comprises
 i. data transmitting means to transmit storage values included in the value list held by the memory module of interest to other memory modules;
 ii. data receiving means to receive from the other memory modules storage values included in the value lists held by the other memory modules;
 iii. occurrence count array generating means to complete an occurrence count array by generating an occurrence count array of the same size as the value list held by the memory module of interest, storing initial values in the occurrence count array, and increasing a value in the occurrence count array corresponding to a certain storage value in the value list held by the memory module of interest in order to indicate that the certain storage value exists in any other memory module if the certain storage value in the value list held by the memory module of interest exists in the value list from the other memory module;
 iv. one-sided count array generating means to complete a one-sided count array by generating the one-sided count array of the same size as the value list held by the memory module of interest, storing initial values in the one-sided count array, and increasing a value in the one-sided count array corresponding to the certain storage value in the value list held by the memory module of interest in order to indicate that the certain storage value exists in any other memory module if the module number of the other memory module, which has transmitted the value list, is ranked at either a high or low side of the module number of the memory module of interest and the certain storage value in the value list held by the memory module of interest exists in a value list from the other memory module;
 v. outgoing list array generating means to complete an outgoing list array by generating the outgoing list array of the same size as the value list held by the memory module of interest to be transmitted to the other memory modules, comparing corresponding values in the occurrence count array and the one-sided count array, and if both values are identical, storing a first value, which specifies that the memory module of interest is the highest or lowest ranked memory module among the memory modules holding the certain storage value, in the outgoing list array, otherwise storing a second value other than the first value in the outgoing list array; and
 vi. order computing means to compute orders of the storage values in the value list held by the memory module of interest based on the value lists and the outgoing list arrays from the other memory modules, which have been transmitted from the data transmitting modules of the respective memory modules and have been received by the data receiving means of the memory module of interest.

9. The information processing system as claimed in claim 8, wherein the order computing means specifies the storage value in the value list from the other memory module, which is ordered between adjacent storage values in the value list held by the memory module of interest, determines the number of storage values in the value lists from the other memory modules, which are ordered between the adjacent storage values, based on a sum of values in the outgoing list arrays corresponding to the specified storage values in the value lists, and computes orders of the respective storage values in the value list held by the memory module of interest based on the determined number.

10. An information processing system comprising:
(A) a plurality of memory modules, each having a memory and a control device; and
(B) a data transmission path to interconnect the memory modules and transmit data held by a given memory module to other memory modules, wherein the memory of each memory module holds a value list having values ordered in ascending order or descending order without duplication, wherein the control device in each memory module of interest comprises
 i. data transmitting means to transmit storage values included in the value list held by the memory module of interest to other memory modules;
 ii. data receiving means to receive from the other memory modules storage values included in the value lists held by the other memory modules;
 iii. occurrence count array generating means to complete an occurrence count array by generating an occurrence count array of the same size as the value list held by the memory module of interest, storing initial values in the occurrence count array, and increasing a value in the occurrence count array corresponding to a certain storage value in the value list held by the memory module of interest in order to indicate that the same storage value exists in any other memory module if the certain storage value in the value list held by the memory module of interest exists in the value list from the other memory module; and
 iv. order computing means to compute orders of the storage values in the value list held by the memory module of interest by (a) receiving the value lists and the occurrence count arrays from the other memory modules, which have been transmitted from the data transmitting modules in the respective memory modules and have been received by the data receiving means in the memory module of interest, (b) adding up reciprocal values of the values in the occurrence count arrays corresponding to the respective storage values that are included in the value lists from the other memory modules and are ordered between adjacent storage values in the value list held by the memory module of interest, (c) accumulating the added up reciprocal values, and (d) adding an initial order of the storage value in the value list held by the memory module of interest to the accumulated added up reciprocal values.

11. An information processing system comprising:
(A) a plurality of memory modules, each having a memory and a control device; and
(B) a data transmission path to interconnect the memory modules and to transmit data held by a given memory module to other memory modules, wherein the memory of each memory module holds a value list having values ordered in ascending order or descending order without duplication, wherein the control device in each memory module of interest comprises
   i. data transmitting means to transmit storage values included in the value list held by the memory module of interest to other memory modules;
   ii. data receiving means to receive from the other memory modules storage values included in the value lists held by the other memory modules; and
   iii. integer array generating means to (a) determine the number of the storage values, which are contained in the value lists from the other memory modules and ordered between adjacent storage values based on the storage values in the value lists from the other memory modules, which have been transmitted from the data transmitting means in the other memory modules and received by the data receiving means in the memory module of interest, and (b) assign integers, which have a fixed order and are not necessarily consecutive, to respective storage values in the value list held by the memory module of interest by accumulating the determined number and generate an array containing the integers taking into consideration the value lists held by the other memory modules.

12. An information processing method in an information processing system comprising a plurality of memory modules, each having a memory and a control device, and a data transmission path to interconnect the memory modules and to transmit data held by any one of memory modules to other memory modules, wherein the memory of each memory module holds a value list ordered in ascending order or descending order without duplication and the method is executed by the control device in the memory module of interest, wherein the method comprises the steps of:
   (a) transmitting storage values, included in the value list held by the memory module of interest, to other memory modules;
   (b) receiving storage values, included in the value lists held by the other memory modules, from the other memory modules; and
   (c) determining, for a storage value in the value list held by the memory module of interest, whether or not the memory module of interest is a representative module representing one or more memory modules holding the storage value based on the value lists received from the other memory modules, rankings determined for the other memory modules and a ranking determined for the memory module of interest, and if the memory module of interest is the representative module, storing information indicating that the memory module of interest is the representative module in association with the storage value,
   wherein the representative modules for the respective storage values in the value lists held by the plurality of memory modules are determined.

13. The information processing method as claimed in claim 12, wherein step (c) includes the step of
   i. determining that the memory module of interest is the representative module for a certain storage value in the value list held by the memory module of interest, if the ranking determined for the memory module of interest has a predetermined relationship with the rankings determined for one or more memory modules holding the certain storage value.

14. The information processing method as claimed in claim 13, wherein the rankings of the plurality of memory modules are determined by module numbers assigned to the plurality of memory modules, and step (c) further includes the steps of
   ii. generating a one-sided count array of the same size as the value list held by the memory module of interest, and storing initial values in the one-sided count array;
   iii. increasing a value in the one-sided count array corresponding to the certain storage value in the value list held by the memory module of interest in order to indicate that the certain storage value exists in any other memory module if the module number assigned to the other memory module, which has transmitted the value list, is ranked at either a high or low side of the module number of the memory module of interest and the certain storage value in the value list held by the memory module of interest exists in a value list from the other memory module; and
   iv. determining that the memory module of interest is the representative module for the storage value in the value list, which corresponds to a value in the one-sided count array, if the value in the one-sided count array remains the initial value.

15. The information processing method as claimed in claim 13, wherein the rankings of the plurality of memory modules are determined by module numbers assigned to the plurality of memory modules, and step (c) further includes the steps of
   ii. generating an occurrence count array of the same size as the value list held by the memory module of interest, and storing initial values in the occurrence count array;
   iii. increasing a value in the occurrence count array corresponding to the certain storage value in the value list held by the memory module of interest in order to indicate that the certain storage value exists in any other memory module if the certain storage value in the value list held by the memory module of interest exists in the value list from the other memory module;
   iv. generating a one-sided count array of the same size as the value list held by the memory module of interest, and storing initial values in the one-sided count array;
   v. increasing a value in the one-sided count array corresponding to the certain storage value in the value list held by the memory module of interest in order to indicate that the certain storage value exists in any other memory module if the module number of the other memory module, which has transmitted the value list, is ranked at either high or low side of the module number of the memory module of interest and the certain storage value in the value list held by the memory module of interest exists in the value list from the other memory module; and
   vi. determining that the memory module of interest is the representative module for the certain storage value in the value list, which corresponds to a value in the one-sided count array and a value in the occurrence count array, if the value in the one-sided count array and the corresponding value in the occurrence count array are found to be identical by comparing those values.

16. The information processing method as claimed in claim 13, wherein the rankings of the plurality of memory modules are determined by module numbers assigned to the plurality of memory modules, and step (c) further includes the steps of ii. generating a flag array of the same size as the value list held by the memory module of interest, and storing initial values in the flag array;

iii. setting a value in the flag array corresponding to the certain storage value in the value list held by the memory module of interest in order to indicate that the certain storage value exists in any other memory module if the module number of the other memory module, which has transmitted the value list, is ranked at either a high or low side of the module number of the memory module of interest and the certain storage value in the value list held by the memory module of interest exists in the value list from the other memory module; and iv. determining that the memory module of interest is the representative module for the certain storage value in the value list, which corresponds to a value in the flag array, if the value in the flag array is found to be an initial value.

17. The information processing method as claimed in claim 12, wherein the method further comprises the steps of:

(d) generating an outgoing list array including a storage value, to which information indicating that the memory module of interest is a representative module for the storage value has been attached, in a value list held by the memory module of interest; and (e) computing orders of storage values in the value list held by the memory module of interest, based on the storage values contained in the outgoing list arrays of other memory modules, which have been transmitted in the data transmitting step of the other memory modules and received in the data receiving means of the memory module of interest.

18. The information processing method as claimed in claim 17, wherein step (e) includes the steps of i. determining the number of storage values that are contained in the outgoing arrays from the other memory modules and are ordered between adjacent storage values in the value list held by the memory module of interest; and ii. computing the orders of the respective storage values based on the determined number of the storage values.

19. An information processing method in an information processing system comprising a plurality of memory modules, each having memory and a control device, wherein each memory module has been assigned its own ranking, and a data transmission path to interconnect the memory modules and to transmit data held by a given memory module to other memory modules, wherein the memory of each memory module holds a value list having values ordered in ascending order or descending order without duplication and the method is executed by the control device in each memory module, wherein the method comprises the steps of:

(a) transmitting storage values, included in the value list held by the memory module of interest, to other memory modules;

(b) receiving storage values, included in the value lists held by the other memory modules, from the other memory modules;

(c) completing an occurrence count array by generating an occurrence count array of the same size as the value list held by the memory module of interest, storing initial values in the occurrence count array, and increasing a value in the occurrence count array corresponding to a certain storage value in the value list held by the memory module of interest in order to indicate that the certain storage value exists in any other memory module if the certain storage value in the value list held by the memory module of interest exists in the value list from the other memory module;

(d) completing a one-sided count array by generating the one-sided count array of the same size as the value list held by the memory module of interest, storing initial values in the one-sided count array, and increasing a value in the one-sided count array corresponding to the certain storage value in the value list held by the memory module of interest in order to indicate that the certain storage value exists in any other memory module if the module number of the other memory module, which has transmitted the value list, is ranked at either a high or low side of the module number of the memory module of interest and the certain storage value in the value list held by the memory module of interest exists in a value list from the other memory module;

(e) completing an outgoing list array by generating the outgoing list array of the same size as the value list held by the memory module of interest to be transmitted to the other memory modules, comparing corresponding values in the occurrence count array and the one-sided count array, and if both values are identical, storing a first value, which specifies that the memory module of interest is the highest or lowest ranked memory module among the memory modules holding the certain storage value, in the outgoing list array, otherwise storing a second value other than the first value in the outgoing list array; and (f) computing orders of the storage values in the value list held by the memory module of interest based on the value lists and the outgoing list arrays from the other memory modules, which have been transmitted in step (a) of the respective memory modules and have been received in step (b) of the memory module of interest.

20. The information processing method as claimed in claim 19, wherein step (f) includes the steps of i. specifying the storage value in the value list from the other memory module, which is ordered between adjacent storage values in the value list held by the memory module of interest;

ii. determining the number of storage values in the value lists from the other memory modules, which are ordered between the adjacent storage values, based on a sum of values in the outgoing list arrays corresponding to the specified storage values in the value lists; and iii. computing orders of the respective storage values in the value list held by the memory module of interest based on the determined number.

21. An information processing method in an information processing system comprising a plurality of memory modules, each having a memory and a control device, and a data transmission path to interconnect the memory modules and to transmit data held by a given memory module to other memory modules, wherein the memory of each memory module holds a value list having values ordered in ascending order or descending order without duplication and the method is executed by the control device in each memory module of interest, wherein the method comprises the steps of:

(a) transmitting storage values, included in the value list held by the memory module of interest, to other memory modules;

(b) receiving storage values, included in the value lists held by the other memory modules, from the other memory modules;

(c) completing an occurrence count array by generating an occurrence count array of the same size as the value list held by the memory module of interest, storing initial values in the occurrence count array, and increasing a value in the occurrence count array corresponding to a certain storage value in the value list held by the memory module of interest in order to indicate that the same storage value exists in any other memory module if the certain storage value in the value list held by the memory module of interest exists in the value list from the other memory module; and (d) computing orders of the storage values in the value list held by the memory module of interest by (i) receiving the value lists and the occurrence count arrays from the other memory modules, which have been transmitted in step (a) of the respective memory modules and have been received in step (b) of the memory module of interest, (ii) adding up reciprocal values of the values in the occurrence count arrays corresponding to the respective storage values that are included in the value lists from the other memory modules and are ordered between adjacent storage values in the value list held by the memory module of interest, (iii) accumulating the added up reciprocal values, and (iv) adding an initial order of the storage value in the value list held by the memory module of interest to the accumulated added up reciprocal values.

22. An information processing method in an information processing system comprising a plurality of memory modules, each having a memory and a control device, and a data transmission path to interconnect the memory modules and to transmit data held by a given memory module to other memory modules, wherein the memory of each memory module holds a value list having values ordered in ascending order or descending order without duplication and the method is executed by the control device in each memory module of interest, wherein the method comprises the steps of:

(a) transmitting storage values, included in the value list held by the memory module of interest, to other memory modules;

(b) receiving storage values, included in the value lists held by the other memory modules, from the other memory modules; and (c) generating an integer array by (i) determining the number of the storage values, which are contained in the value lists from the other memory modules and ordered between adjacent storage values based on the storage values in the value lists from the other memory modules, which have been transmitted in the data transmitting means of the other memory modules and received in the data receiving means of the memory module of interest, (ii) assigning integers, which have a fixed order and are not necessarily consecutive, to respective storage values in the value list held by the memory module of interest by accumulating the determined number and (iii) generating the array containing the integers taking into consideration the value lists held by the other memory modules.

* * * * *